US008825504B2

(12) United States Patent
Tholl et al.

(10) Patent No.: US 8,825,504 B2
(45) Date of Patent: Sep. 2, 2014

(54) MODIFYING CONTAINERIZED PROCESSING LOGIC FOR USE IN INSURANCE CLAIM PROCESSING

(75) Inventors: Rob Tholl, Calgary (CA); Raymond Leung, Calgary (CA); Clayton Russell, Calgary (CA)

(73) Assignee: Emergis, Inc., Calgary (CA)

( * ) Notice: Subject to any disclaimer, the term of this patent is extended or adjusted under 35 U.S.C. 154(b) by 316 days.

(21) Appl. No.: 12/388,320

(22) Filed: Feb. 18, 2009

(65) Prior Publication Data

US 2010/0211415 A1 Aug. 19, 2010

(51) Int. Cl.
*G06Q 40/00* (2012.01)
(52) U.S. Cl.
USPC .................................................. 705/4; 705/38
(58) Field of Classification Search
USPC ........................................................ 705/35, 4
See application file for complete search history.

(56) References Cited

U.S. PATENT DOCUMENTS

| 6,879,959 B1* | 4/2005 | Chapman et al. ................. 705/2 |
| 2002/0049617 A1* | 4/2002 | Lencki et al. ..................... 705/4 |
| 2004/0064386 A1* | 4/2004 | Goguen et al. ................... 705/34 |
| 2009/0083079 A1* | 3/2009 | Law et al. ......................... 705/4 |

* cited by examiner

*Primary Examiner* — Eric T Wong
*Assistant Examiner* — John Anderson
(74) *Attorney, Agent, or Firm* — Occhiuti & Rohlicek LLP

(57) ABSTRACT

A system and method for modifying benefit coverage including a plurality of benefit codes of an insurance plan, the insurance plan for use in adjudicating one or more insurance claims. The system and method including accessing a set of benefit codes structured in a plurality of benefit containers including a primary benefit container and a plurality of secondary benefit containers, each of the plurality of secondary benefit containers being coupled to the primary benefit container by a respective benefit container reference, each of the plurality of secondary benefit containers containing one or more benefit codes adapted for processing a claim content of the one or more insurance claims, each of the one or more benefit codes being coupled to their respective secondary benefit container by a respective benefit reference, the set of benefit codes defining a benefit hierarchy. Also included is selecting the primary benefit container for inclusion in the insurance plan, and then modifying the benefit hierarchy by performing at least one of adding an additional benefit container reference to the primary benefit container, modifying a container benefit parameter of at least one of the benefit container references, or deleting at least one of the existing benefit container references. The modified insurance plan in then stored in a memory; such that the stored modified insurance plan is adapted for subsequent use in adjunction of appropriate insurance claims received by an adjudication system.

19 Claims, 87 Drawing Sheets

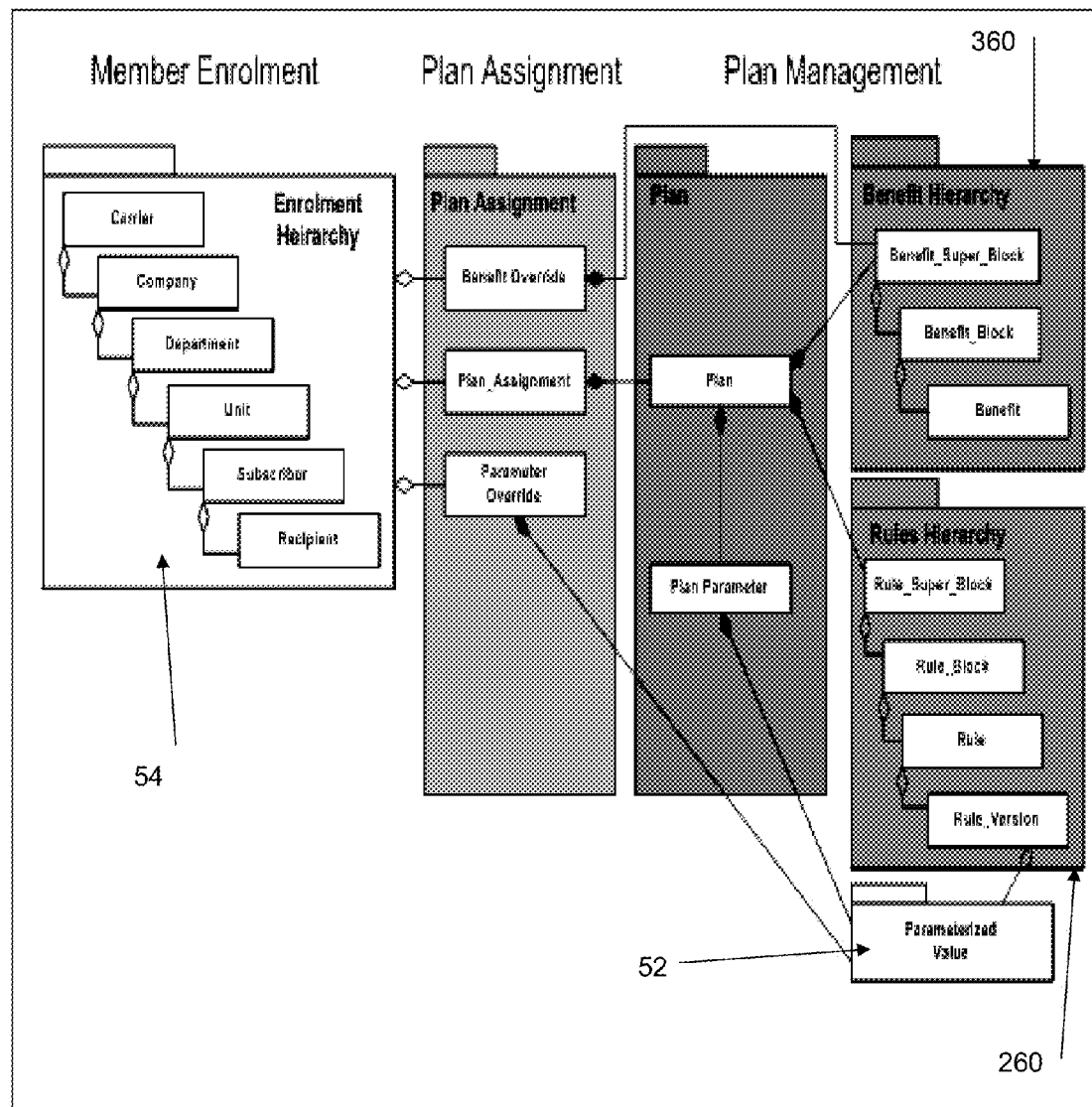
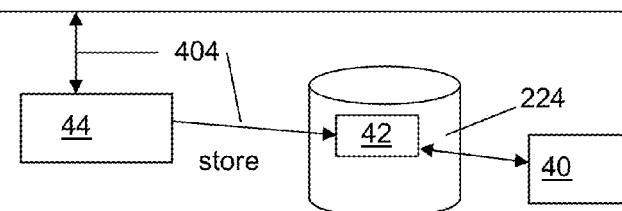
Figure 18

BSB Plan

Benefit Code Super Block Plan: Test Scenarios BSB Fiscal 100

| Label | Description | Release Date |
|---|---|---|
| CDA 02950 Radiograp | CDA 02950 Package Radiographic Guide | |
| CDA 02988 kjhkh | CDA 02988 Package kjhkh | |

Figure 35

RSB Adj.

Rule Super Block Adjudication: TEST SCENARIOS RSB 100      ☐ Accept All

Group Name: pgroup       Permission: Read-Only    ☐ Accept pricing default province is [ON]

Figure 36

RSB Carrier Adj.

Rule Super Block Carrier Adjudication: B LA RULE      ☐ Accept All

Group Name: parameter group for RSB 001       Permission: Read-Only    ☐ Accept

In a [1000] day period the maximum amount that can be claimed is [99.99] dollars and the maximum deductable is [100] dollars

Figure 37

Deductible

Selected Deductible:    DeductibleModule                                    ☐ Accept All

Group Name: Deductible Carry-over                Permission: Read-Only ▼    ☐ Accept Deductible carry over Period is [0]        Months. Applies to all deductibles within the Plan.

The carry over instruction is [X]            (ANY - any amount within the period is carried over, FULL - full amount
  of the deductible must exist in the period, X - not required)

Group Name: Deductible prorating                 Permission: Read-Only ▼    ☐ Accept Prorating of the Deductible amount is applied? [no]        (T-True/Yes, F-False/No). Prorate is a % based on the
  member enrolment effective date in comparison to the deductible period start date.

Group Name: Deductible 1                         Permission: Read-Only ▼    ☐ Accept Deductible applies to Service Codes in Benefit Block [EMPTY BLOCK]    ☐ (Recal Benefit Block label created

Figure 40

Frequencies

Selected Frequencies:    AccumulatorModule                                  ☐ Accept All

Group Name: Accumulator 1                        Permission: Read-Write ▼    ☐ Accept

EMPTY                      ☐

Limited to: [1]        [X]        (SD:Standard, UN:Unit, VI:Visit, BA:Benefit Amt, X:N/A)

per: [0]        [X]        (DD:Day, MM:Month, YJ:Calendar Year, YB:Benefit Year, YP:Plan Year, LL:LifeTime)

per mouth position: [X]        (TO:Tooth, ST:Sextant, QD:Quadrant, AR:Arch, X:N/A)

for age limit: [0]    to age [0]

using CEXP [P]        (P:paid, A:all)

Group Name: Accumulator 2                        Permission: Read-Write ▼    ☐ Accept

Co-Insurance

Selected Co-Insurance: CoinsuranceModule    ☐ Accept All

Group Name: Coinsurance 1    Permission: Read-Only ▼    ☐ Accept

Service Codes in Benefit Block [EMPTY BLOCK] ☐ (Fiscal Benefit Block label created for Coinsuranc are reimbursed at [0] (Percentage 0-100%)

Group Name: Coinsurance 2    Permission: Read-Only ▼    ☐ Accept

[0] [EMPTY] ☐

Service Codes in Benefit Block [EMPTY BLOCK] ☐ (Fiscal Benefit Block label created for Coinsuranc are reimbursed at [0] (Percentage 0-100%)

Maximum

Selected Maximum: MaximumModule    ☐ Accept All

Group Name: Maximums prorating    Permission: Read-Only ▼    ☐ Accept

Prorating of Maximum amount is applied [no] (T-True/Yes, F - False/No) Prorate is a % based on th

Group Name: Maximum 1    Permission: Read-Only ▼    ☐ Accept

MAXIMUM applies to Service Codes in Benefit Block [EMPTY BLOCK] ☐ (Fiscal Benefit Block label The Maximum calculation method is based on [X] (IND - per Individual, INF - Family with an Indiv cap If by 'Relationship Code', this maximum amount is for Relationship code [X] (1- member, 2 - spouse, 3

Figure 44

Pricing

Selected Pricing: ☐ Accept All

Group Name: fee guide selection  Permission: Read-Only  ☐ Accept

Use the carrier specific fee guide named [ ] from the year 2001 using [NL] province's fee guide

Group Name: Specialist and Denturist Treatment  Permission: Read-Only  ☐ Accept Dental specialists are handled as [A] (A allowed, R refused, G treat as GP)

Denturists are handled as [A] (A allowed, R refused, G treat as GP)

Group Name: lab fee cap  Permission: Read-Only  ☐ Accept

Cap the lab fee as [0.000] % of the procedure code amount based on [ ]

Figure 45

CoPay

Selected CoPay: CopayModule  ☐ Accept All

Group Name: copay 1  Permission: Read-Only  ☐ Accept copay amount is [-1] dollars benfit class is [EMPTY BLOCK]

Group Name: copay 2  Permission: Read-Only  ☐ Accept

The service codes in this benefit block [EMPTY BLOCK] have a copay of [-1]

| Cloning Plan: 20001.0001-Cloned | |
|---|---|
| Carrier Number: | 10 |
| Plan Code: | 20001.0001-Cloned |
| English Name: | ESSENTIEL 20001.0001 |
| English Description: | AP005+BC001+BR001+CE001+CP001+DR005+EO001 |
| French Name: | ESSENTIEL 20001.0001 |
| French Description: | AP005+BC001+BR001+CE001+CP001+DR005+EO001 |
| Entrant Type: | Normal |
| Active Date: | 8/20/2008    Inactive Date: |
| Benefit Super Block (Coverage): | Essential-20001 |
| Benefit Super Block (Adjudication Logic): | BENEFIT BLOCK GROUPING1 |
| Benefit Super Block (Fiscal): | Essential 20001 - Fiscal |
| Rule Super Block (CDA Adjudication Logic): | A INDUSTRY RULES     Details |
| Rule Super Block (Carrier Specific Adj. Logic): | B LA CAPITALE RULES *     Details |
| COB: | CobCLHIAPricing |
| General Adjudication: | GeneralAdjudication |
| Deductible: | DeductibleModule |
| Frequencies: | AccumulatorModule |
| Custom Frequencies: | AccumulatorModuleLaCap |
| Co-Insurance: | CoinsuranceModule |
| Maximum: | MaximumModule |
| Pricing: | MemberProvincePricing |

| | |
|---|---|
| Carrier Number: | 10 |
| Plan Code: | 20001.0001 |
| English Name: | ESSENTIEL 20001.0001 |
| English Description: | AP005+BC001+BR001+CE001+CP001+DR005+EO001 |
| French Name: | ESSENTIEL 20001.0001 |
| French Description: | AP005+BC001+BR001+CE001+CP001+DR005+EO001 |
| Entrant Type: | Normal |
| Active Date: | 1/ 1/1990     Inactive Date: ☑ 1/ 2/1990 |
| Benefit Super Block (Coverage): | Essential-20001 |
| Benefit Super Block (Adjudication Logic): | BENEFIT BLOCK GROUPING1 |
| Benefit Super Block (Fiscal): | Essential 20001 - Fiscal |
| Rule Super Block (CDA Adjudication Logic): | A INDUSTRY RULES     [Details] |
| Rule Super Block (Carrier Specific Adj. Logic): | B LA CAPITALE RULES *     [Details] |
| COB: | CobCLHIAPricing |
| General Adjudication: | GeneralAdjudication |
| Deductible: | DeductibleModule |
| Frequencies: | AccumulatorModule |
| Custom Frequencies: | AccumulatorModuleLaCap |
| Co-Insurance: | CoinsuranceModule |
| Maximum: | MaximumModule |
| Pricing: | MemberProvincePricing |

[Update]  [Update Plan Details]                    [Close]

MODIFYING CONTAINERIZED PROCESSING LOGIC FOR USE IN INSURANCE CLAIM PROCESSING

FIELD OF THE INVENTION

This invention relates to configuration of insurance plan definitions used in insurance claim processing.

BACKGROUND OF THE INVENTION

It is recognized in the health care industry that in order to service patient population, health care providers, by necessity, have become participants in many networks. This requires the complex management of many fee schedules, rule sets, and service code definitions, a process that is commonly outside of the capabilities of most practice management systems. The process is then left up to the carrier adjudicating the insurance claims, creating further inefficiencies and added costs to health plans. Further, it is recognized that there are many industry efforts in place to reduce cost, as well as constant Federal and State legislative changes, electronic transaction code sets, and privacy and security requirements. Therefore, health claims processing has become a costly and time consuming endeavour in the current health care industry.

For example, the current healthcare claims system is the source where inefficiencies contribute in administrative overhead and delays. Furthermore, providers are suffering from bad debt expenses on patient payment amounts. In addition the current medical claims system is fraught with the high potential for errors and omissions resulting in more cost to process claims. Providers realize that the reduction of their Account Receivables balance and reconciliation time is desirable. This reduction can happen through more direct eligibility verification, streamlined management of many network relationships, and faster payment. For payers, a key to more efficient plan management is increasing their membership. This membership increase can happen through a value proposition which includes increasing auto-adjudication rates by reducing rejected claims and eliminating many of the steps required in order to accomplish today's claims administration. There is a need for the implementation of a tool for modifying benefit coverage of an insurance plan that can be used by an adjudication engine in the processing of insurance claims, such that the tool is configured as flexible enough to implement new plans/benefits and associated adjudication rules and benefit code configurations more rapidly and/or at lower costs than current insurance plan systems.

SUMMARY OF THE INVENTION

It is an object of the present invention to provide an benefit and rule configuration environment to obviate or mitigate at least some of the above-presented disadvantages.

There is a need for the implementation of a tool for generating or otherwise configuring an adjudication rule set and/or benefit coverage set that can be used by an adjudication engine, such that the tool is configured as flexible enough to implement new plans/benefits and associated adjudication rules more rapidly and/or at lower costs than current insurance plan systems. Contrary to current systems, there is provided a system and method for modifying benefit coverage including a plurality of benefit codes of an insurance plan, the insurance plan for use in adjudicating one or more insurance claims. The system and method including accessing a set of benefit codes structured in a plurality of benefit containers including a primary benefit container and a plurality of secondary benefit containers, each of the plurality of secondary benefit containers being coupled to the primary benefit container by a respective benefit container reference, each of the plurality of secondary benefit containers containing one or more benefit codes adapted for processing a claim content of the one or more insurance claims, each of the one or more benefit codes being coupled to their respective secondary benefit container by a respective benefit reference, the set of benefit codes defining a benefit hierarchy. Also included is selecting the primary benefit container for inclusion in the insurance plan, and then modifying the benefit hierarchy by performing at least one of adding an additional benefit container reference to the primary benefit container, modifying a container benefit parameter of at least one of the benefit container references, or deleting at least one of the existing benefit container references. The modified insurance plan in then stored in a memory; such that the stored modified insurance plan is adapted for subsequent use in adjunction of appropriate insurance claims received by an adjudication system.

An aspect provided is a method for modifying benefit coverage including a plurality of benefit codes of an insurance plan, the insurance plan for use in adjudicating one or more insurance claims, the method comprising the steps of: accessing a set of benefit codes structured in a plurality of benefit containers including a primary benefit container and a plurality of secondary benefit containers, each of the plurality of secondary benefit containers being coupled to the primary benefit container by a respective benefit container reference, each of the plurality of secondary benefit containers containing one or more benefit codes adapted for processing a claim content of the one or more insurance claims, each of the one or more benefit codes being coupled to their respective secondary benefit container by a respective benefit reference, the set of benefit codes defining a benefit hierarchy; selecting the primary benefit container for inclusion in the insurance plan; modifying the benefit hierarchy by performing at least one of adding an additional benefit container reference to the primary benefit container, modifying a container benefit parameter of at least one of the benefit container references, or deleting at least one of the existing benefit container references; and storing the modified insurance plan in a memory; wherein the stored modified insurance plan is adapted for subsequent use in adjunction of appropriate insurance claims received by an adjudication system.

A further aspect provided is a set of adjudication rules structured in a plurality of containers including a primary rule container and a plurality of secondary rule containers, each of the plurality of secondary rule containers being coupled to the primary rule container by a respective container reference, each of the plurality of secondary rule containers containing one or more adjudication rules adapted for processing the claim content of the received claim, each of the one or more adjudication rules being coupled to their respective secondary container by a respective rule reference, the set of adjudication rules defining a rule hierarchy.

A further aspect provided is a method for modifying benefit coverage including a plurality of benefit codes of an insurance plan, the insurance plan for use in adjudicating one or more insurance claims, the method comprising the steps of: accessing a set of benefit codes structured in a plurality of benefit containers including a primary benefit container and a plurality of secondary benefit containers, each of the plurality of secondary benefit containers being coupled to the primary benefit container by a respective benefit container reference, each of the plurality of secondary benefit containers containing one or more benefit codes adapted for processing a claim content of the one or more insurance claims, each of the one or more benefit codes being coupled to their respective secondary benefit container by a respective benefit reference, the set of benefit codes defining a benefit hierarchy; selecting the primary benefit container for inclusion in the insurance plan; modifying the benefit hierarchy by performing at least one of adding an additional benefit reference to at least one of the secondary benefit containers, modifying a benefit reference parameter of at least one of the benefit references, or deleting at least one of the existing benefit references; and storing the modified insurance plan in a memory; wherein the stored modified insurance plan is adapted for subsequent use in adjunction of appropriate insurance claims received by an adjudication system.

A further aspect provided is at least one of the benefit references or the benefit container references is defined to include at least one of an effective date or a expiry date, wherein the benefit container parameter or benefit parameter is the at least one of an effective date or a expiry date.

A further aspect provided is a system for modifying benefit coverage including a plurality of benefit codes of an insurance plan, the insurance plan for use in adjudicating one or more insurance claims, the system comprising: a memory for storing a set of benefit codes structured in a plurality of benefit containers including a primary benefit container and a plurality of secondary benefit containers, each of the plurality of secondary benefit containers being coupled to the primary benefit container by a respective benefit container reference, each of the plurality of secondary benefit containers containing one or more benefit codes adapted for processing a claim content of the one or more insurance claims, each of the one or more benefit codes being coupled to their respective secondary benefit container by a respective benefit reference, the set of benefit codes defining a benefit hierarchy; a plan engine adapted for selecting the primary benefit container from the benefit hierarchy for inclusion in the insurance plan; a benefit module adapted for modifying the benefit hierarchy by performing at least one of adding an additional benefit container reference to the primary benefit container, modifying a container benefit parameter of at least one of the benefit container references, or deleting at least one of the existing benefit container references; and a deployment module adapted for storing the modified insurance plan in a memory; wherein the stored modified insurance plan is adapted for subsequent use in adjunction of appropriate insurance claims received by an adjudication system.

A further aspect provided is a memory for storing data for access by an application program being executed on a data processing system, comprising: a data structure stored in said memory, said data structure including information resident in a database used by said adjudication engine program and including: a set of adjudication rules stored in said memory appropriate to processing a received claim of an adjudication engine, the set of adjudication rules structured in a plurality of containers including a primary rule container and a plurality of secondary rule containers, each of the plurality of secondary rule containers being coupled to the primary rule container by a respective container reference, each of the plurality of secondary rule containers containing one or more adjudication rules adapted for processing the claim content of the received claim, each of the one or more adjudication rules being coupled to their respective secondary container by a respective rule reference, the set of adjudication rules defining a rule hierarchy; wherein processing the content of the received claim with the one or more adjudication rules is facilitated by an execution order defined by the ordering of the container references in the primary rule container.

A further aspect provided of the data structure is a set of benefit codes stored in said memory appropriate to the received claim, the set of benefit codes structured in a plurality of benefit containers including a primary benefit container and a plurality of secondary benefit containers, each of the plurality of secondary benefit containers being coupled to the primary benefit container by a respective benefit container reference, each of the plurality of secondary benefit containers containing one or more benefit codes adapted for processing the claim content of the received claim, each of the one or more benefit codes being coupled to their respective secondary benefit container by a respective benefit reference, the set of benefit codes defining a benefit hierarchy.

BRIEF DESCRIPTION OF THE DRAWINGS

Exemplary embodiments of the invention will now be described in conjunction with the following drawings, by way of example only, in which:

FIG. 5b is an example parameterized rule using the logic of FIG. 5a;

FIG. 6b shows a further embodiment of the rule data structure of FIG. 6a;

FIG. 18 is an example block diagram of modifications performed by a plan engine of the system of FIG. 2;

DETAILED DESCRIPTION OF THE EMBODIMENT(S)

System 10

Figure 1:
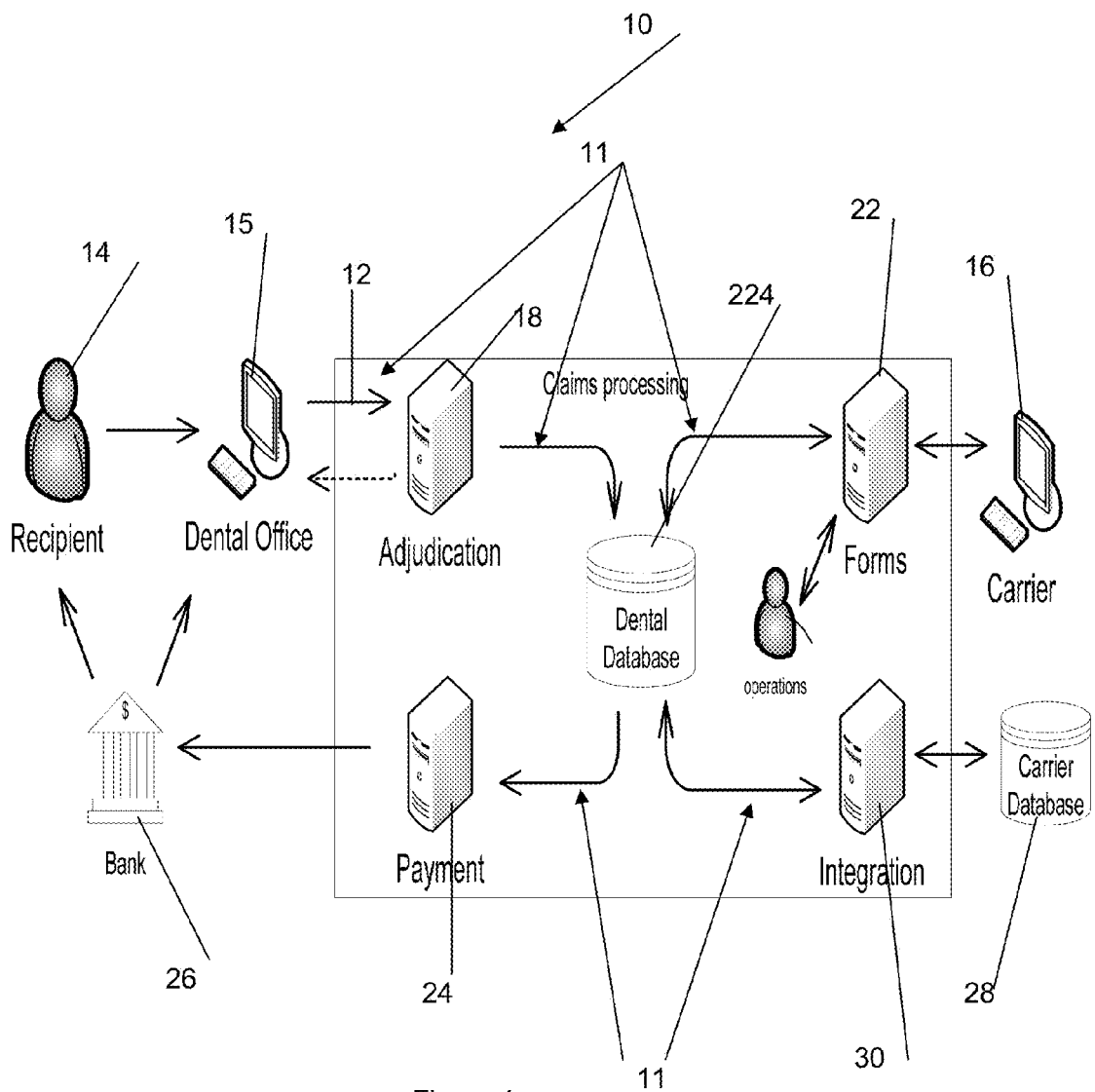
FIG. 1 is a schematic of a claim processing environment.

Referring to FIG. 1, shown is the basic workflows involved with an insurance claim 12 (e.g. dental, vision, drug, etc, or a combination thereof). The process starts with a person 14 going to a medical office 15 to get insured services performed (e.g. dental) and/or for the purchase of insured products (e.g. drugs). The office 15 submits the electronic claim 12 over a communications network 11 to the recipient's insurance carrier 16. The carrier 16 adjudicates the claim 12 via an adjudication system 18 and returns to the dental office 15 the amount that it will cover the performed services/purchased products. The Recipient 14 then has to pay the office 15 the difference if there is any. The adjudicated claim 12 is stored in a database 224 and later read into a payment processing system 24. Payment processing 24 can either EFT or generate a cheque to the payee 26 indicated on the claim 12. the carrier 16 also has a carrier database 28 coupled to the database 224, for supplying updates to any carrier/recipient specific information used during the adjudication 18 and/or payment 24 processes. Further, the carrier 16 can also provide a forms interface 22 for use by the recipient 14 and/or the dental office 15, as desired, in completing the electronic forms of the claim 12 for submission over the network 11 (e.g. intra and/or extranet). The carrier 16 may also share/integrate certain data with the database 224 through an integration server 30.

Figure 2:
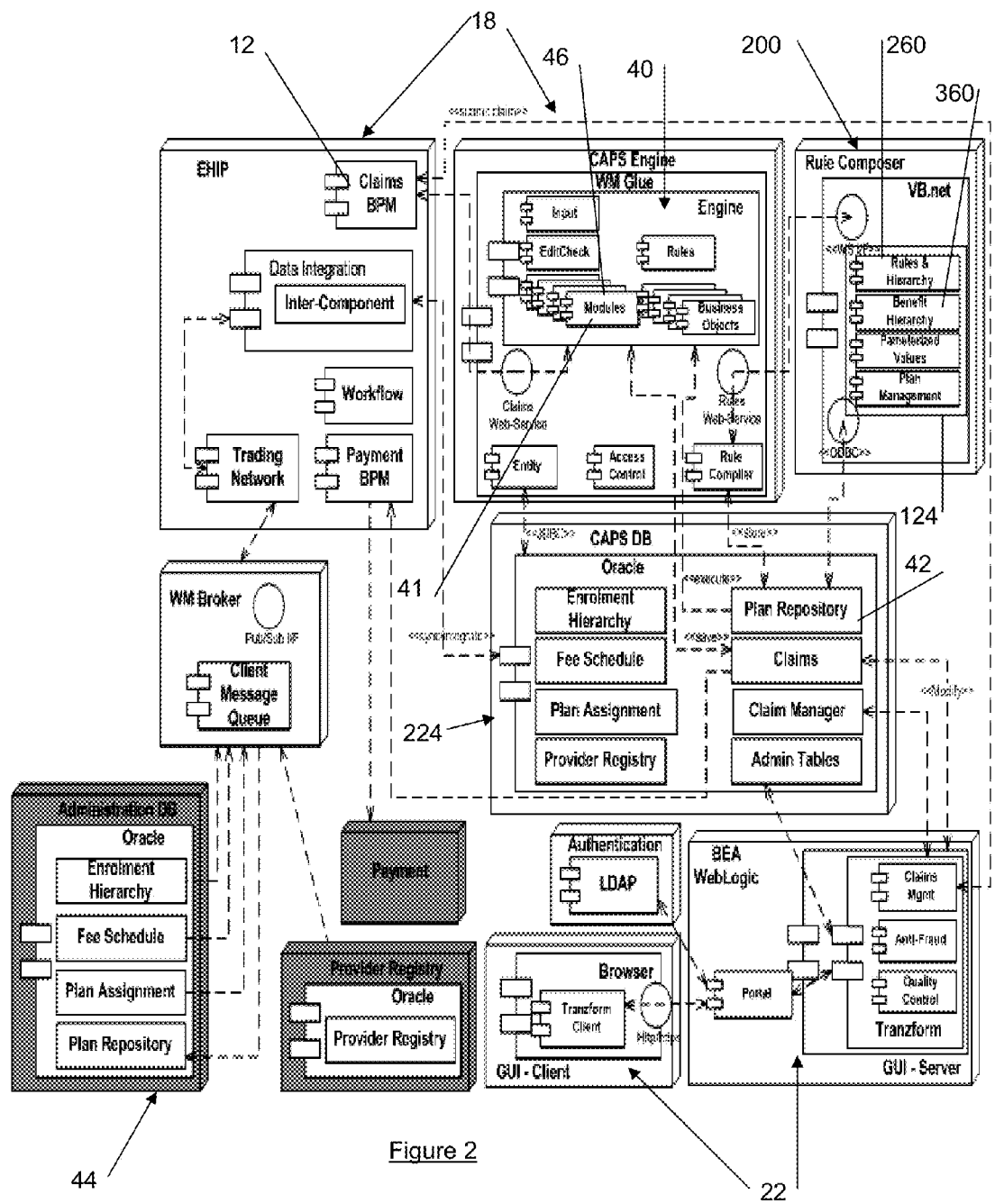
FIG. 2 is a block diagram of an exemplary embodiment of the environment of FIG. 1.

Referring to FIG. 2, shown is a block diagram of main components of the system 10 of FIG. 1. The system 10 has an adjudication engine 40 of the adjudication system 18 that obtains rules 100 and benefits 103a s defined in a deployed plan 42, from the data base 224, for use in adjudication of received claims 12 that reference the plan 42. A plan manager 44 is used to deploy the plan 42, taking into account customized rules 100 and benefits 103 (see FIG. 3) as supplied from a rule engine 200 used to compose and/or otherwise organize the rules 100 into a rule hierarchy 260 and the benefits 103 into a benefit hierarchy 360, further described below. The Plan Manager 44 application lets users create and manage plan 42 coverage templates that are used as the basis of plan administration. Plans 42 are built by combining benefit blocks 326,328 with rules 100 (organized in blocks 226,228) (see FIG. 3) and business-specific parameter-value groupings to create a unique coverage specification (e.g. the deployed plan 42 resident in the memory 224). Once a valid plan 42 reaches its Active Date, the plan can be promoted to a production server for access by the plan manager 44.

A module interface 46 is used by the adjudication engine 40 to load and execute adjudication rules 100 and associated benefits 103, as defined in the deployed plan 42. Through this design, all adjudication rules 100 and associated benefits 103 will fire their respective points in the order of execution (e.g. sequential as listed), as defined in the blocks 226,228,326,328 and/or their relationship models 260,360. The adjudication rules 100 discussed here are the ones attached to the plan 42. For example, the deployed plan 42 consists of elements such as but not limited to: adjudication rules 100 (and their associated block 226,228 configuration via references 227,229); a list of service codes 103 (and their associated block 326,328 configuration via references 327,329); a fee guide for defining the fees payable for services/products accepted in the claim 12 as processed via the adjudication 18 and payment 24 processing (see FIG. 1); and a set of fiscal parameters (e.g. co-insurance, maximum and COB)that are used to customize the rules 100 and/or service codes 103 in the deployed plan 42 that is used in claim 12 processing by the adjudication engine 40. Accordingly, it is recognized that the rules 100 and their associated service codes 103 (via the configuration defined in the hierarchies 260,360) provide for the implementation of the deployed plan 42 used in processing the claims 12. For example, the rules 100 are used to determine whether a given service code 103 can be paid by the plan 42, upon review and processing of the claim 12 information by the adjudication engine 40.

Figure 3:
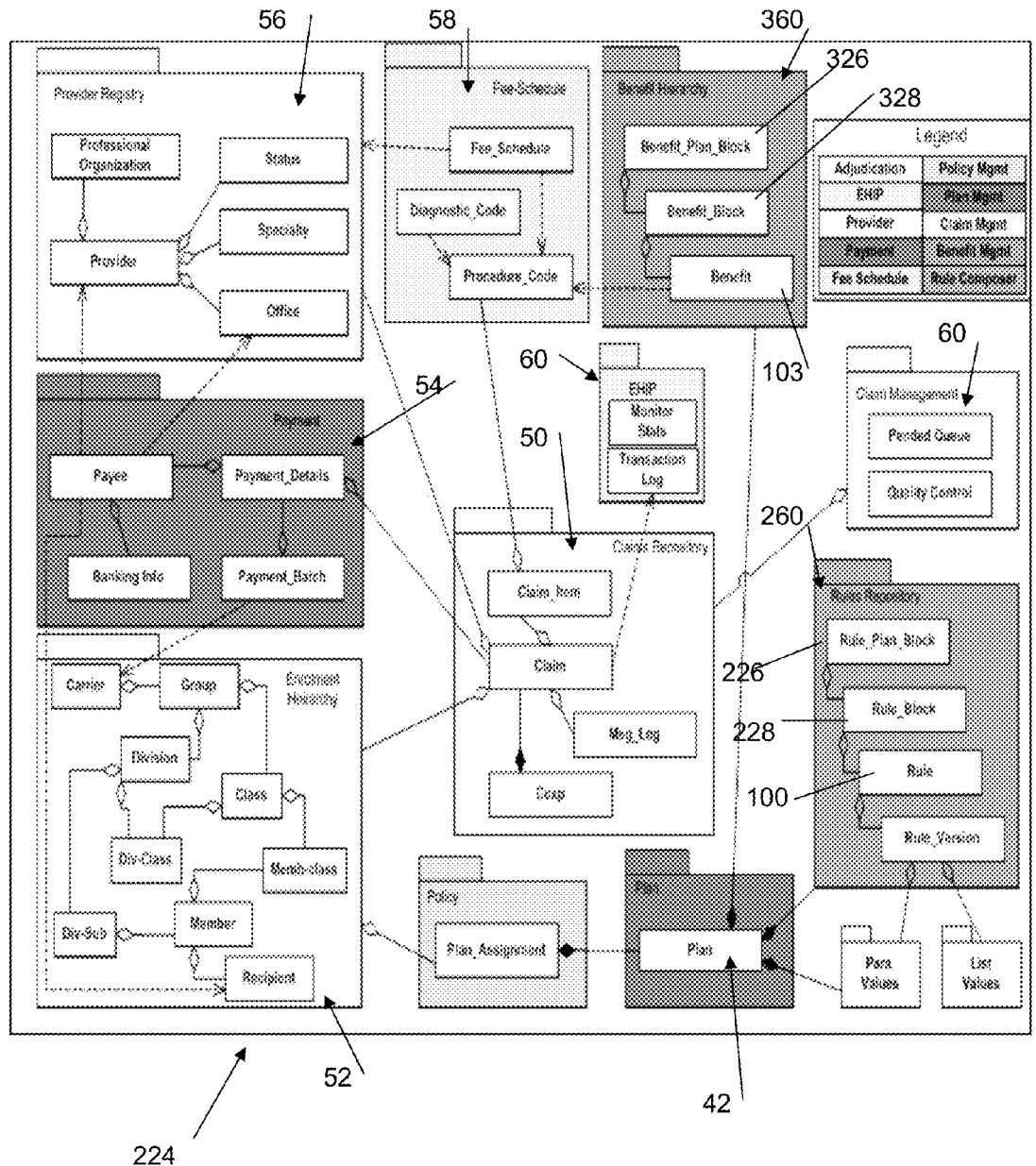
FIG. 3 is a block diagram of a structured memory of the environment of FIG. 1.

Referring to FIG. 3, shown is a further embodiment of the memory 224, including the benefit hierarchy 360 and the rule hierarchy 260, as well as their respective data structures consisting of patent/child (e.g. independent/dependent) blocks 326,328, benefits 103 and blocks 226,228 and rules 100, as further described below. It is recognized that the memory 224 can also include claims information 50, carrier/member/recipient information 52, payment information 54, provider information 56, fee schedules 58, and pended/quality control information 60, as desired.

Claim 12 Concept Overview

Figure 4:
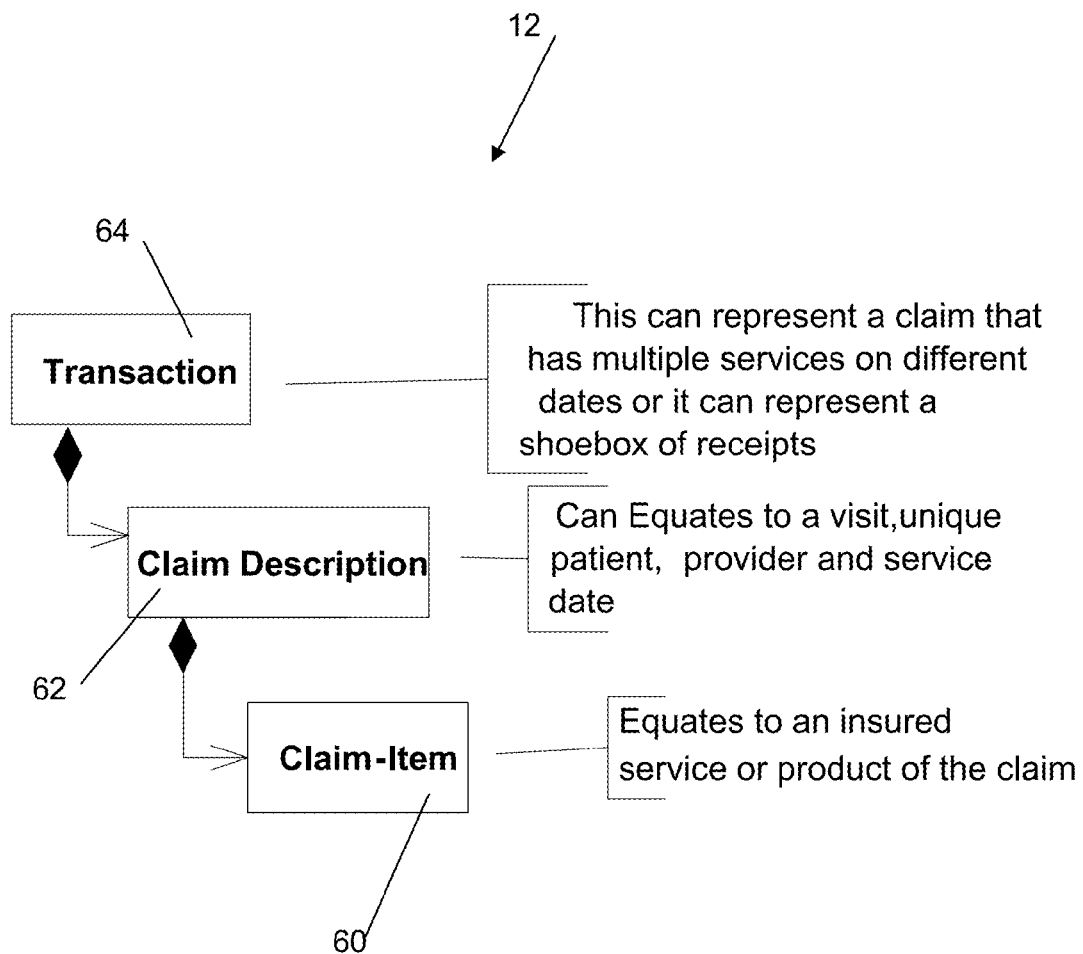
FIG. 4 shows an example claim of the environment of FIG. 1.

Referring to FIGS. 1, 2, and 4, there are many different definitions of a claim 12 based on the perspective of the viewer. The following example definition and design of the claim 12 is from the perspective of the adjudication engine 40 for use in adjudication processing 18 using the configured rules 100 and/or benefit codes 103 of the plan 42 associated with the claim 12. A claim-item 60 can a procedure or product code (e.g. dental teeth cleaning). There can be multiple procedure codes on a single claim 12. Multiple procedure codes can sometimes be packaged together under 1 procedure code, as desired. The claim description 62 can be a unique combination of: Patient (registered with a specific carrier 231 and associated plan 42); Provider (of the insured service(s)/product(s) of the plan 42; and Service date (a measure of when the insured service(s)/product(s) took place). For example, the claim description 62 can describe a visit and resultant outcome of the patient to the provider. Note that multiple claims in a day (e.g. service date) are possible. A transaction 64 can be made up of one or more individual claim descriptions and can, for example: be a box of receipts all submitted at once; extend across multiples patients and providers; possibly represent a single EDI (CDA) claim with multiple service dates; and/or can represent a claim submitted on a periodic frequency (e.g. Labour Force Reentry (LMR) type claims pertaining to retraining/rehabilitation of the patient over an extended period of time).

Adjudication Engine 40

The adjudication engine 40 of the adjudication system 18 is configured to access or otherwise obtain rules 100 and benefits 103 as defined in a deployed plan 42, from the data base 224, for use in adjudication of received claims 12 that reference the plan 42. As further described below, the rules 100 and benefits 103 are configured as rule and benefit objects in respective hierarchies 260, 360.

The adjudication engine 40 can have a comparison module 41 configured for comparing the claim date to each of the an effective date and an expiry date of the container references 229, in order to determine if the respective secondary rule container 228 is part of the set of adjudication rules for use in processing the received claim 12, such that the non-matching dates exclude the respective secondary rule container 228 from being included in an execution order as listed in the corresponding primary rule container 226. Further, the adjudication engine 40 can have the comparison module 41 configured for comparing the claim date to the effective date and/or a expiry date of the rule references 227, in order to determine if the respective adjudication rules 100 associated with the rule references 227 is/are part of the set of adjudication rules 100 for use in processing the received claim 12, such that the non-matching dates exclude the respective adjudication rule 100 from being included in the execution order of their respective secondary rule container 228.

Further, the adjudication engine 40 can have the comparison module 41 configured for comparing the claim date to each of the an effective date and an expiry date of the benefit container references 329, in order to determine if the respective secondary benefit container 328 is part of the set of benefit codes 103 for use in processing the received claim 12, such that the non-matching dates exclude the respective secondary benefit container 328 from being included in an execution order as listed in the corresponding primary benefit container 326. Further, the adjudication engine 40 can have the comparison module 41 configured for comparing the claim date to the effective date and/or a expiry date of the benefit references 327, in order to determine if the respective benefit codes 103 associated with the benefit references 327 is/are part of the set of benefit codes 103 for use in processing the received claim 12, such that the non-matching dates exclude the respective benefit codes 103 from being included in the execution order of their respective secondary benefit container 328.

Accordingly, as further described below, the adjudication engine 40 uses date matching of the references 227,229,327, 329 with the claim date, in order to assemble the set of adjudication rules appropriate to the content of the received claim 12. The comparison module 41 may be part of the adjudication engine 41, as shown, and/or may be part of the database 224 or other third party (not shown).

Adjudication Rules 100

Figure 6A:
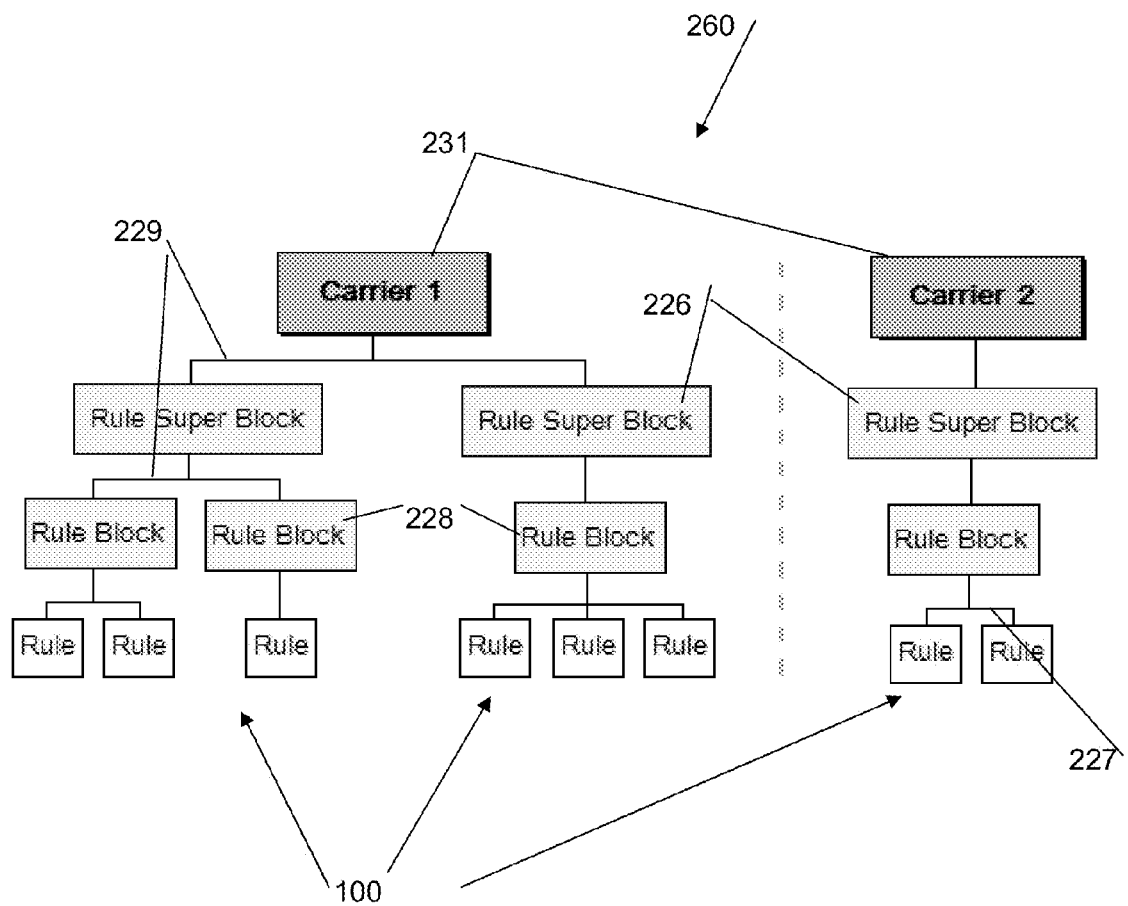
FIG. 6a shows an example embodiment of a rule data structure of FIG. 3.

The Rules 100 can be used by the adjudication engine 40 to determine whether a given service code 103 is authorized to be paid by a plan 42 deployed on behalf of the carrier 231 (see FIG. 6a).

Rule Grammar

Figure 11:
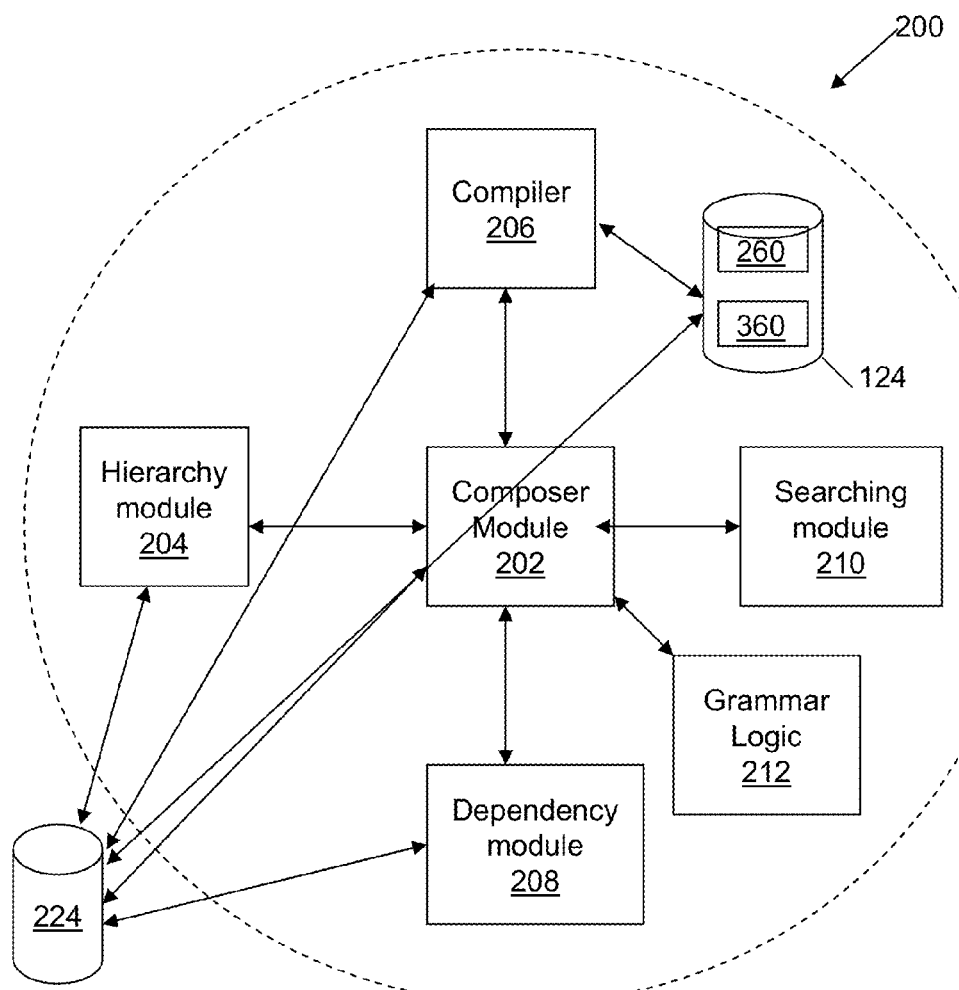
FIG. 11 is an example configuration of the rule engine of FIG. 2.

Reference is next made to FIGS. 4 and 11, which illustrates the generalized structure of a Rule 100. Each rule 100 is a discrete logical expression that, when evaluated, returns a condition of either "TRUE" or "FALSE". One example of the rule 100 is a logical structure of IF {condition(s)} THEN {action(s)} statement. The defined grammar logic 212 is available to a composer module 202 of the rule engine 200 for use in creating/amending the rules 100 for a new plan 42 and/or for facilitating editing of rules 100 in an existing plan 42 obtained from the memory 224 (see FIG. 3). Rules 100 are evaluated by the adjudication engine 40 when claims 12 are submitted by an insured person as will be described below and are used to process claims 12. The complete set of rules 100 in the rules database 224 is the complete set of business logic that will be analyzed by the adjudication engine 40 in processing a claim 12. An action or method 104 of the grammar logic 212 can be performed by the adjudication engine 40 if the condition 102 of the rule 100 is "TRUE". The action 104 is not performed if the condition 102 of the rule 100 is "FALSE".

Conditions 102 of the grammar logic 212 are expressions that result in a true or false answer. The expressions 102 can be comprised of the rule elements described in a Business Object Model (BOM) file. Conditions 102 can be as simple as (OBJ.A=1). A rule 100 can also have multiple conditions 102 joined together by logical operators and each condition can be nested with other conditions. An exemplary more complicated rule 100 with several logical operators and nested conditions is the following:
((OBJ1.A+OBJ1.B=2) OR ((OBJ1.D=10) AND (OBJ2.E=OBJ2.F)) OR (OBJ.FUNCTION(A,B)=25

The elements of the grammar logic 212 that comprise conditions and actions can be specific to the implementation and are described in a Business Object Model (BOM) file. The BOM file is an XML file that provides the rule engine 200 with information on rule elements of the grammar logic 212 available for use creating/editing/deleting the rules 100, such as but not limited to:

Business objects such as a claim

Attributes associated with business object such as a recipient

Methods associated with each business object such as calculations based on the recipient's claim history Data types associated with each rule element Global functions such as those used to manipulate or compare data Actions such as pay or refuse the claim (or line item of the claim)

Operators for comparisons and arithmetic

The rules 100 in the BOM have customizable labels and descriptions that the user will see when interacting with the tool. Changes to the BOM are easily implemented by interacting with a rule composer interface (e.g. interface 102 coupled to the composer module 202) and may not require an application code update. The rule composer interface 102 (see FIG. 13) is in communication with the rule engine 200 which performs the functionality upon instruction by the user. The BOM is a system file that may not be normally modified directly by the user without using the rule composer interface 102.

Figure 5A:
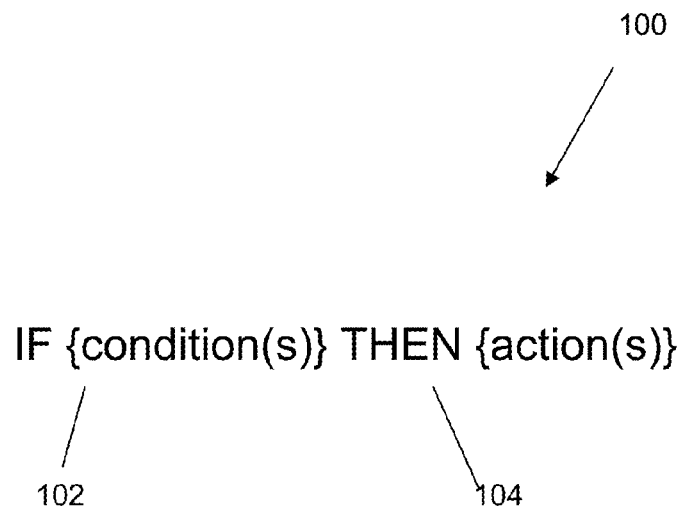
FIG. 5a is example grammar logic of the rule engine of FIG. 2.

An example rule 100a is shown in FIGS. 5a,b. The rule 100a includes an expression 106 and an action 108. When the rule 100a is evaluated by the adjudication engine 40, the adjudication engine 40 will determine whether the expression 106 is in a FALSE condition or a TRUE condition. If the expression is in the TRUE condition, then the adjudication engine 40 will execute the action 104 specified in the rule 100. If the expression is in the FALSE condition, then the adjudication engine 40 will take no action.

In rule 100a, the expression 106 includes a literal value 112, an operator 110 and a parameter value 114. The literal value 112 represents the "StartDate" of the employee submitting the claim 12. It will be appreciated that the literal value 112 of a rule 100 may be any literal value 112 that is available in the database 224. Other literal values 112, for example, may correspond to an employment start date, an employment end date, employment status (e.g. full-time, part-time, contract) or other literal values 112 as will be understood in the art. The literal values 112 may be set to a default value in the rule 100 creation process (via the rules engine 200) and be edited when a rule 100 is attached to the plan 42, as further described below.

It is recognized that business objects are objects to which information is attached, as utilized by the rule engine 200. A claim 12 (see FIG. 1) is an example of a business object. Attached to the claim 12, as received by the adjudication engine 40 (see FIG. 2), is information such as the identity of the claim's recipient and the service for which the claim 12 is being made, as well as the carrier 231 that is responsible (i.e. for providing the configuration of the rules 100 and/or for payment of the claim 12, once adjudicated) for the claim 12. Business objects provide the context in which the rules 100 would be evaluated during adjudication of the claim 12 by the adjudication engine 40. It is recognized that methods can also be attached to the business objects, in order to perform calculations in the context of the business object or retrieves information about the business object that is not available as an attribute. It is recognized that the attributes and methods attached to the business object are referenced in the rule(s) 100 using a syntax of the rule grammar of the grammar logic 212, such as object.attribute and object.method syntax respectively.

Attributes are the pieces of information attached to a business object. The attributes can have values that can be used for comparisons or calculations, depending on the data type, in order to assist in execution of the rules 100 when processing of the received business object (e.g. claim 12) by the adjudication engine 40.

Figure 9:
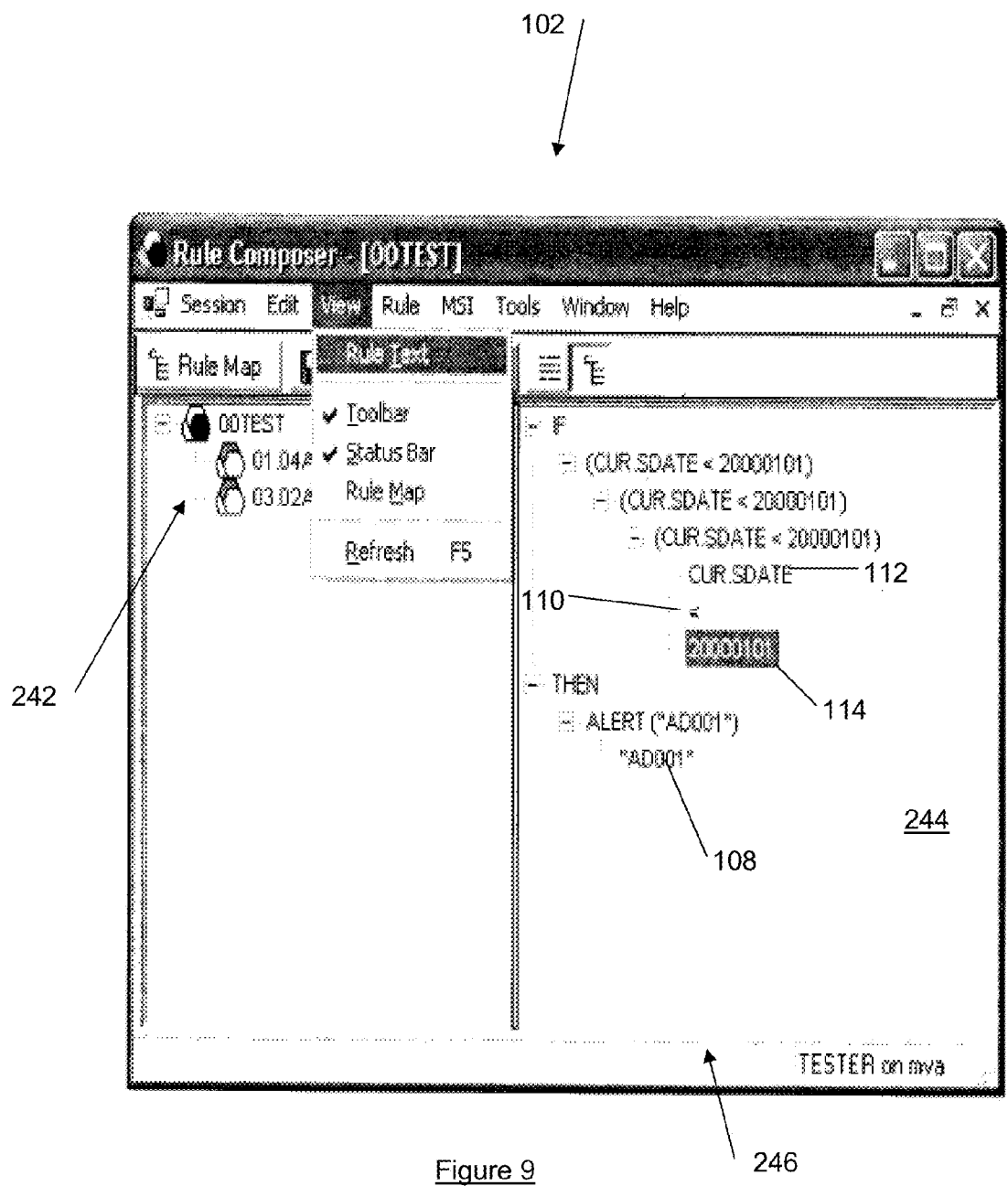
FIG. 9 is another example interface of the rule engine 20 of FIG. 2.

The methods and functions associated with the business object (e.g. via the rules 100) are used to return a calculated value and/or a true/false logic decision, return a state, and/or perform action(s). Operators are uses when comparing two or more values and/or in joining two or more conditions. The logical operators AND, OR, AND NOT, OR NOT, and NOT of the grammar logic 212 are used in the rules 100, as input through the user via the rules manager 202. Other operators of the grammar logic 212 can be such as but not limited to: EQUALS; NOT EQUALS; etc. An example of a rule 100 in the rule hierarchy 260 is shown in FIG. 9.

Rule Blocks 228 and Superblocks 226

Referring to FIGS. 2,3, the blocks 226, 228 and rules 100 are used as rule objects in the hierarchy 260, thus providing for multiple instances of the same rule object in any particular rule hierarchy 260 (i.e. specific instances of coupled blocks 226,228 and rules 100) configuration.

A Rule Block 228 is a logical grouping of Rules 100, such that specific instances of the Rule Blocks 228 have a name and description but may not have any inherent processing logic. A Rule Super Block 226 is a logical grouping of Rule Blocks 228. Rule Super Blocks 226, such that specific instances of the Rule Blocks 226 have a name and description but may not have any inherent processing logic. A name and description in a second language can be supported. The Rule Super Block 226 can be used to define the execution order of the blocks 228 listed/referenced 229 therein (e.g. each referenced block 228 in the list of blocks 228 in the super block 226 is processed in sequential order).

The organization of adjudication rules 100 is represented by Rule Containers 226, 228 (e.g. Super Blocks and Blocks) and the Rules 100 within them. The adjudication rules 100 and their organization in the hierarchy 260 are stored as data organized via the blocks 226,228 within the database 224. The rule data is then used by the adjudication engine 40 to process claims 12 received. Referring to FIG. 6a, the rule hierarchy 260 consists of Carriers 231, Rule Containers 226, 228, and Rules 100. Carrier 231 is the root container for the Rule Hierarchy 260. Rule Objects refer to both Rules 100 and Rule Containers 226,228, such that Rule Super Blocks 226 contain Rule Blocks 228 and Rule Blocks 228 contain Rules 100, for example, as a container relationship structure used to organize and define the rule hierarchy 260.

The term Rule 100 refers to a specific implementation of the processing logic of a business policy. A Rule Block 226, 228 is a logical grouping of Rules 100. Rules 100 belong to a Rule Block 226,228 by way of a reference 227,229 (also referred to as Rule Inclusions). Rule Objects exist at the specified level in the hierarchy 260 (specific configuration of the blocks 226, 228 and rules 100 through the references 227,229. The Rule Hierarchy 260 is built on references 227 to Rule Objects rather than containing the Rule Objects; where Rule Objects only exist once in the database, regardless of how many times they appear in the Rule Hierarchy 260. For example, a named rule 100 (e.g. an instance of the rule 100) is an example of a rule object that is then referenced 227 in the containers 226,228 of the hierarchy 260. Also, it is recognized that named containers 226,228 (e.g. an instance of the container 226,228) is an example of a rule object that is then referenced 229 in the containers 226,228 of the hierarchy 260. The use of references 227,229 provides for efficient reuse of common Rules 100 and Rule Containers 226,228 in a large Rule Hierarchy 260. When changes are required on a Rule Object, the changes need only be applied to the single instance rather than in multiple copies.

Referring to FIG. 6a, the rules 100 are organized into a collection of primary 226 and secondary 228 containers, also referred to as superblocks 226 and blocks 228. It is recognized that a particular rule 100 may exist only once in the database 224 but can be found in multiple containers 226,228 by one or more references 227,229, such that the reference 227 is a link between a rule 100 and a secondary container 228 and a reference 229 is a link between a secondary container 228 and a primary container 226. Accordingly, rule objects can exist only once in the database 224, regardless of how many times the appear in the rule hierarchy 260, since the rule hierarchy 260 can be built on references to the rule objects rather than containing the rules objects themselves. One advantage in using references 227,229 is that it can allow for reuse of common rules 100 and rule containers 226,228 in a complex rule hierarchy 260, such that when changes/modifications are done on a rule object, the changes/modifications are only applied to the single instance of the rule object rather than to multiple copies of the rule objects.

It is recognized that the rules 100 linked via references 227 to the secondary containers 228 are also included in the primary containers 226 via the references 229, e.g. a primary container 226 contains all contents of the linked 229 secondary containers 228 (e.g. as a child of the primary container 226) and the contents of the secondary containers 228 are the linked 227 rules 100 (e.g. the rules 100 are children of the secondary containers 228). Hence, the described relationship between the containers 226, 228 and the rules 100 can be such that each rule is a dependent/child of the associated secondary container 228 and each secondary container in turn is a dependent/child of the primary container 226. As well, each primary container 226 is a dependent/child of one or more carriers 231, as shown by example in FIG. 6a.

References 227,229, 327,329

Figure 12A:
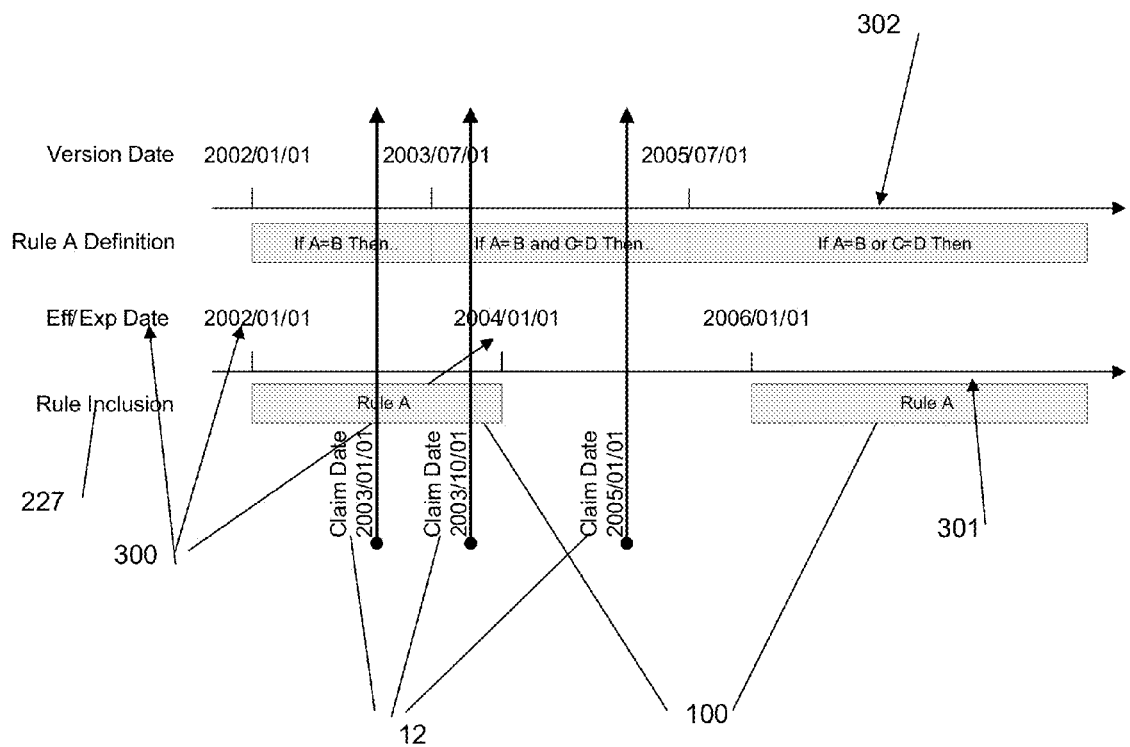
FIG. 12a is an example configuration of the rules of FIG. 3.

Referring to FIGS. 12a,b, a Rule Version is a specific implementation of a Rule 100 using the rule grammar. Different implementations may be valid at different points in time in time span 301 ordering of the rules 100 and corresponding blocks 228. A version date 300 of a rule version determines which implementation is applicable over the history of the Rule 100. A Rule 100 is a member of a Rule Block 228 by way of the reference 227 and those references can be called Rule Inclusions. The order of Rule Inclusions 227 within a Rule Block 228 determines the order of processing by the adjudication engine 40 of the rules associated via the hierarchy 260 for the particular plan 42 associated (e.g. via a plan ID associated with the patient name of the claim 12) with the received claim 12 for processing (see FIG. 3). The chronological dependency of Rule Inclusions 227 for a Rule 100 within a Rule Block 228 is called a Rule Timeline 302.

A Rule Block 228 is a member of a Rule Super Block 226 by way of the reference 229 and those references can be called Rule Block Inclusions 229. The order of Rule Block Inclusions 229 within a Rule Super Block 226 can determine the order of processing by the adjudication engine 40. It is recognized that Rule Block Inclusions 229 may or may not have a time dependency.

Accordingly, rule processing order by the adjudication engine 40 is configured in the hierarchy via the references 227,229. For example, Rule Inclusions 227 can have an effective date and expiry date (e.g. on the timeline 302). These dates specify the start and end of when the Rule 100 is considered to belong to the Rule Block 228. The Rule Inclusions 227 that a claim 12 will encounter during processing depends on a service date of the claim 12, as well as the plan ID for associating the claim 12 with the rules 100 and benefits 103 related to the claims via the corresponding deployed plan 42. Each Rule 100 referenced by the Rule Inclusions 227 may have multiple versions of the logic implementation. The rule version 300 used for a claim 12 can be the most recent one relative to the claim 12 service date. Each version 300 can have a distinct Version Date that specifies the start date of the version 300. The end date of a Rule Version 300 is implied by the start date of the next version, for example or can be independently specified, as desired. Rule Inclusions 227 may or may not point to a specific Rule Version 300, where the version 300 used during claim 12 processing can be determined by the claim 12 date.

Figure 10:
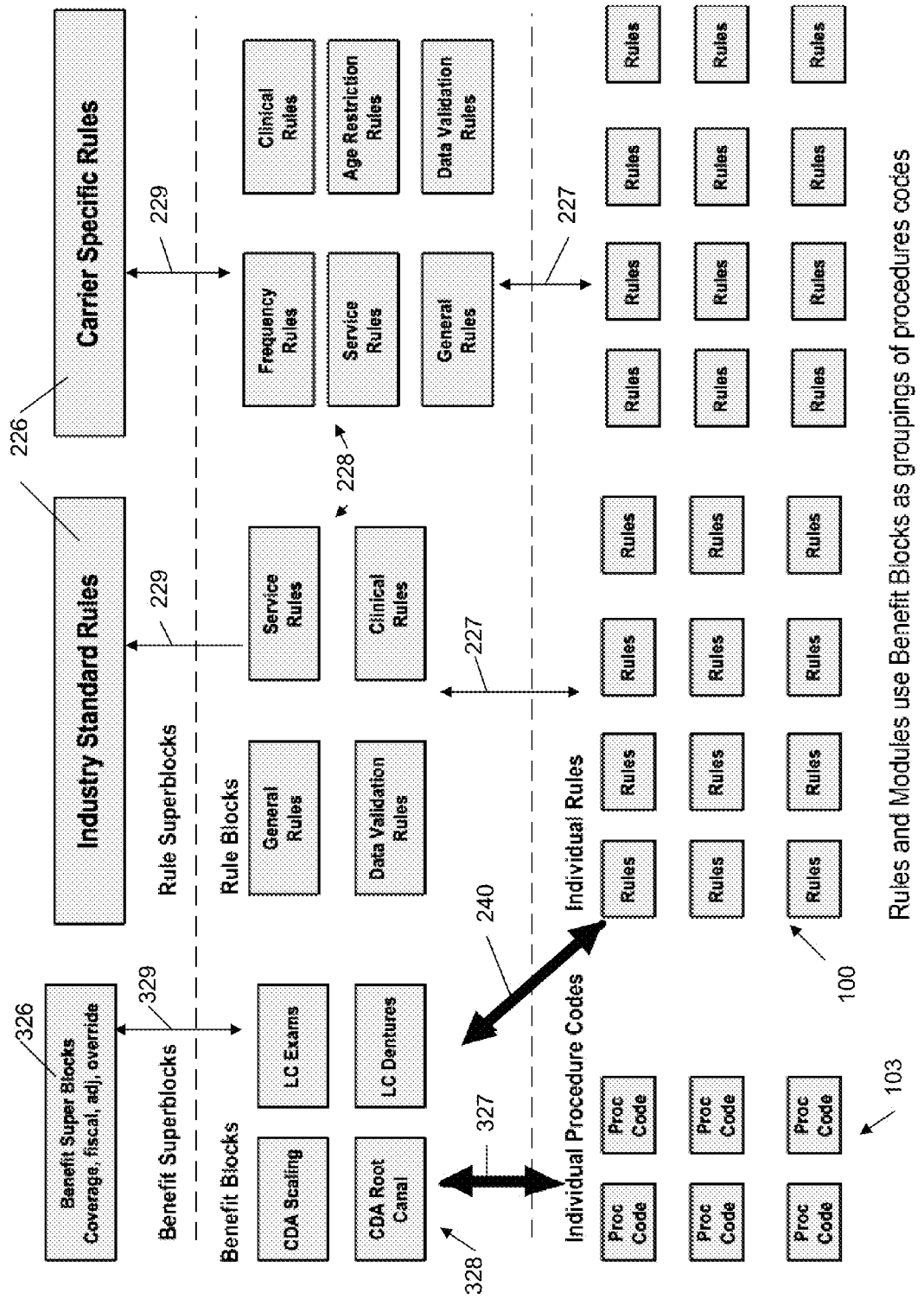
FIG. 10 is an embodiment of the rule and service code data structure of FIG. 3.

Further, a benefit Version is a specific implementation of a benefit 103. Different implementations may be valid at different points in time in time span 301 ordering of the benefit 103 and corresponding blocks 328. A version date 300 of a benefit version determines which implementation is applicable over the history of the benefit 103. A benefit 103 is a member of a benefit Block 328 by way of the reference 327 and those references can be called benefit Inclusions. The order of benefit Inclusions 327 within the Block 328 can determines the order of processing by the adjudication engine 40 of the benefits associated via the hierarchy 360 (as well as linked to specific rules via links 240—see FIG. 10) for the particular plan 42 associated (e.g. via a plan ID associated with the patient name of the claim 12) with the received claim 12 for processing (see FIG. 3). The chronological dependency of benefit Inclusions 327 for a benefit 103 within a Block 328 is called a Timeline 302.

A Block 328 is a member of a Super Block 326 by way of the reference 329 and those references can be called Block Inclusions 329. The order of benefit Block Inclusions 329 within a benefit Super Block 326 can determine the order of processing by the adjudication engine 40. It is recognized that Block Inclusions 229 may or may not have a time dependency.

Accordingly, benefit processing by the adjudication engine 40 is configured in the hierarchy via the references 327,329. For example, Inclusions 327 can have an effective date and expiry date (e.g. on the timeline 302). These dates specify the start and end of when the benefit 103 is considered to belong to the Block 328. The Inclusions 327 that a claim 12 will encounter during processing depends on a service date of the claim 12, as well as the plan ID for associating the claim 12 with the rules 100 and benefits 103 related to the claims 12 via the corresponding deployed plan 42. Each benefit 103 referenced by the Inclusions 327 may have multiple versions of the logic implementation. The benefit version 300 used for a claim 12 can be the most recent one relative to the claim 12 service date. Each benefit version 300 can have a distinct benefit Version Date that specifies the start date of the benefit version 300. The end date of a benefit Version 300 is implied by the start date of the next benefit version, for example or can be independently specified, as desired. Inclusions 327 may or may not point to a specific benefit Version 300, where the benefit version 300 used during claim 12 processing can be determined by the claim 12 date.

FIG. 12a illustrates the Timeline 302 and Version 300 concepts with example rules 100. The definition of Rule A has three versions 300 with Version Dates of 2002/01/01, 2003/07/01 and 2005/01/01. Rule A is included in the example Rule Block 228 from 2002/01/01 to 2004/01/01 and again from 2006/01/01 with no expiry date. Between 2004/01/01 and 2006/01/01 Rule A is not included in the Rule Block 228. The first claim 12 with a date of 2003/01/01 will see the first version 300 of Rule A. The second claim 12 with a date of 2003/10/01 will see the second version 300 of Rule A. The third claim 12 will not see any version 300 of Rule A because the Rule Inclusion 227 is not in effect at that time. Accordingly, the rule inclusion 227 can be used to coordinate which rule 100 at which time is relevant for use in adjudication processing 18 (see FIG. 1) based matching the date of the rule inclusion 227 with the claim date.

When multiple Rule Versions 300 exist for a given Rule Inclusion 227, the appropriate version date can be shown as child nodes under the Rule Inclusion 227. The version 300 dates shown can fall between the start and end of the respective time span 302 dates. For example, a Rule 100 can have multiple versions 300 grouped under different version dates (e.g. 2000/03/22 and 2007/04/08). For each time span 302 the appropriate version dates can be displayed as child nodes of the Rule 100 rule inclusion 227 node of the hierarchy 260 (see FIG. 6a).

Figure 12B:
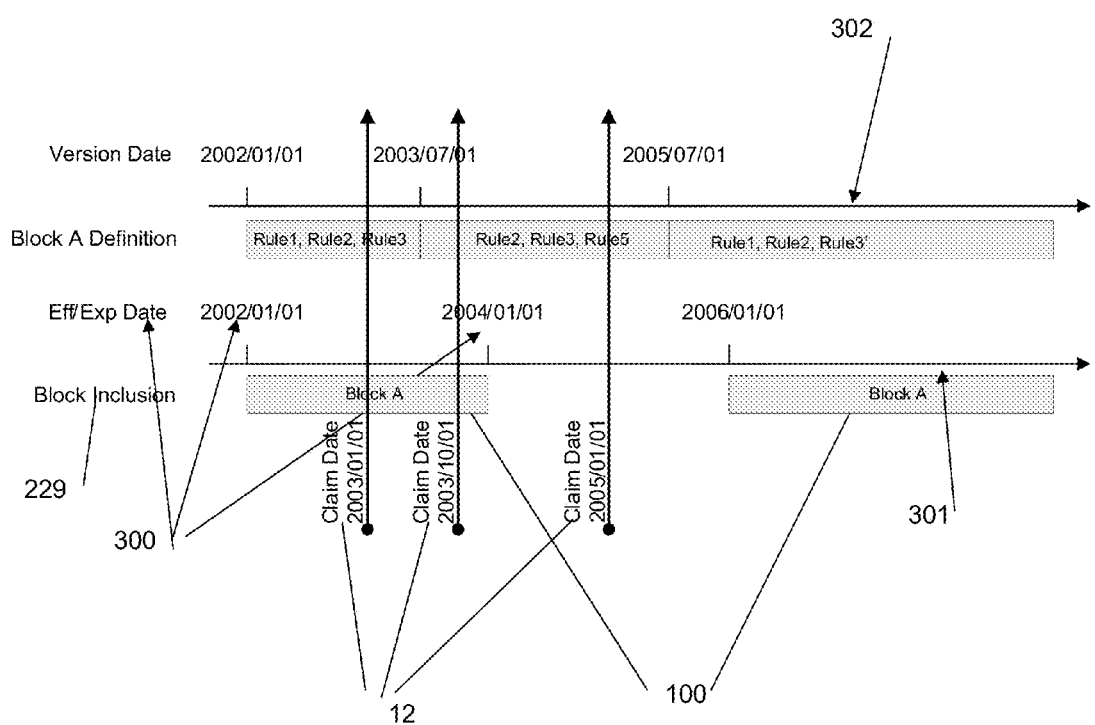
FIG. 12b is an example configuration of the rule blocks of FIG. 3.

FIG. 12b illustrates the Timeline 302 and Version 300 concepts with example blocks 228. The definition of block A has three versions 300 with Version Dates of 2002/01/01, 2003/07/01 and 2005/01/01. Block A is included in the example super Block 226 from 2002/01/01 to 2004/01/01 and again from 2006/01/01 with no expiry date. Between 2004/01/01 and 2006/01/01 block A is not included in the super Rule Block 226. The first claim 12 with a date of 2003/01/01 will see the first version 300 of block A. The second claim 12 with a date of 2003/10/01 will see the second version 300 of block A. The third claim 12 will not see any version 300 of block A because the Inclusion 229 is not in effect at that time. Accordingly, the inclusion 229 can be used to coordinate which block 228 at which time is relevant for use in adjudication processing 18 (see FIG. 1) in the corresponding superblock 226, based matching the date of the inclusion 229 with the claim 12 date.

When multiple Rule Versions 300 exist for a given Inclusion 229, the appropriate version date can be shown as child nodes under the Inclusion 229. The version 300 dates shown can fall between the start and end of the respective time span 302 dates. For example, a block 228 can have multiple versions 300 grouped under different version dates (e.g. 2000/03/22 and 2007/04/08). For each time span 302 the appropriate version dates can be displayed as child nodes of the inclusion 229 node of the hierarchy 260 (see FIG. 6a).

It is recognized that similar use of references 327, 329 for the benefits 103 can be said for FIGS. 12a,b, whereby the benefit inclusion 327 can be used to coordinate which benefit 103 at which time is relevant for use in adjudication processing 18 (see FIG. 1) based matching the date of the benefit inclusion 227 with the claim 12 date. Further, it is recognized that, the inclusion 329 can be used to coordinate which block 328 at which time is relevant for use in adjudication processing 18 (see FIG. 1) in the corresponding superblock 326, based matching the date of the inclusion 329 with the claim 12 date.

Benefit Blocks 328 and Superblocks 326

As mentioned above, the plans 42 are built by combining, via links 240 between rules 100 and benefits 103 (see FIG. 10), benefit blocks 326,328 with rules 100 and associated rule blocks 226,228 and business-specific parameter-value groupings to create a unique coverage specifications, which are applied to the received claims 12 as processed by the adjudication engine 40, see FIG. 3. Once a valid plan 42 reaches its Active Date, the plan 42 can be promoted to a production server (e.g. storage 224) for eventual access by the adjudication engine 40, once deployed in the storage 224 (see FIG. 3). Accordingly, the Plan 42 is a grouping of various attributes (e.g. of the hierarchies 260, 360) to assist in determining whether a dental service (or other insured products/services) of the claim 12 is covered and any restrictions on the reimbursement, a result of the adjudication processing 18.

Figure 6B:
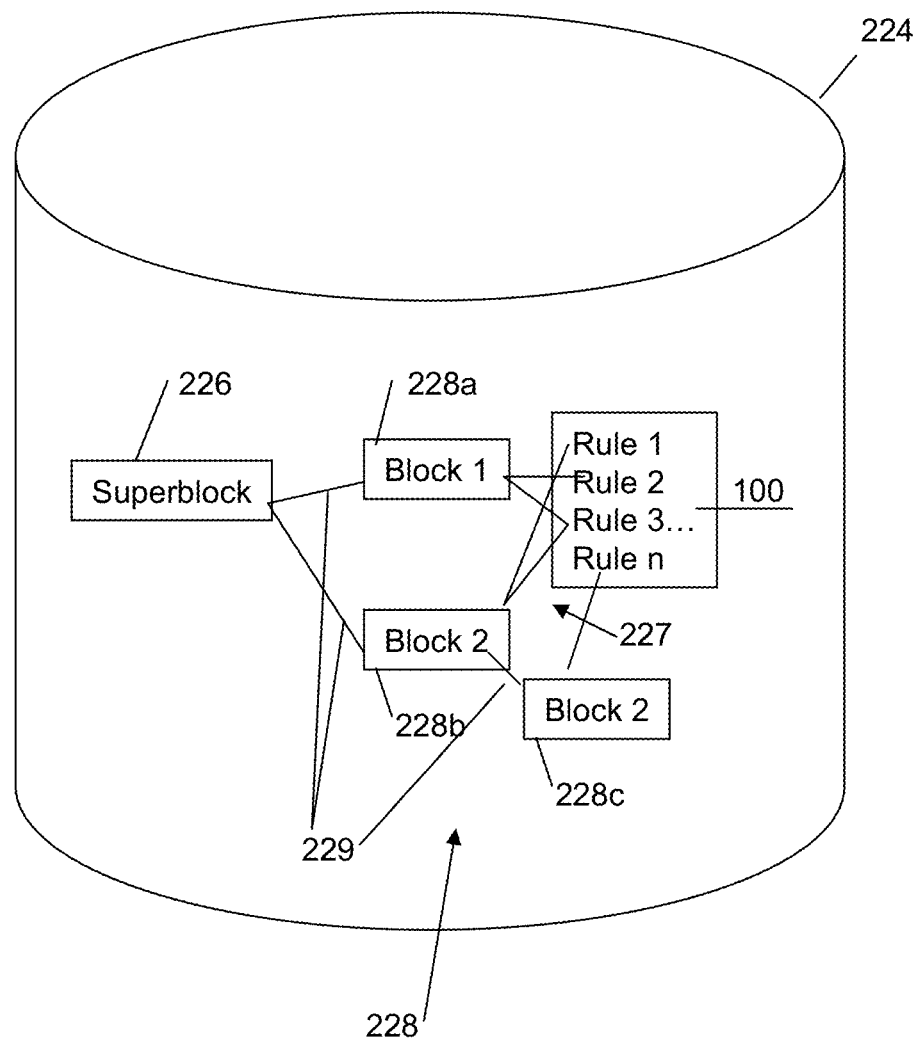
Figure 6C:
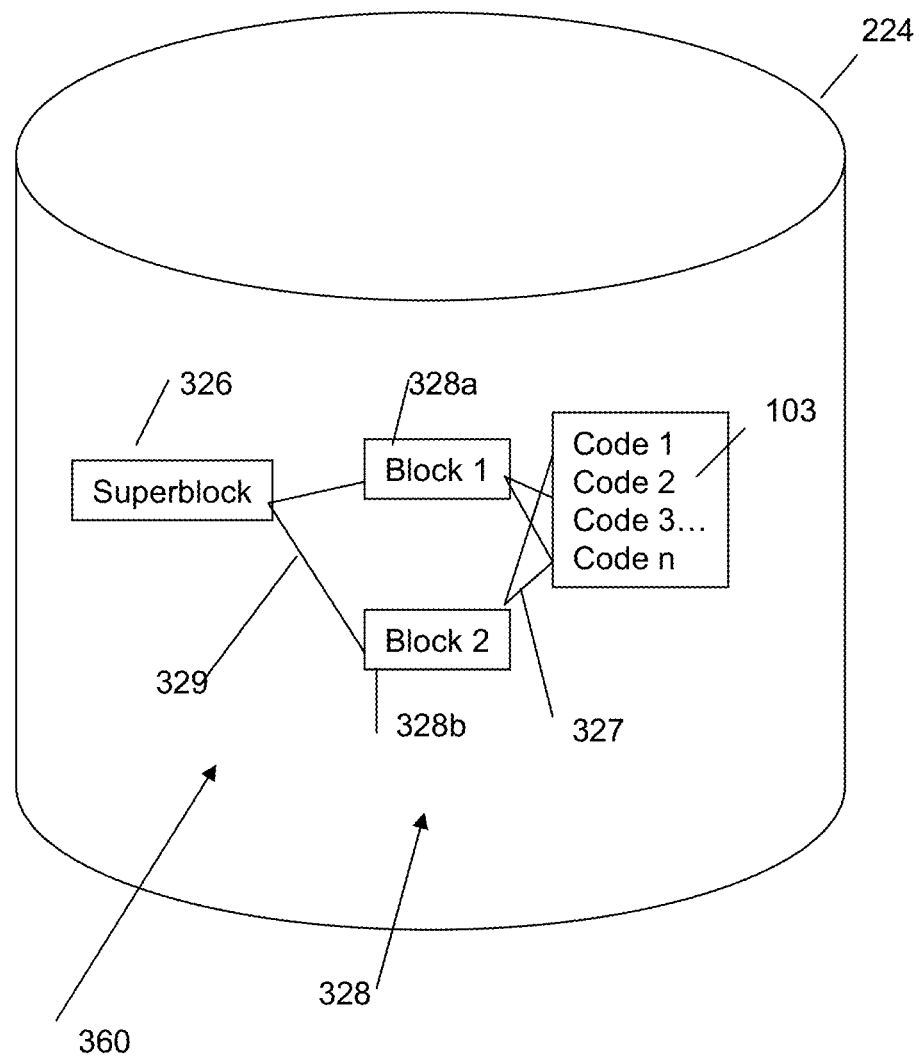
FIG. 6c shows an example embodiment of a service code data structure of FIG. 3.

Referring to FIG. 6c, a benefit hierarchy 360 allows users to create unique plan 42 configurations from a shared set of plan and benefit data, as well as to provide for instruction to the adjudication engine 40 in adjudication of the claims 12 that are associated with the respective deployed plan 42. The benefit hierarchy 360 can crosses multiple lines of business such as dental, drug, medical, and vision. Generally, each benefit super-block 326 can contain only blocks 328 of benefits 103 of the same business. However, for reporting purposes users can define super-blocks 326 that cross multiple lines of business. There can be basic elements in the benefit hierarchy 360, such as but not limited to: Benefit-Super-Blocks 326, Benefit-Blocks 328, and Benefits 103, which are linked to one another similarly to the arrangement of the rule blocks 226,228 and rules 100 (see FIGS. 6a,b), using references 327,329, as further described below.

Benefit Super-blocks 326 represents a grouping of benefit blocks 328 used to create an overall coverage list for the plan 42, such that the benefit super blocks 326 can be used to define the execution order of the blocks 328 listed/referenced 329 therein (e.g. each referenced block 328 in the list of blocks 328 in the super block 326 is processed (e.g. in sequential order as listed in the blocks 326). The Super Benefit Block 326 can be identified as an Inclusive or Exclusive grouping, for example. A Super Benefit Block 326 can include an Identifier, a Label Name, a Type and a Description. The Benefit Super-blocks 326 can be the highest object in the hierarchy 360, and are assigned to a plan 42, or as an override to an enrollment hierarchy (not shown). Super-blocks 326 can be assigned to the plan 42 and/or become a plan component. A super-block 326 can contain any number of benefit blocks 328, via references 329. Benefit blocks 328 can be included or excluded, and are time-lined via the references 329, allowing them to change over time if required. Benefit Super-Blocks 326 can be created in a number of different types, such as but not limited to: Coverage—include or exclude specific benefit blocks 328; Override—include or exclude benefits 103 and override plan coverage; Fiscal—assign specific Coinsurance, Deductible, and Maximum methods/functions; and Adjudication—assign specific rules 100 (for example, Pricing, COB, etc.) depending on business requirements.

A Benefit block 328 represents a grouping of other benefit blocks 328 or a logical grouping of benefit/service codes 103. A Benefit Block 326 can include an Identifier, a Label Name, a Type and a Description. These blocks 328 can represent industry-level categorization or carrier-specific groupings. Benefit blocks 328 can be created once and may be referenced by multiple plans 42. Benefit blocks 328 can be time-lined, meaning that a benefit block 328 can contain a different number of benefits 103 over time, as referenced by the references 327, providing for a benefit 103 that is no longer covered to remove itself from the block 328 (and in turn any associated plans 42 will no longer cover the benefit 103).

Benefits 103 generically refer to a claimable item such as a dental procedure or a pharmacy prescription, for example. A benefit code 103 is a re-usable component. Each benefit 103 can be defined only once, and can have a relationship 327 with multiple blocks 328. Each benefit 103 is defined with attributes such as benefit code, label, and line of business (dental/medical etc.). Most benefit codes 103 can be derived from the CDA industry standards, for example. Accordingly, benefit objects can exist only once in the database 224, regardless of how many times the appear in the rule hierarchy 360, since the benefit hierarchy 360 can be built on references to the benefit objects rather than containing the benefit objects themselves. One advantage in using references 327,329 is that it can allow for reuse of common benefits 103 and benefit containers 326,328 in a complex benefit hierarchy 360, such that when changes/modifications are done on a benefit object, the changes/modifications are only applied to the single instance of the benefit object rather than to multiple copies of the benefit objects.

A Benefit Block 326,328 is identified as a Type to indicate what the grouping is supporting. The following are valid types of benefit blocks 326,328, for example but not limited to: Coverage List—groupings to create the coverage list of service codes 103, such that these groupings can be made in benefit blocks 328 that will support the coinsurance structure of a policy; Plan—groupings created to support the fiscal restrictions within a plan 42, for example: if frequency is to be attached to 'exams', the Plan Specialist will group benefit blocks 326,328 and/or service codes 103 together an create a benefit block label 'exams', which can then allow the Plan Specialist to create a rule 100 using this label to set up parameterized values and structure the frequency as required by the policy of the plan 42; and Adj Logic—groupings created to support the dental (or other insurance types) interaction rules 100 required by the insurance industry (e.g. can be carrier specific, for example).

Parameterized Values of the benefit codes 103 can be attributes within a plan 42 or Rule 100 (e.g. via link 240—see FIG. 10) where the user can enter in a specific value. Benefit Inclusion is a term used to identify that a particular service code 103 or grouping of service codes 103 are additionally being covered outside of the defined plan 42—coverage list. Benefit Exclusion is a term used to identify that a particular service code 103 or grouping of service codes 103 are additionally being excluded from coverage outside of the defined plan 42—coverage list. Plan Components references functionality that is coded in the adjudication engine 42 to perform various functions related to the service codes 103 and rules 100 associated with the plan 42 used to assist in adjudication of the received claim(s) 12.

The contents of benefit blocks 328 are used to define a list of service codes 103 that are consider as eligible dental (or other insurance types) services for reimbursement. Benefit Block 326,328 labels are concise and make business sense. Benefit blocks 326,328 are intended to be re-used in the benefit hierarchy 360, and can also identify the coinsurance groupings of the covered insured services. Benefit block labels, when re-used for the fiscal coinsurance groupings, can be returned in a claims experience log (not shown).

As discussed above for use of references 227,229 with rules 100 and rule blocks 226,228, the benefit blocks 326,328 and benefit codes 103 can also use similar references 327,329 to Set Expiry Dates for Benefit(s) 103 in a Block 328, and Set Effective Dates for Benefits 103 in a Block 328. As well, the references 329 can be used to set the respective linked block(s) 328 with the super block(s) 326, thereby facilitating the time dependent and/or version 300 dependent inclusion of the codes 103 in the blocks 328 and/or time dependent and/or version 300 dependent inclusion of the blocks 328 in the superblocks 326, as desired, see FIG. 12b.

Accordingly, it is recognized that a super-block 326 may contain any number of benefit blocks 328. Benefit blocks 328 can be included or excluded and are time-lined 302 using the references 329, thus providing for the contents of the blocks 326 to change over time, if desired. For example, selecting a new expiry date for all selected blocks 328 will provide for the specified blocks 328 (via the reference(s) 329) will no longer be functional in this super block 326 after the expiry date has lapsed. Also, for example, selecting a new effective date for all selected blocks 328 will provide for the specified blocks will not be functional in this super block 326 until the effective date has been reached. Further, benefit super blocks 326 can be interpreted (e.g. sequentially) in the specified order in the hierarchy 360, in ascending order; benefits 103 that are part of an excluded block 328 are ignored if they are part of a later included block 328, for example.

It is recognized that the above described benefit hierarchy 360 is used by a plan manager 44 to assemble the rules 100 and benefit codes 103 (as ordered by the blocks 226, 228,326, 328 and associated references 227,229,327,329 to create a specific plan version 42 that is then stored for use by the adjudication engine 40 in processing the received claims 12 that are associated with the specific plan version 42 as deployed in the memory 224.

Rule Hierarchy 260 and Benefit Hierarchy 360

As shown in FIGS. 6a,b, rules 100 are grouped into blocks 228 and superblock 226 for processing by the engine 40 and for visualization by the user when using the rule/benefit composer engine 200. A superblock 226 can be the highest container in the hierarchy 260 (other than the specific carrier 231) such that each of the other blocks 226,228 and rules 100 related to the superblock 226. There may be no limit on the number of blocks 226,228 so a particular rule hierarchy 260 can theoretically have any number of tiers (e.g. having block 226 to block 226 links, block 226 to block 228 links, block 228 to block 228 links, and block 228 to rule 100 links, as well as block 226 to rule 100 links where appropriate). The grouping of rules 100 into blocks 228 and superblocks 226 is dependent on the wishes of the user. As an example, a user of the engine 200 may wish to configure the hierarchy 260 to have a superblock 226 for standards set by the Canadian Dental Association and a second superblock 226 for customized business logic for processing claims 12. As another example, a user may wish to have a superblock 226 for different insurance types such as dental, automobile, life insurance as will be appreciated. The superblock 226 node contains child nodes representing a first level of rule blocks 228. The first level of rule blocks 228 may contain additional rule blocks 228 or rules, depending on how many container levels the hierarchy 260 is configured for.

The rule hierarchy 260 can be both an interactive visual representation (e.g. with the user via the composer engine 200) of the relationship(s) between rule objects, and a data structure in the rules database 224 which describes the relationship between rule objects for use by the adjudication engine 40 in processing of the claims 12. It will be appreciated that each rule object (i.e. superblock 226, blocks 228 and rules 100) may exist only once in the database 224 but is referenced by each other rule objects that it is related to in a parent or child relationship of the hierarchy 260. For example, in a situation where there is only one superblock 226, each other rule object is referenced 229 in the database 224 by the superblock 226. The reference(s) 227, 229 may be implemented via generic fields in a data record that stores data (for e.g. attributes) of the blocks 226,228. In another embodiment, a data record of the blocks 226,228 may reference 227,229 a (e.g. dynamic) table that contains references 227, 229 to each of the other rule objects that are in a child relationship with the block. The references 227, 229 to rule objects may be in the form of a globally unique identifier or GUID, or other type of identifier, which is a type of identifier used in the engine 200,40 applications in order to provide a reference number which is unique in any context (hence, "globally"), for example, in defining the internal reference for a type of access point in a set of stored instructions for execution by the computer processor 150 in FIG. 13, or for creating unique keys in a database. The reference 227 to a rule 100 can also indicate whether a rule object is a child or parent of another rule object (e.g. rule block 228).

The benefit hierarchy 360 can be both an interactive visual representation (e.g. with the user via the composer engine 200) of the relationship(s) between benefit objects, and a data structure in the database 224 which describes the relationship between benefit objects for use by the adjudication engine 40 in processing of the claims 12. It will be appreciated that each benefit object (i.e. superblock 326, blocks 328 and benefit 103) may exist only once in the database 224 but is referenced by each other benefit objects that it is related to in a parent or child relationship of the hierarchy 360. For example, in a situation where there is only one superblock 326, each other benefit object is referenced 329 in the database 224 by the superblock 326. The reference(s) 327, 329 may be implemented via generic fields in a data record that stores data (for e.g. attributes) of the blocks 326,328. In another embodiment, a data record of the blocks 326,328 may reference 327,329 a (e.g. dynamic) table that contains references 327, 329 to each of the other benefit objects that are in a child relationship with the block. The references 327,329 to benefit objects may be in the form of a globally unique identifier or GUID, or other type of identifier, which is a type of identifier used in the engine 200,40 applications in order to provide a reference number which is unique in any context (hence, "globally"), for example, in defining the internal reference for a type of access point in a set of stored instructions for execution by the computer processor 150 in FIG. 13, or for creating unique keys in a database. The reference 327 to a benefit 103 can also indicate whether a benefit object is a child or parent of another benefit object (e.g. benefit block 328).

FIG. 6b illustrates the structural data relationship between rule objects. Rule objects refer collectively to superblocks 226, blocks 228 and rules 100. As shown, each rule object may exist once in the rules database 224. It is to be appreciated that the rule objects may exist in a single database 224 or in multiple databases that reference each other. As shown, superblock 226 references two blocks 228a and 228b. Block 228a references rule 2 and 3, and block 228b references rule 1 and rule 3. Superblock 226 also references rules 1, 2 and 3 by its own reference to blocks 228a, 228b. In another embodiment, superblock 226 may directly reference rules 100 in addition to blocks 228a, 228b. Further block 228b refers to block 228c which refers to rule "n".

When a user interacts with the tool 12 and changes the hierarchical relationship between rule objects, a rule engine 200 implements the change by changing the references in the rules database 224 as is described below. It will be appreciated that if any of the rule objects are moved and/or deleted, the structural relationship depicted in FIG. 3b will be altered by the rule engine 200, a new data structure (e.g. rule hierarchy 260) will exist in the rules database 224 or collection of rules databases 224.

Figure 7:
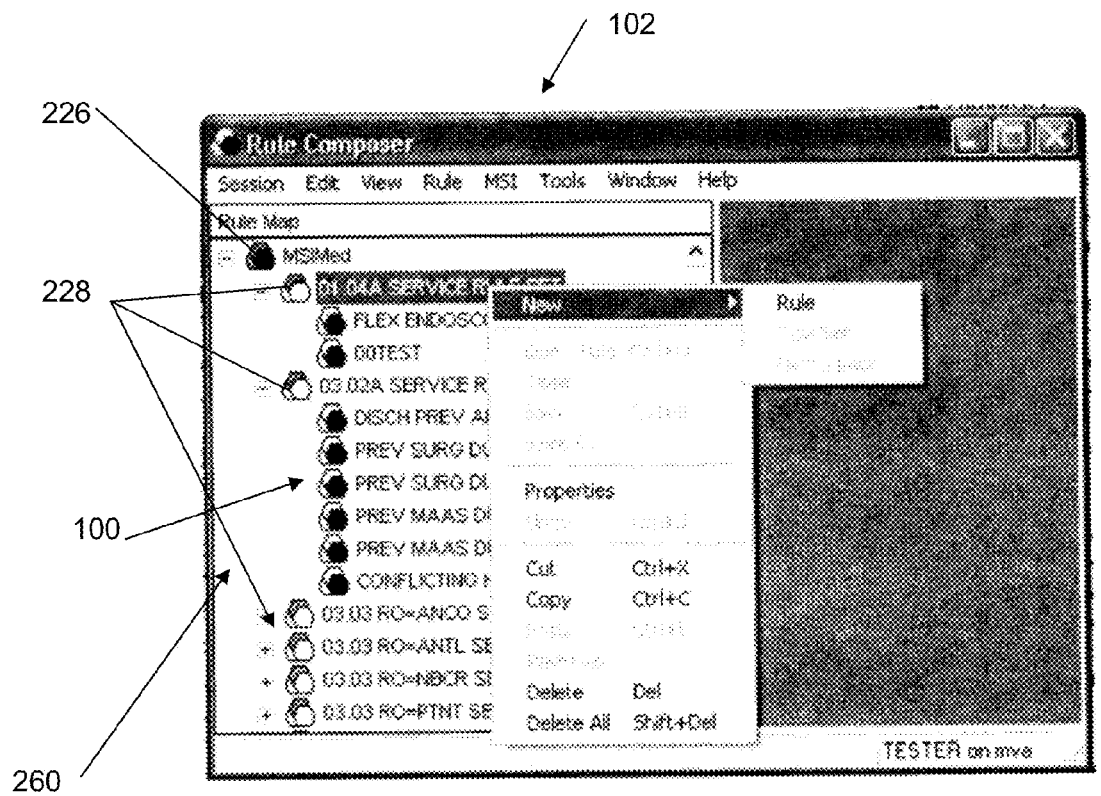
FIG. 7 is an example interface of the rule engine 20 of FIG. 2.

An exemplary rule hierarchy 260 is illustrated in FIG. 7. As shown, the rule hierarchy 260 has a superblock 226 entitled 'MSIMed', several blocks 228 and several rules 100. A user is able to expand the rule hierarchy 260 (e.g. using a hierarchy module 204 of the engine 2000—see FIG. 11) by clicking on the '+' buttons and is able to contract the hierarchy 260 by clicking on the '−' buttons via the interface 102 (see FIG. 13). In this way a user is able to precisely focus on a particular rule 100, a block 228 or a superblock 226 as desired. The rule hierarchy 260 can be a graphical tree view that is similar to a folder tree view of a file system as displayed on the display 152, for example. The nodes on the tree view represent the Rule Objects in the rule hierarchy 260 in a parent-child relationship.

The order in which rules 100 and rule block 228 are evaluated by the adjudication engine 40 can affect the adjudication result of the claims 12. New rules 100 and rule blocks 228 can be placed at the bottom of the hierarchy 260 by default, for example. To rearrange the order of the rules 100 in the hierarchy 260 using the engine 200, a user can drag and drop rule objects wherever desired so that the new rule object is in the target node. When a user moves a rule object, the rule engine 200 instructs component modules (e.g. module 202, 204, 206, 208, 210) of the engine 200 to modify the data relationship between the moved rule objects and to render a new visual rule hierarchy 260 to the screen as is described below.

One example implementation of the rule hierarchy 260 is where individual rules 100 can only exist at the bottom most rule container 228 level and that rule containers 226,228 that contain a rule object 100 (e.g. via references 227,229) cannot be moved to a different level of the hierarchy 260. These reference limitations, as managed by the Hierarchy manager 204, help to reduce the complexity of maintaining the hierarchy 260 of circular references 227, as desired. It is recognized that there can be a number of hierarchy levels containing secondary containers 228 (i.e. a secondary container references 227 another secondary container 228 which then references 227 the rules 100, e.g. Block 228b references Block 228c which references the rules 100).

Further, the benefit hierarchy 360 has a superblock 326, several blocks 328 and several benefits 103, for example. A user is able to expand the benefit hierarchy 360 (e.g. using a hierarchy module 204 of the engine 200—see FIG. 11) by clicking on the '+' buttons and is able to contract the hierarchy 360 by clicking on the '−' buttons via the interface 102 (see FIG. 13). In this way a user is able to precisely focus on a particular benefit 103, a block 328 or a superblock 326 as desired. The benefit hierarchy 360 can be a graphical tree view that is similar to a folder tree view of a file system as displayed on the display 152, for example. The nodes on the tree view represent the benefit Objects in the benefit hierarchy 260 in a parent-child relationship.

The order in which benefits 103 and benefit blocks 326,328 are evaluated by the adjudication engine 40 can affect the adjudication result of the claims 12. New benefits 103 and blocks 328 can be placed at the bottom of the hierarchy 360 by default, for example. To rearrange the order of the benefits 103 in the hierarchy 360 using the engine 200, a user can drag and drop benefit objects wherever desired so that the new benefit object is in the target node. When a user moves a benefit object, the engine 200 instructs component modules (e.g. module 202, 204, 206, 208, 210) of the engine 200 to modify the data relationship between the moved benefit objects and to render a new visual benefit hierarchy 360 to the screen 152 as is described below.

One example implementation of the benefit hierarchy 360 is where individual benefits 103 can only exist at the bottom most benefit container 328 level and that benefit containers 326,328 that contain a benefit object 103 (e.g. via references 327,329) cannot be moved to a different level of the hierarchy 360. These reference limitations, as managed by the Hierarchy manager 204, help to reduce the complexity of maintaining the hierarchy 360 of circular references 327, as desired. It is recognized that there can be a number of hierarchy levels containing secondary containers 328 (i.e. a secondary container references 327 another secondary container 328 which then references 327 the benefits 103, e.g. Block 328 references Block 328 which references the benefits 103).

Composer Rule/Benefit Engine 200

Reference is next made to FIG. 11, which illustrates the Engine 200 of the claims processing environment 10. The engine 200 is for, such as but not limited to, creating, editing, organizing and maintaining adjudication rules 100 in a hierarchical relationship 260 and/or creating, editing, organizing and maintaining adjudication benefit codes 103 in a hierarchical relationship 360, as well as links 240—see FIG. 10—between the rules 100 and benefit codes 103 (it is recognized that the links 240 can also be established between the rules 100 and the blocks 326,328 and/or between the benefits 103 and the blocks 226,228, as desired).

The engine 200 includes a composer module 202 for creating, editing, deleting and saving individual rules 100 and benefits 103, as well as other objects of the hierarchies 260, 360. A user of the engine 2000 interacts with the interfaces 102,152 (see FIG. 13) to create, edit, delete and save adjudication rules 100 and benefits 103, as well as the relationships (e.g. parent/child) between blocks 226, blocks 228, and rules 100, as well as the relationships (e.g. parent/child) between blocks 326, blocks 328, and benefits 103, as well as their execution order as organized by the ordering of the references 227,229,327,329 within the respective blocks 226,228,326, 328. The composer module 202 performs functions as dictated by the user via the interface 102 and the composer module 202 saves adjudication rules 100 into the local database 124 in the form of the rules hierarchy 260. The composer module 202 performs functions as dictated by the user via the interface 102 and the composer module 202 saves adjudication benefit codes 100 into the local database 124 in the form of the benefit hierarchy 360. The engine 200 can also use the composer module 202, for example, to transfer completed hierarchies 260,360 to the storage 224 for use in deployment of the plan 42.

The engine 200 can also includes a compiler 206 for converting rule and benefit statements into an extensible mark-up language such as XML or into machine readable code, for subsequent use in adjudication of the claims 12 by the adjudication engine 40, whereby the links 240 are used to couple the rules 100 with the benefits 103, for benefits 103 associated with specific rules 100 as is known in the art. In an embodiment of the tool, the compiler 206 converts a rule 100 into XML whenever the user interacts with a compile button (not shown) on the user interface 102. XML is a general-purpose specification for creating custom markup languages. It is classified as an extensible language, because it allows the user to define the mark-up elements. XML's purpose is to aid information systems in sharing structured data of the database 224, especially via the Internet, to encode documents, and to serialize data. In another embodiment, the engine 200 interprets a rule 100 statement in real time and renders an error message if the rule does not meet the syntax standards required and enforced by the engine 200.

It is also recognized that the engine 200 can also be used for, such as but not limited to, creating, editing, organizing and maintaining the benefit codes 103 in the hierarchical relationship 360. The engine 200 includes the composer module 202 for creating, editing, deleting and saving individual rules 100 and/or benefit codes 103. The composer module 202 performs functions as dictated by the user and the composer module 202 saves benefit codes 103, and their configuration, into the database 224. The engine 200 also includes a compiler 206 for converting benefit code 103 statements into an extensible mark-up language such as XML or into machine readable code. In an embodiment of the tool, the compiler 206 converts the codes 103 into XML whenever the user interacts with a compile button (not shown) on the user interface 102. In another embodiment, the engine 200 interprets code 103 statements in real time and renders an error message to the interface 102 if the code statement 103 does not meet the syntax standards required and enforced by the engine 200. The engine 200 can also use the composer module 202, for example, to transfer completed hierarchies 260,360 to the storage 224 for use in deployment of the plan 42.

The order in which codes 103 and blocks 328 are evaluated by the adjudication engine 40 can affect the adjudication result of the claims 12. New codes 103 and blocks 328 are placed at the bottom of the hierarchy 360 by default, for example. To rearrange the order, a user can drag and drop code objects (e.g. codes 103, blocks 326, blocks 328) wherever desired so that the new code object is in the target node. When a user moves a code object, the rule engine 200 instructs component modules of the engine 200 to modify the data relationship between the moved code objects and to render a new visual code hierarchy 360 to the screen (e.g. interface 102) as is described below.

One example implementation of the code hierarchy 360 is where individual codes 103 can only exist at the bottom most code container 328 level and that containers 326,328 that contain a code object 103 (e.g. via references 327,329) cannot be moved to a different level of the hierarchy 360. These reference limitations, as managed by the Hierarchy manager 204, help to reduce the complexity of maintaining the hierarchy 360 of circular references 327, as desired. It is recognized that there can be a number of hierarchy levels containing secondary containers 328 (i.e. a secondary container references 327 another secondary container 328 which then references 327 the codes 103.

Accordingly, the engine 200 can be considered a GUI application for defining plans 24, for eventual deployment in the database 224 for specified carrier/patient relationships. The engine 200 provides for grammar logic 212 to be based on operators, methods, business objects, and their attributes. Data types may be defined and enforced within the grammar logic 212 definitions, so that, for example, a date can only be compared to a date. The adjudication engine 40 can export its plan 42 configuration to the composer engine 200 (e.g. into the local memory 124) so that the exported plans 42 can be edited by the composer engine 200, for example. As well, the composer engine 200 is configured so that it can export any changed plan 42 definitions (e.g. content and/or configuration of the hierarchies 260,360) back to the database 224 and have those exported items (e.g. plan components, rule sets benefit sets, rule/benefit blocks, and individual rules 100/benefits 103, as well as links 240 there-between) re-evaluated and compiled into code (e.g. Java byte code) for use by the engine 40 in adjudication of received claims 12 that pertain to the now redeployed plan 42. It is also recognized that the redeployed plan 42 could also be reconfigured by the plan manager 44 (e.g. for specified inclusion/exclusion of blocks 226, 228,326,328, rules 100, benefits 103, links 240) by using the edited plan 42 returned/exported by the engine 200 back to the database 224.

Composer Module 202

The composer module 202 of the rule engine 200 can provide a graphical view of the rule database called a Rule Map of the rule hierarchy 260 (see FIG. 7), as well as a benefit map of the code hierarchy 360, not shown. The Rule Map shows the current Rule Organization and active Rules 100 based on the system date. The Rule Map provides access through the Rule Containers 226, 228 to individual Rules 100 for viewing and editing. Management of the Rule Container hierarchy 260 can be done through drag/drop and cut/paste features on Rule Map via the rule manager 202, and/or through the hierarchy manager 204, further described below.

The composer module 202 is used to manage the rule inclusions 227 within a Rule Block 228, for example. As described with reference to FIG. 12a, the Timeline 302 feature is applicable to the organization of Rules 100 within Rule Blocks 228. The Timeline 302 keeps track of where and when Rules 100 are included in the Rule Block 228. This means that a snapshot of the rule data that is in effect at any point in time is available. The point in time can be in the past or future. This feature is useful for processing claims 12 that have been back dated and for implementing changes that are future dated, as the rule hierarchy 260 provides guidance for instructing the engine 40 in processing claims 12 using appropriate rules 100 and/or benefits 103 where the claim service date matches the effective/expiry date(s) of the associated references 227,229, 327,329.

It is recognized that timelines 302 are not the same as Rule Versions 300, where: Rule Versions 300 track the history of changes to the definition of a rule 100. Timelines 302 track when and where a Rule 100 is used and do not specify a particular Rule Version 300, for example. However, it is recognized that the timelines 302 can also be used to specify particular rule versions 300, when desired.

The Rule Map of the hierarchy 260 can show the Rule 100 organization that is in effect at the current time as determined by the clock (or other defined chronological time) of the user interface 102. The Rule Map displays Rule Inclusions 227 depending on their status, for example using color and font style differences/distinctions (e.g. Expired Rule Inclusions 227 can be displayed in grayed type, unreleased Rule Inclusions 227 can be displayed in normal type, and released Rule Inclusions 227 are displayed in bold type).

The composer module 202 can provide a detailed view and addition/modification of the Rule Inclusions 227 over time. This view can be logically segmented into Time Spans. Each Time Span can represent a period in which the Inclusions 227 are static. The boundary between Time Spans represent the point in time where at least one Inclusion 227 changes. Time spans can be calculated in memory by the application and may not necessarily map one for one with records in a Rule-Rule Block table of the hierarchy 260. For example, A Rule Dependency Map is displayed on each composer module 202 window (displayed in the interface 102) next to the a Text/Tree View of the rule 100. The Dependency Map can show the all Rule Blocks 228 that reference 227 that rule 100 and in turn the Rule Super Blocks 226 that reference 229 the Rule Blocks 228 (see FIG. 7 for example). It is recognized that composer module 202 can configure and display to the user (via the interface 102) current and historical views of the Rule Blocks 226,228.

It is to be appreciated that a rule statement may be referenced by any number of blocks 228 or superblocks 226; however, each rule 100 will only exist once in the rules database 224.

Dependency Manager 208

Figure 8:
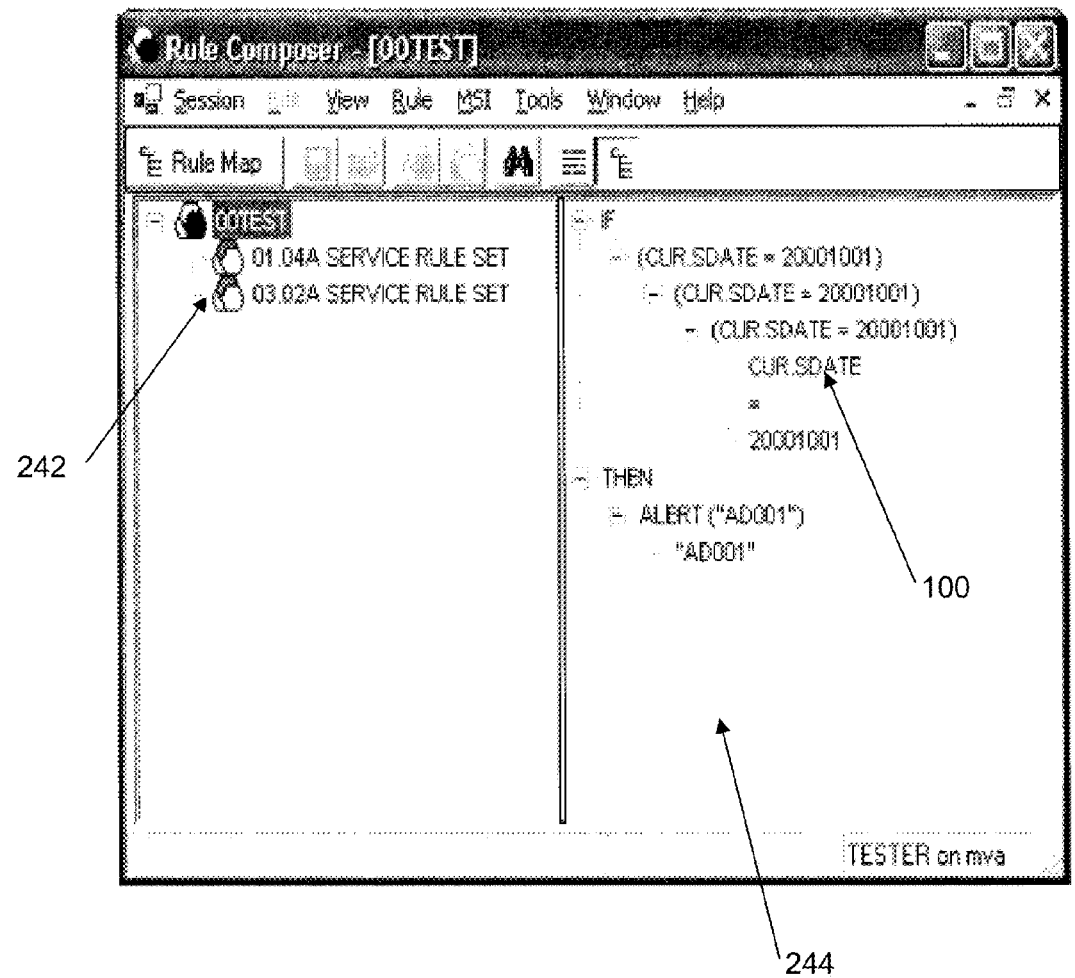
FIG. 8 is another example interface of the rule engine 20 of FIG. 2.

The engine 200 includes a Dependency Manager 208 for tracking the relationship between rules 100 and blocks 228 and superblocks 226. The advantage of using references to rules 100 rather than actual copies is the ability to share common rule objects. Changes made to a rules object are automatically picked up by all the references to the rule object. It is appreciated, however, that with the possibility of any number of references to a rule object it may be difficult to keep track of the dependencies. The dependency manager 208 is operable to manage the dependencies of each rule object and to visually display the dependency relationship as a dependency map for the convenience of the user. The dependency map 242 helps a user keep track of rule dependencies by mapping the rule hierarchy 260 from the bottom up. Each rule container (or rule block 226,228) is shown with its parent container and so on up the family tree. An exemplary dependency map 242 is illustrated in FIG. 8. As shown, rule 240 is named '00TEST' and is connected to two different rule blocks 228, namely '01.04A SERVICE RULE SET' and '03.02A SERVICE RULE SET'. As shown, the dependency map 242 is shown to the left of the rule editor window 244, although it is to be appreciated that the dependency map 242 may be located in any location on the visual interface. As the user edits the rule 246, the user is able to visualize that each reference to the rule 246 will also be modified.

The engine 200 includes a Dependency Manager 208 for tracking the relationship between benefits 103 and blocks 328 and superblocks 326. The advantage of using references to benefits 103 rather than actual copies is the ability to share common benefit objects. Changes made to a benefits 103 object are automatically picked up by all the references to the rule object. It is appreciated, however, that with the possibility of any number of references to a benefit object it may be difficult to keep track of the dependencies. The dependency manager 208 is operable to manage the dependencies of each benefit object and to visually display the dependency relationship as a dependency map for the convenience of the user. The benefit dependency map helps a user keep track of benefit dependencies by mapping the benefit hierarchy 360 from the bottom up. Each benefit container (block 326,328) is shown with its parent container and so on up the family tree.

Search Module 210

The rule engine 200 also includes a search module 210 for allowing a user to find a particular rule 100 (as well as blocks 226,228) in the rules database 224 for editing, deletion or for analysis. When the user interacts with a searching window on the user interface 102, the rule module 202 communicates with the searching module 210 and instructs the searching module to find rules 100/blocks 226,228 that correspond to the searching criteria pre-entered by the user. The searching module 210 queries with the rule database 224 with the searching criteria. If one or more rules 100/blocks 226,228 are returned from the database 224, the searching module renders the results as a list of rules 100/blocks 226,228 on the visual interface 102. If no rules 100/blocks 226,228 are returned from the database 224 that match the searching criteria, the searching module 210 notifies the user that no rules 100/blocks 226,228 were found.

The rule engine 200 also includes the search module 210 for allowing a user to find a particular benefit 103 (as well as blocks 326,328) in the rules database 224 for editing, deletion or for analysis. When the user interacts with a searching window on the user interface 102, the module 202 communicates with the searching module 210 and instructs the searching module to find benefits 103/blocks 326,328 that correspond to the searching criteria pre-entered by the user. The searching module 210 queries with the rule database 224 with the searching criteria. If one or more rules benefits 103/blocks 326,328 are returned from the database 224, the searching module renders the results as a list of benefits 103/blocks 326,328 on the visual interface 102. If no benefits 103/blocks 326,328 are returned from the database 224 that match the searching criteria, the searching module 210 notifies the user that no benefits 103/blocks 326,328 were found.

Hierarchy Module 204

The rule engine 200 also includes a hierarchy module 204 for managing the child-parent relationships in the rules database 224 and the visual representation of the hierarchy 260 on the interface 102. The rule engine 200 also includes the hierarchy module 204 for managing the child-parent relationships in the database 224 and the visual representation of the hierarchy 360 on the interface 102.

Users of the tool interact with rule/benefit objects via the interface 102, an example of which is shown in FIG. 9. As shown, a user is able to click on the components of a rule object with a mouse cursor. For example, if the user wishes to change parameter '20000101', the user is able to click on the parameter and directly change its value by typing on the keyboard. Once the user is satisfied with the new value, the user can choose to save the rule 100 in the memory 124 associated with the engine 200. The interaction is processed by the module 202 which is operable to save the new rule 100/benefit 103 object in the rules database 224. Likewise, when a user moves a rule 100/benefit 103 to another location in the hierarchy 260, 360, the module 202 instructs the hierarchy module 204 to change the references to the rule 100/benefits 103 in the rules database 224. The dependency module 208 also manages the dependency relationship and renders the new dependency relationship to the visual interface 102 as a dependency map 242 when the user wishes to view the dependency map 242 for a particular rule 100/benefit 103.

The dependency module is also adapted for coupling the adjudication rules 100 to the secondary rule container 228 by the rule reference 227 associated with the content of the secondary rule container 228 and is adapted for coupling the secondary rule container 228 to the primary rule container 226 by the container reference 229 associated with the content of the primary rule container 226, such that the adjudication rules 100, the containers 226,228, and the rule and container references 227,229 define the rule hierarchy 260 for representing the set of adjudication rules.

Business Management Process 400

Figure 16:
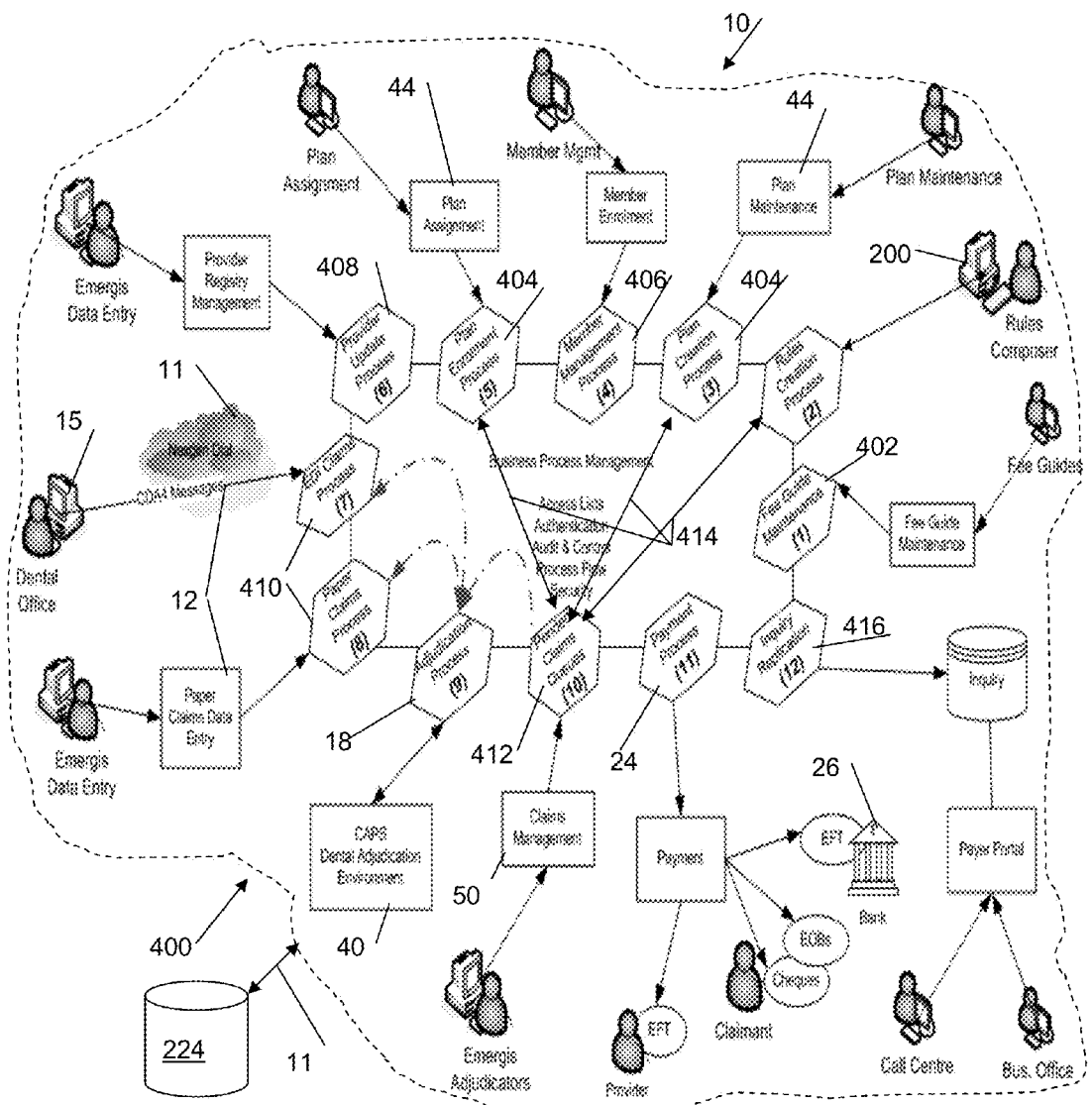
FIG. 16 is a diagram of an example management process for the environment of FIG. 1.

Referring to FIG. 16, shown is an example workflow of the adjudication environment 10, showing the major components of a business management process 400 for facilitating the adjudication of claims 12 submitted by insured products and/or service providers 15 (e.g. dentists, doctors, pharmacies, etc.) on behalf of the patient 14 (e.g. recipient), for example. In addition to the components of the environment 10 of FIG. 1, the example management process 400 includes components such as but not limited to: a fee guide maintenance 402 for monitoring updates to fee guides used by the adjudication engine 40, such that the fee guides map prices to service codes 103 (e.g. government and/or carrier 231 specific); the above mentioned rule and benefit hierarchy 260, 360 creation process implemented by the composer engine 200; a plan creation and/or enrollment process (collectively referred to as a deployment process 404) as implemented by the plan management engine 44 for facilitating deployment of plans 42 to the database 224 using rule and benefit hierarchies 260, 360 created by the composer engine 200, as further described below; a member enrollment and management process 406 for enrolling providers 15, patients 14, patient groupings (e.g. companies and other organizations), etc.; a provider update process 408 for maintaining relevant provider 15 information; a claims receiving process 410 configured to receive the claims 12 from a variety of provider/patient sources and for distributing the received claims to the adjudication process 18 for processing by the adjudication engine 40 in view of the appropriate deployed plan(s) 42 stored in the memory 224; a claims management process 412 for reviewing by a review engine 50 the performance of the adjudication process 18 (e.g. level of received claims 12 that had specified types of error(s) during the adjudication process 18) and for modifying 414 the deployed plan 42 and potentially the rules creation process (i.e. operation of the composer engine 200) based on the results generated by the review engine 50; and an inquiry process 416 for providing status and other historical process information for the claims 12 (e.g. reports for transacted claims 12—e.g. EOBs—as well as status for claim transactions in progress). It is recognized that all of the processes of the business management process 400 can be coupled for interaction with one or more memories 224 (e.g. databases), in order to access data required for implementation of the respective process as well as to store the results of the respective process.

Further, as shown in FIG. 1, it is recognized that the components of the business management process 400 can communicate with one another via one or more communication networks 11, including otherwise than as shown. Further, it is recognized that the interactions between the components and/or between the components and the database(s) 224 can be message based (e.g. request—response), such that or each class of message that forms part of the workflow of the process 400 can be defined as a message that carries out the required steps for the process triggered by the workflow. The result of the completion of the workflow in response to the request message can be a synchronous or asynchronous response message returned to the requester (or forwarded to another recipient as configured/defined/specified). For example, an application or functional acknowledgement can be returned in response to the request message.

Plan Management Engine 44

Figure 17:
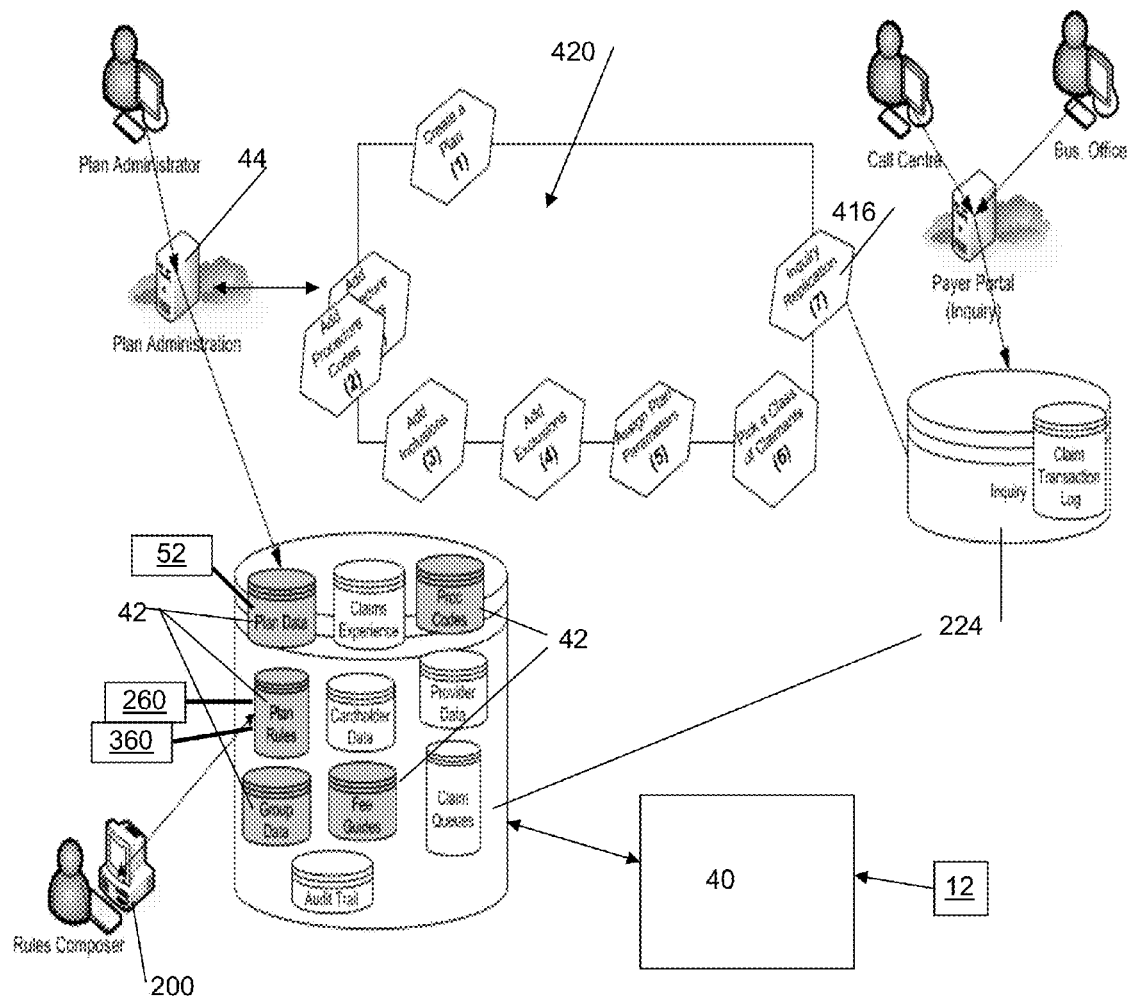
FIG. 17 is an example configuration of a modification process of rule and/or benefit hierarchies of the system of FIG. 2.

Referring to FIG. 17, shown is an example deployment process 420 for implementation by the plan engine 44, for using the hierarchies 260,360 (e.g. association of defined blocks 226,228,326,328, references 227,229,327,329, rules 100, benefits 130, and links 240) developed by the composer engine 200. The deployment process 420 can be implemented as a Batch/Real-time process for providing the deployed plans 42 to the database 224 for use by the adjudication engine in processing of the received claims 12. Accordingly, newly published/assigned plans 42 or changes/modifications to existing plans 42 are replicated to database 224, so the engine 40 can adjudicate accordingly. As discussed above, the deployed plan can consist of a list of, such as but not limited to: Adjudication Rules 100 (embodied in the hierarchy 260), a list of Service Codes 103 (embodied in the hierarchy 360), a Fee Guide and a set of "fiscal" and other type parameters, for example. For example, the plan 42 defines a set of criteria that need to be checked to determine if a particular service code 103 or package code can be carried out (e.g. on a tooth). An example is that a tooth must exist in order for it to be extracted. The criteria are implemented in the rules 100, such that application of the rules 100 via the hierarchy 260 (i.e. by the adjudication engine 40) are used to determine whether a given service code 103 can be paid by the plan 42, in view of the level of detailed claim information (e.g. claim content) submitted in the claim 12.

It is recognized the role of the composer engine 200 in the environment 10 is to facilitate Adjudication Rules List Creation to define and combine rule 100 into defined rule Blocks 226,228 (e.g. rule hierarchies 260) and Service Code Coverage List Creation to define and combine Service Codes 103 into defined Benefit Blocks 326,328 (e.g. benefit hierarchies 360. The role of the plan engine 44 in the environment 10 is to facilitate the assembly of various blocks 226,228,326,328, rules 100, and benefits 103 from the created hierarchies 260, 360 (e.g. used as template hierarchies 260, 360) of the composer engine 200 and then to customize the template hierarchies 260, 360 through modification (e.g. addition, deletion, override, etc.) of the included blocks 226,228,326,328, rules 100, and benefits 103 in the plan hierarchies 260, 360 customized for a specific carrier 231, provider 15, and/or class of recipient 14. This modification can be implemented by a user (e.g. plan administrator) of the plan engine 44 via the specification of parameters and new/changes to the references 227,229,327,329, rules 100, benefits 130, and links 240 of the template hierarchies 260,360 created by the composer engine 200. Once finalized, i.e. the modification of the template hierarchies 260,360 is completed, the plan 42 containing the modified hierarchies 260,360 is stored in the database 224 as the deployed plan 42, for subsequent use by the adjudication engine 40. It is recognized that the functionality and modules of the engines 44, 200 can be as shown, combined, and/or further subdivided other than as shown, as desired. It is also recognized that the engines 44, 200 can be hosted on the same or different computer devices 101. For example, the engines 44, 200 could be hosted on a server device 101 for access over the network 11 by a client device 101 of a user of the functionality of the engines 44, 200.

Further, it is recognized that any impact on Overrides can be determined at the level of the change and lower. For example, for a Member Plan Change—only the overrides at the Member+Recipient level could be impacted. (etc.). The impact on Overrides can be to those override at a lower level that may not include the Plan Assignment. The Level can inherit the Plan Assignment from the level of the Change. For Example: a Plan Assignment change at a Class Level can have an impact on all Member records in the same Class, which do not have a Plan Assignment at the Member Level but do have Plan Overrides Assigned.

It is also recognized that related Overrides are any overrides using a block label that existed in the 'old' plan 'and' in the 'new' plan. Un-related overrides can be any overrides using a block label that existed in the 'old' plan and NOT in the 'new' plan. Benefit Coverage Overrides may not be identifiable in this process as they are carried over to the New Plan to remain active. The Overrides available for 're-open' can be those that belong to the Old Plan and have the same Expiry Date as the Old Plan Expiry Date.

It is also recognized that the modification to the blocks 226,228,326,328 content, via the references 227,229,327,329 can be dated to have an override effective and/or expiry date. Accordingly, these modifications (e.g. as embodied in the references 227,229,327,329) are considered temporary modifications (e.g. overrides) as the configuration of the hierarchy 260,360 will revert back to the pre-modified state when the chronological date is outside of the override effective and/or expiry date. Further, upon accessing the information details of the existing plan 42 and/or template hierarchies 260,360, the plan engine 44 can provide for a display on the interface 102 all current and/or previous overrides and their associated effective/expiry date(s), where available, to the user of the plan engine 44.

Parameter Values 52

Figure 5B:
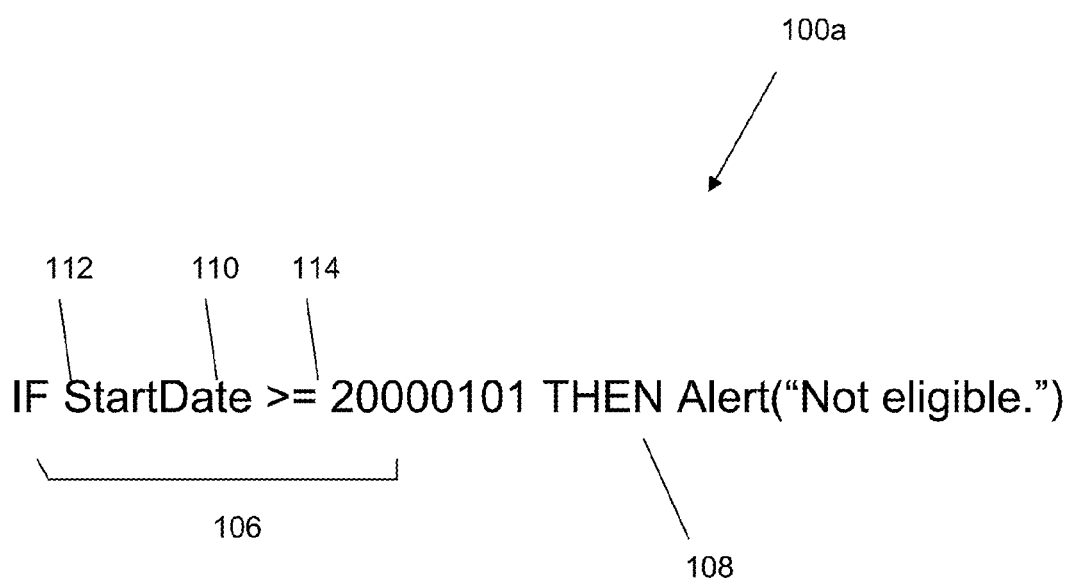

Carriers 231 that want to include or exclude service codes 103 from a plan 42 (e.g. a plan not yet deployed however is loosely defined using the hierarchies 260,360 created by the composer engine 200) can create lists of inclusions and exclusions for use by the plan engine 44 when creating the final plan 42 for deployment. The inclusions and exclusions can become parameters 52 of the deployed plan 42. This can inhibit the need to create new package identifiers for each Carrier 231. A deployed plan 42 contains a number of "fiscal" parameters 52 that determine how the claim 12 will be adjudicated. Items such as co-insurance, maximum and COB are examples of "fiscal" parameters 52. Parameterized Values 52 can be used to minimize hard-coding and maximize component re-use of the rule and benefit objects created by the composer engine 200. Parameterized values 52 can be defined globally but they can be assigned to plan and/or as override parameters 52 in the hierarchies 260,360. It is recognized that literal values 112, operators 110, and parameter values 114, as shown in FIGS. 5a, 5b, are hereafter referred to as parameters 52.

Example override details (e.g. parameters 52) of the template hierarchies 260,360 can be details such as but not limited to: Elig. Prof. $—the amount determined to be eligible after plan coverage and rules, but prior to the application of deductibles, coinsurance and maximum; Lab Elig. $—the amount determined to be eligible after plan coverage and rules, but prior to the application of deductibles, coinsurance and maximum; Exp. Elig. $—the amount determined to be eligible after plan coverage and rules, but prior to the application of deductibles, coinsurance and maximum; Ded. Prof. $—the amount of the deductible applied (professional eligible amount, lab1 eligible amount, and lab2 eligible amount); Coins. %—the percentage at which the claim item was adjudicated; Max $—the out of pocket amount due to a reduction in payment because a plan maximum was reached; Lab Ben. $—the amount payable (after deductible, coinsurance and maximum) for the Lab amount portion of the claimed professional fee; Exp. Ben $—the amount payable (after deductible, coinsurance and maximum) for the Expense amount portion of the claimed professional fee; Benefit Amount—the amount payable (after deductible, coinsurance and maximum) for the Professional amount portion of the of the claimed Professional Benefit amount; Adjudicated Service Code—enables the user to override the adjudicated service code that was used; and the estimated Benefit Amount.

Member Categories 54

Referring to FIG. 18, shown are example Groups/Divisions/Units or Members for selection by the plan engine 44 in assigning the deployed plans 42 to, as well as modification of some of the Plan Parameters 52 in the deployed plan 42, for the deployment process 404 (see FIG. 16). For example, carriers 231 wish to have Plans 42 set up for groups within a company or an organization. Each group can be made up of members and their dependents. Members are be enrolled with the Carrier 231 before they can be assigned a plan 42, or can be dynamically assigned, as desired, such as upon the delivery of the member's first claim 12 to the adjudication process 18. Typically the plan 42 is assigned/deployed to a group; occasionally the plan 42 is assigned/deployed to a member or dependent.

The member categories 54 include member types such as but not limited to: carrier 231; company; department; unit; subscriber; and recipient 14. It is recognized that the modifications implemented by the plan engine 44 can be associated/assigned to each/any of the member category types 54, as desired. For example, the plan engine 44 can modify the template hierarchies 260,360 in order to make deployed plans 42 specific to different individual recipients 14 (e.g. company president, floor supervisor, shop floor worker), such that the various maximums, minimums, services, products, etc. of the deployed plan 42 have customized parameter values 52 and/or blocks 226,228,326,328, and/or references 227,229,327, 329, and/or rules 100, and/or benefits 130, and/or links 240 specific to the individual. It is recognized that this level of customization afforded by use of the template hierarchies 260,360, through modification by the plan engine 44, provides for ease of customization for plan 42 deployment (and redeployment in the case of modifying an existing deployed plan 42). It is also recognized that the use of the containers and references structure of the hierarchies 260,360 provides for reuse of the basic defined rules 100 and benefits 103 through creation of multiple instances and combinations of those instances. Accordingly, the update of rule 100 and/or benefit 103 content/logic is more easily propagated through all of the various deployed plans 42 that use the updated rule 100 and/or benefit 103 (for example done via the composer engine 200 in the event of a government and/or carrier policy change).

Figure 19:
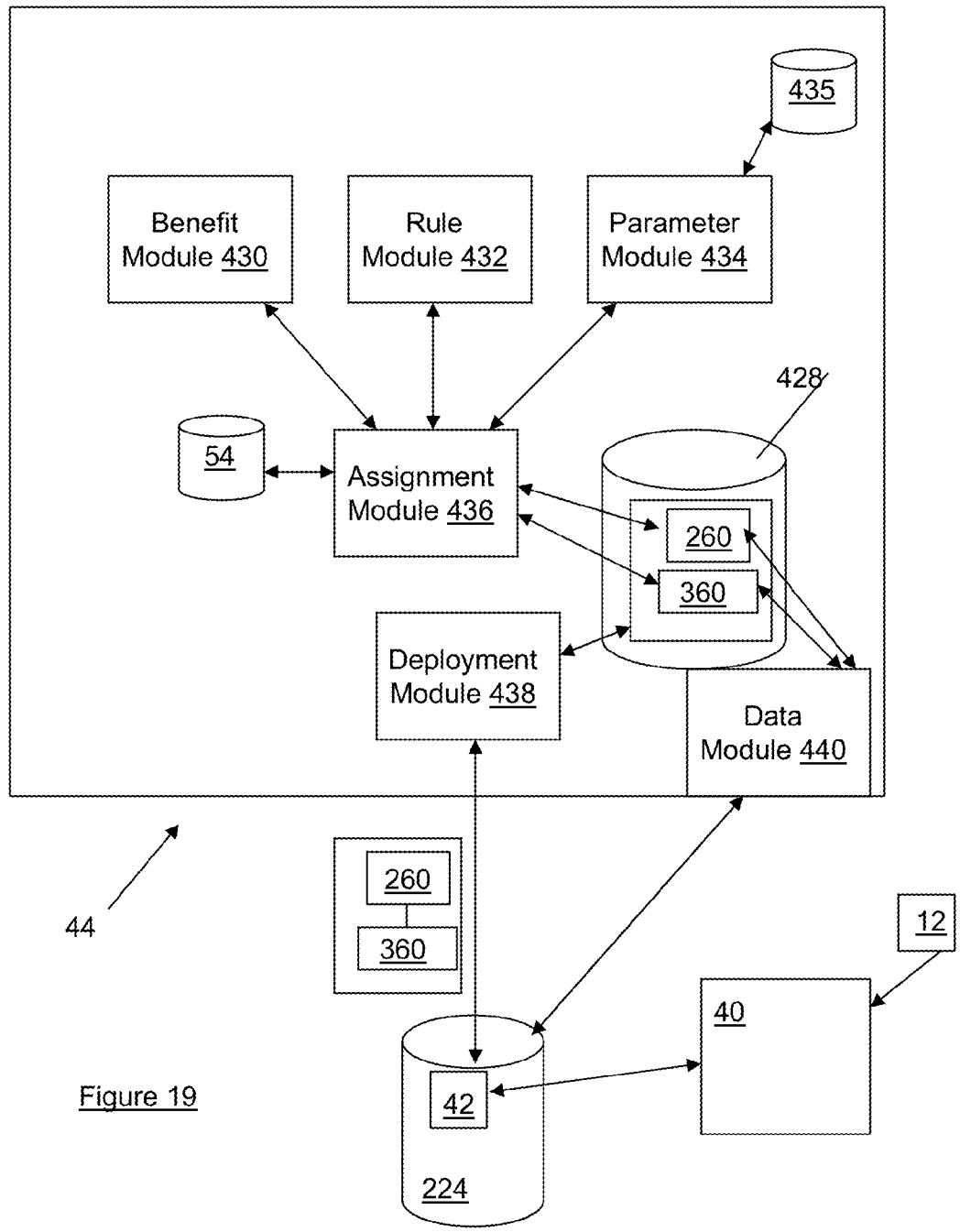
FIG. 19 is an example block diagram of an embodiment of the plan engine of FIG. 18.

The Plan engine 44 can create, modify, and/or maintain the plan components that the plan 42 is composed of. Referring to FIG. 19, the plan engine 44 can have a number of components to facilitate modification of the hierarchies 260, 360 obtained from the memory 224 (e.g. template hierarchies 260,360 provided by the composer engine 200, a deployed plan having previously configured hierarchies 260,360, etc.). For example, the plan engine 44 has a data module 440 for obtaining the hierarchies 260, 360 (e.g. from the database 224) and for storing them in a local memory 428; a deployment module 438 for deploying the modified hierarchies 260,360 as the deployed plan in the memory 224; a benefit module for accessing the hierarchy 360 and for updating the contents of the associated benefits 103, blocks 326,328 and references 327,329; a rule module 432 for accessing the hierarchy 260 and for updating the contents of the associated rules 100, blocks 226,228 and references 227,229; a parameter module for updating the parameters 52 of the hierarchies 260,360, for example using ranges of predefined parameters 52 stored in a memory 435 (e.g. a series of parameter tables or other data construct associated with various carriers and/or governmental agencies); and an assignment module 430 for assigning the appropriate member categories 54 to elements (e.g. blocks, rules, benefits, etc.) of the hierarchies 260,360. It is shown that the modules 430,432,434 communicate via the module 436 with the contents of the memory 428, however it is recognized that the modules 430,432,434 can communicate directly with the contents of the memory 428, as desired. Once deployed, the plan 42 is available for use by the adjudication engine 40 for processing the received claims 12.

Each of the plan 42 components references potentially many parameterized values 52 with default values that can be overridden by Plan engine 44 in the act of publishing/deploying the plan 42, including potential override by the Plan Assignment module 436 in the act of assigning the to be deployed plan 42 to one or more specific enrollment entities. The components of the plan 42 can include components of the hierarchies 260,360 such as but not limited to: Benefit Super Block 326 for Coverage that can be used to determine if a specific benefit 103 is covered under the plan 42 or not; Benefit Super Block 326 for Adjudication Logic that can be used to restrict the allowable choices for parameterized values 52 of type benefit block 328—adjudication logic, such as those used in predefined interaction rules, where this type of block 326 can be ignored by the adjudication engine 40 and therefore used as a convenience for the Plan Manager and Plan Assignment user interfaces 102 of the plan engine 44 (e.g. if not set, all benefit blocks 326,328 are displayed as plan components for potential modification); Benefit Super Block 326 for Plan that can be used to restrict the allowable choices for parameterized values 52 of type benefit block—plan, such as those used by coinsurances or frequency rules 100, where this type of block 226 can be ignored by the adjudication engine 40 and therefore used as a convenience for the Plan Manager and Plan Assignment user interfaces 102 of the plan engine 44 (if not set, all benefit blocks 326,328 are displayed as plan components for potential modification); Rule Super Block 226 for Adjudication Logic can be used to select the complete adjudication logic built using Rules Composer engine 200; Rule Super Block 226 for Carrier Specific Adjudication Logic that can be used to select the carrier 231 specific adjudication logic built using Rules Composer engine 200, if any is used; and/or other blocks 226,228,326, 328 and references 227,229,327,329, as desired.

Benefit Module 430

Figure 20:
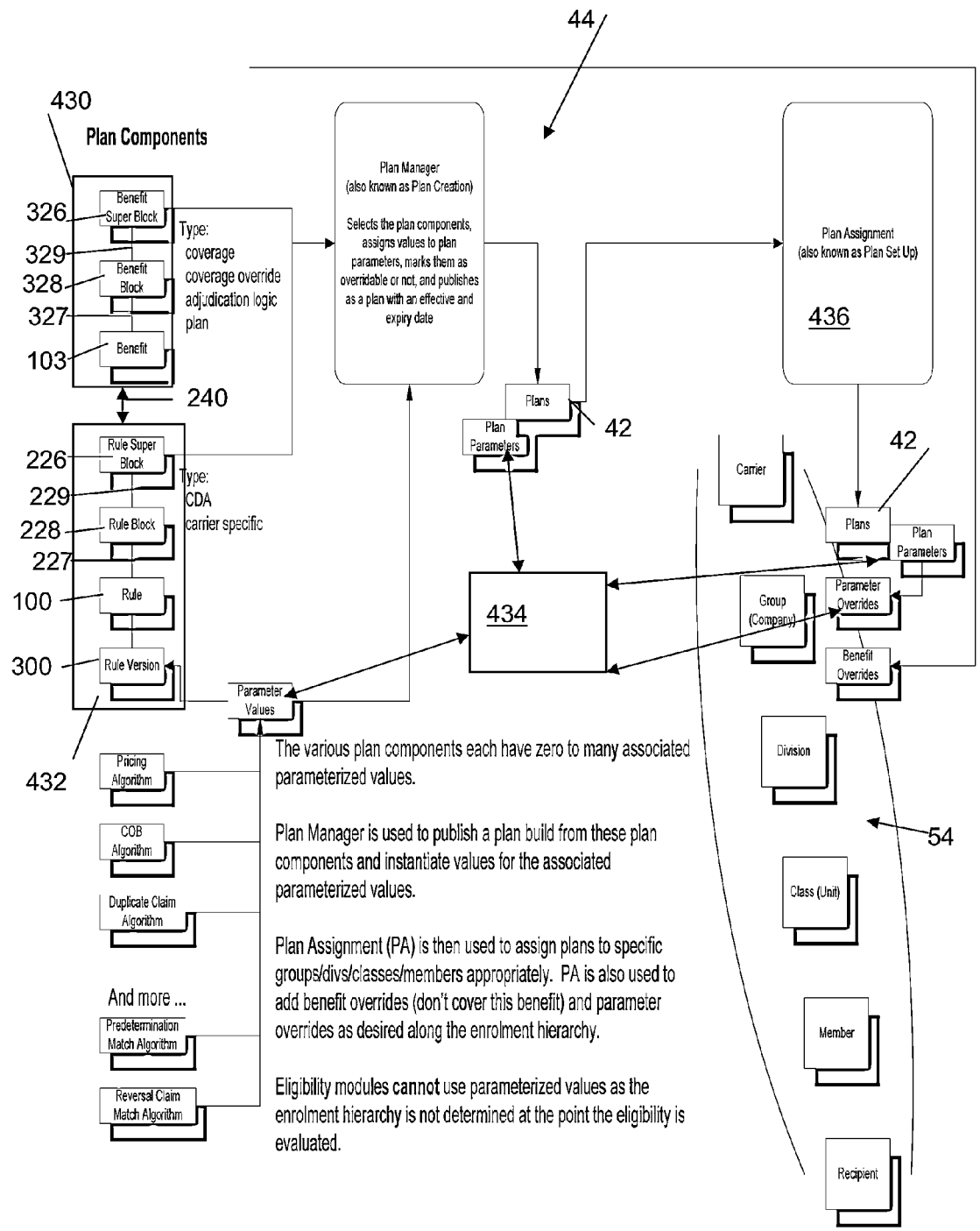
FIG. 20 shows an example workflow of the plan engine of FIG. 18.

Referring to FIGS. 19 and 20, this sub-component or perspective within the Plan engine 44 is used to add/delete/modify the grouping of the benefits 103 appropriately into the benefit blocks 328. These blocks 328 are then included and/or excluded together to form the top level benefit super block(s) 326. The block(s) 326 for coverage type defines the list of covered benefits 103. The block(s) 326 are used for various purposes depending on its type for coverage, adjudication logic, or plan. The coverage override type defines those benefits 103 that are being included or excluded for the specific benefit override being assigned, e.g. via the Assignment module 436. Each benefit 103 can be added/modified/deleted, if needed, using the functionality and modules of the composer engine 200 (e.g. using a business grammar that is supported by a rule evaluation adjudication engine module within the adjudication engine 40).

For example, using the module 430, the user can gain access to plan details, such as but not limited to: Plan Id—Plan Name—Plan Description; Benefit Super Block—Coverage; Super Benefit Block Id—Benefit Block Name; Benefit Super Block—Plan; Super Benefit Block Id—Benefit Block Name; Benefit Super Block—Adjudication; Super Benefit Block Id—Benefit Block Name; Coverage tab, Provincial Plan information, Consultant Review requirements, and carrier 231 Alternate Coverage information; Pricing information; Year (e.g. effective/expiry dates of the plan 42; Specialty (e.g. dental, vision, drug, etc.); Province or other regional jurisdiction; Adjudication Rules via the super blocks 226; and/or Fiscal information/parameters 52.

It is recognized that for each of the accesed plan details on the user interface 102, the module 430 can display the appropriate Super Block ID & Name; and associated appropriate Rule Block ID & Name. It is also recognized that the modification of the hierarchy 360 information would include changes to the references 327,329 of the benefit objects, including changes such as but not limited to: changes in the effective date of the references 327,329; changes in the expiry date of the references 327,329; changes in the benefit object version associated with the references 327,329; changes to the definition content of the benefit codes 103 and/or the benefit blocks 328; and/or inclusion or exclusion of the references 327,329 in the respective block 326,328, as well as changes to the ordering of the references 327,329 in the respective block 326,328.

For example, the module 430 can be used to modify benefits 103 within the block 328, add/delete Benefit Code(s) 103 to a Block 328, add/delete Blocks 328 to a super block 326, add/remove Benefit Code(s) 103 from a Block 326, set Expiry Date for Benefit(s) in a Block 328, Set Effective Date for Benefits 103 in a Block 328, set Expiry Date for block(s) 328 listed in a Block 326, Set Effective Date for block(s) 328 listed in a Block 326. It is recognized that, as described above, the inclusion of blocks 328 in blocks 326 and the benefits 103 in blocks 328 is coordinated in the hierarchy 360 via the listing of the references 327,329 in the appropriate blocks 326,328.

If finished, then the deployment module 438 can be used to save the modified Plan 42 and then the saved plan 42 is deployed to the database 224.

Rule Module 432

Referring to FIGS. 19 and 20, this sub-component or perspective within the Plan engine 44 is used to add/modify/delete the rules that implement the actual complex business logic within the adjudication engine 40. These rules 100 are then included and/or excluded together and are grouped (via modifications to the references 227) into the rule blocks 228. These blocks 228 are in turn are then included and/or excluded together and grouped (via modifications to the references 229) into one or more rule super block 226, which can define the complete set of business logic to be evaluated (e.g. including order of execution of the listed blocks 228) when this specific block 226 is selected. Each rule 100 can be added/modified/deleted, if needed, using the functionality and modules of the composer engine 200 (e.g. using a business grammar that is supported by a rule evaluation adjudication engine module within the adjudication engine 40).

For example, using the module 430, the user can gain access to plan details, such as but not limited to: Plan Id—Plan Name—Plan Description; Benefit Super Block—Coverage; Super Benefit Block Id—Benefit Block Name; Benefit Super Block—Plan; Super Benefit Block Id—Benefit Block Name; Benefit Super Block—Adjudication; Super Benefit Block Id—Benefit Block Name; Coverage tab, Provincial Plan information, Consultant Review requirements, and carrier 231 Alternate Coverage information; Pricing information; Year (e.g. effective/expiry dates of the plan 42; Specialty (e.g. dental, vision, drug, etc.); Province or other regional jurisdiction; Adjudication Rules via the super blocks 226; and/or Fiscal information/parameters 52.

It is recognized that for each of the accesed plan details on the user interface 102, the module 430 can display the appropriate Super Block ID & Name; and associated appropriate Rule Block ID & Name. It is also recognized that the modification of the hierarchy 260 information would include changes to the references 227,229 of the benefit objects, including changes such as but not limited to: changes in the effective date of the references 227,229; changes in the expiry date of the references 227,229; changes in the benefit object version associated with the references 227,229; changes to the definition content of the rules 100 and/or the benefit blocks 228 (e.g. selecting specific versions 300 of the rule objects—e.g. rules 100); and/or inclusion or exclusion of the references 227,229 in the respective block 226,228, as well as changes to the ordering of the references 227,229 in the respective block 226,228.

For example, the module 432 can be used to modify rules 100 within the block 228, add/delete rules 100 to a Block 228, add/delete Blocks 228 to a super block 226, add/remove rules 100 from a Block 226, set Expiry Date for rules 100 in a Block 228, Set Effective Date for rules 100 in a Block 228, set Expiry Date for block(s) 228 listed in a Block 226, Set Effective Date for block(s) 228 listed in a Block 226, and add/delete versions 300 of the rule objects in the corresponding blocks 226,228. It is recognized that, as described above, the inclusion of blocks 228 in blocks 226 and the rules 100 in blocks 228 is coordinated in the hierarchy 260 via the listing of the references 227,229 in the appropriate blocks 226,228.

If finished, then the deployment module 438 can be used to save the modified Plan 42 and then the saved plan 42 is deployed to the database 224.

Parameter Module 434

Referring to FIGS. 19 and 20, this sub-component or perspective within the Plan engine 44 is used to add/delete/modify or otherwise define the parameterized values 52 used within rules 100 and benefits 103, as well as the references 227,229,327,329 where appropriate. This modification of the parameters 52 provides for a generic set of rules 100/benefits 103 to be defined (e.g. the template hierarchies 260,360) and then reused with different specific values 52 that are assigned/associated for plan 42 deployment.

It is recognized that the override of the Effective date of the references 227,229,327,329 may not be prior to the 'inherited' Plan 42 Effective Date and may not be after the Plan 42 Expiry Date. Further, the override Expiry Date may not be prior to the 'inherited' Plan 42 Effective Date and may not be after the Plan 42 Expiry Date. Accordingly, the created/modified Date Range must be within the Plan 42 Effective and Expiry Date Range.

Assignment Module 436

Referring to FIGS. 19 and 20, this sub-component or perspective within the Plan engine 44 is used to add/delete/modify (e.g. override values, override references 227,229, 327,329, etc.) the member categories 54 that are associated with the plan 42 to be deployed. For example, before the Plan Assignment Process can begin, the User of the plan engine 44 determines at what level the Plan Assignment is to be performed (e.g. Carrier, Group, Division, Unit/Class, Member, Recipient of the categories 54). The User determines which of the existing Base Plans 42 (e.g. template hierarchies 260,360, already deployed plans 42, etc.) are most appropriate to use. The User determines what 'overrides' to the Base Plan are desired.

For example, depending on whether or not it is a Single Plan Assignment or a Bulk Plan Assignment will determine what path to Select. For example, for a Single Member-Recipient Assignment, the user can perform a Member Enrollment search until the appropriate record is found. Once the record is selected, the user can request Plan Assignment via the module 436 and be presented with the Plan Assignment screen 102 to enter in the details. For a Single Assignment to a record within the Group Hierarchy (Group/Division/Class), the user can perform a Group Enrollment search until the appropriate record is found. Once the record is selected, the user can request the Plan Assignment via the module 436 and be presented with the Plan Assignment screen 102 to enter in the details. For a Bulk Plan Assignment, the User can input the details of the appropriate level desired via the module 436, e.g. Insurer+Group+Division, Or Insurer+Group+Class. The user can then be presented with a data entry screen 102, which provides for the user to enter the appropriate Division/Class codes via the module 436. Once the keyed list is complete, the user can select the Plan Assignment screen 102 and enter in the details via the module 436.

Electronic Device 101

Figure 13:
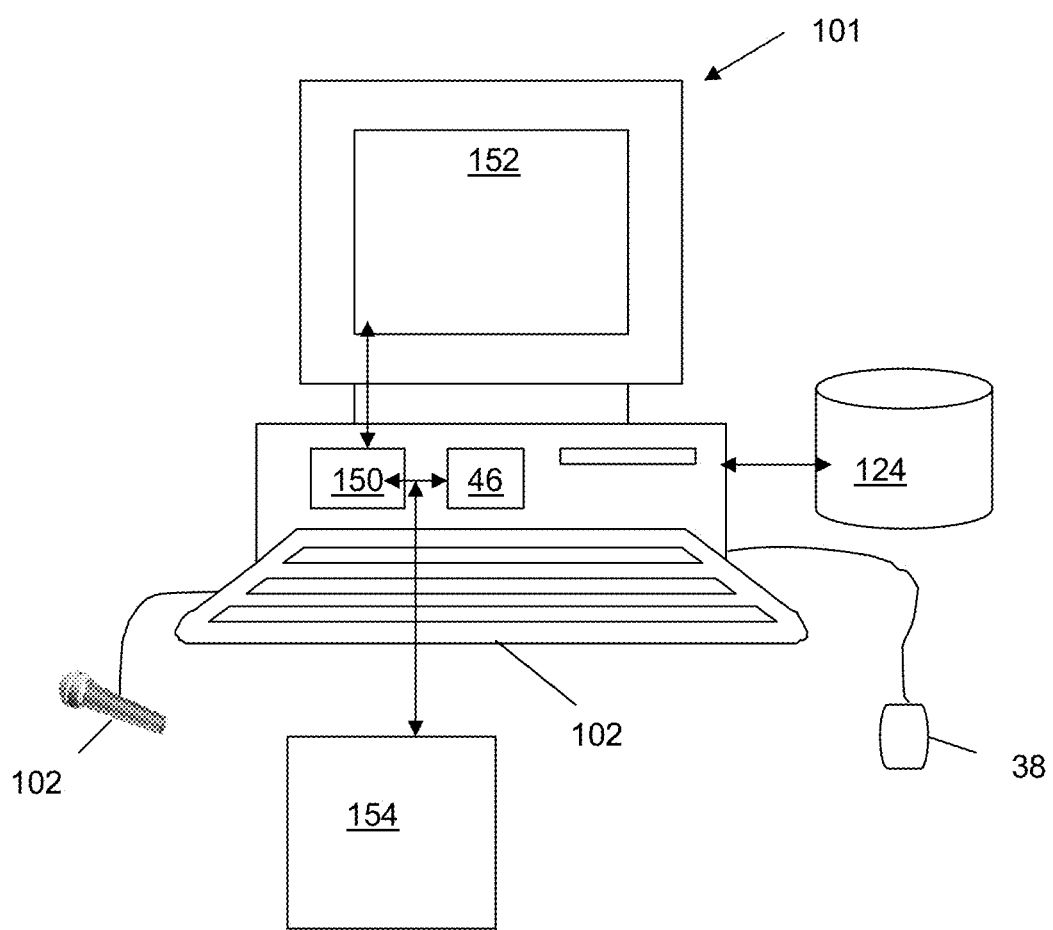
FIG. 13 shows a block diagram of a computer device for implementing the components of the environment of FIG. 1.

Referring to FIG. 13, a generic electronic device 101 can include input devices 102, such as a keyboard, microphone, mouse and/or touch screen by which the user interacts with the visual interface 102. It will also be appreciated that the engine 40, 44, 200 resides on an electronic device 101, for example as separate devices 101 for the engine 40 and the engine 200, and/or the engine 44, for example. A processor 150 can co-ordinate through applicable software (e.g. the engines 40,44,200) the entry of data and requests into the memory 124,224 and then display the results on a screen 152. A storage medium 46 can also be connected to device 101, wherein software instructions and/or member data is stored for use by the engine 40, 44, 200. As shown, the device 101 also includes a network connection interface 154 for communicating over the network 11 with other components of the environment 10 (see FIG. 1), e.g. the engine 200 can communicate to the database 224, the engine 40 can communicate with the database 224, the engine 44 can communicate with the database 224, and the engines 40, 44, 200 can communicate with one another.

The stored instructions on the memory 124 (for example the modules of the respective engine 40,44,200) can comprise code and/or machine readable instructions for implementing predetermined functions/operations including those of an operating system, the engine 40, 200 configuration, or other information processing system, for example, in response to commands or inputs provided by a user of the engine 40, 44, 200. The processor 150 (also referred to as module(s) for specific components of the engines 40, 44, 200) as used herein is a configured device and/or set of machine-readable instructions for performing operations as described by example above.

As used herein, the processor/modules in general may comprise any one or combination of, hardware, firmware, and/or software. The processor/modules act upon information by manipulating, analyzing, modifying, converting or transmitting information for use by an executable procedure or an information device, and/or by routing the information with respect to an output device. The processor/modules may use or comprise the capabilities of a controller or microprocessor, for example. Accordingly, any of the functionality provided by the systems and processes of FIGS. 1-20 may be implemented in hardware, software or a combination of both. Accordingly, the use of a processor/modules as a device and/or as a set of machine readable instructions is hereafter referred to generically as a processor/module for sake of simplicity.

It will be understood by a person skilled in the art that the memory 124,224 storage described herein is the place where data is held in an electromagnetic or optical form for access by a computer processor. In one embodiment, storage 124, 224 means the devices and data connected to the computer through input/output operations such as hard disk and tape systems and other forms of storage not including computer memory and other in-computer storage. In a second embodiment, in a more formal usage, storage 124,224 is divided into: (1) primary storage, which holds data in memory (sometimes called random access memory or RAM) and other "built-in" devices such as the processor's L1 cache, and (2) secondary storage, which holds data on hard disks, tapes, and other devices requiring input/output operations. Primary storage can be much faster to access than secondary storage because of the proximity of the storage to the processor or because of the nature of the storage devices. On the other hand, secondary storage can hold much more data than primary storage. In addition to RAM, primary storage includes read-only memory (ROM) and L1 and L2 cache memory. In addition to hard disks, secondary storage includes a range of device types and technologies, including diskettes, Zip drives, redundant array of independent disks (RAID) systems, and holographic storage. Devices that hold storage are collectively known as storage media.

Referring to FIG. 13, the engines 40, 44, 200 reside on and are implemented by one or more generic electronic devices 101. Generic device 101 may be a server that makes available the engine 40,44,200 to the user over the network 11. As known, device 101 may include input devices 102, such as a keyboard, microphone, mouse and/or touch screen by which the user of the engine 40,44,200 interacts with the engine 40,44,200 via the visual interface 102. A processor 152 can co-ordinate through applicable software the entry of data and requests into the memory 124,224 and then display/present the results on a screen as visual representation 102,152. Further, it is recognized that the visual representation 102,152 (e.g. the hierarchies 260,360) can be presented (as a result of operation of the engine 40,44,200) to the user on their client (e.g. of the engine 40,44,200 implemented on a networked server) electronic device 101 via the network 11. A storage medium 46 can also be connected to device 101, wherein software instructions, applications 14, member data, and other data is stored for use by the engine 40,44,200, for execution by the respective processor(s) 150.

The software instructions may comprise code and/or machine readable instructions for implementing predetermined functions/operations including those of an operating system, the engine 40,44,200, or other information processing system, for example, in response to commands or inputs provided by a user and/or the provider of the engine 40,44, 200. The processor 150 (also referred to as module(s) for specific components of the engine 40,44,200) as used herein is a configured device and/or set of machine-readable instructions for performing operations as described by example above. Some or all of the modules of the engine 40,200 may be distributed across a network as applications or reside on the electronic device 101. As is understood, some or all of the modules of the engine 40,44,200 may also be downloadable to the electronic device 101.

As used throughout, the processor/modules on the device 101 of the engine 40,200 in general may comprise any one or combination of, hardware, firmware, and/or software. The processor/modules act upon information by manipulating, analyzing, modifying, converting or transmitting information for use by an executable procedure or an information device, and/or by routing the information with respect to an output device. The processor/modules may use or comprise the capabilities of a controller or microprocessor, for example. Accordingly, any of the functionality provided by the systems and processes of FIGS. 1-20 may be implemented in hardware, software or a combination of both. Accordingly, the use of a processor/modules as a device and/or as a set of machine readable instructions is referred to generically as a processor/module for sake of simplicity.

Database 224

A database or tables 224 is a further embodiment of memory as a collection of information that is organized so that it can easily be accessed, managed, and updated. In one view, databases can be classified according to types of content: bibliographic, full-text, numeric, and images. In computing, databases are sometimes classified according to their organizational approach. As well, a relational database is a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Computer databases 224 typically contain aggregations of data records or files, such as sales transactions, product catalogs and inventories, and customer profiles. Typically, a database manager provides users the capabilities of controlling read/write access, specifying report generation, and analyzing usage. Databases and database managers are prevalent in large mainframe systems, but are also present in smaller distributed workstation and mid-range systems such as the AS/400 and on personal computers. SQL (Structured Query Language) is a standard language for making interactive queries from and updating a database such as IBM's DB2, Microsoft's Access, and database products from Oracle, Sybase, and Computer Associates.

Memory storage is the electronic holding place for instructions and data that the computer's microprocessor 150 can reach. When the computer 101 is in normal operation, its memory 124,224 usually contains the main parts of the operating system and some or all of the application programs and related data that are being used. Memory is often used as a shorter synonym for random access memory (RAM). This kind of memory is located on one or more microchips that are physically close to the microprocessor in the computer.

Example Operation of the Adjudication Engine 40

Figure 14:
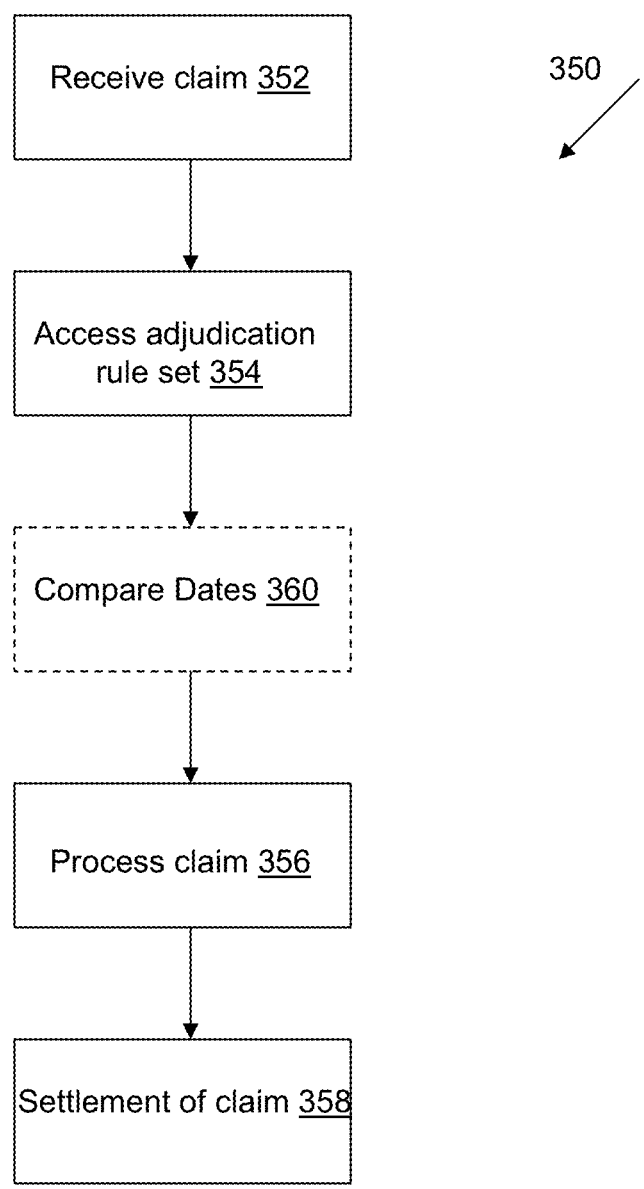
FIG. 14 is a flow-chart of steps performed by the adjudication engine of the environment of FIG. 2.

Referring to FIG. 14, shown is an example operation 350 of the adjudication engine 40 for processing insurance claims 12 using a set of adjudication rules. At step 352, the adjudication engine 40 receives the claim 12 for processing, the received claim 12 having claim content including a claim date. At step 354, the adjudication engine accesses the set of adjudication rules in the database 224 appropriate to the content of the received claim 12. The set of adjudication rules is structured in a plurality of containers including a primary rule container 226 and a plurality of secondary rule containers 228, each of the plurality of secondary rule containers 228 being coupled to the primary rule container 226 by a respective container reference 229. Each of the plurality of secondary rule containers 228 contains one or more adjudication rules 100 adapted for processing the claim content of the received claim 12, such that each of the one or more adjudication rules 100 is coupled to their respective secondary container 228 by their respective rule reference 227, wherein the set of adjudication rules defines the rule hierarchy 260. At step 356, the adjudication engine 40 processes the content of the received claim 12 with the one or more adjudication rules 100 facilitated by an execution order defined by the ordering of the container references 229 in the primary rule container 226. At step 358, the result of the processed claim is used to determine subsequent settlement of the received claim 12.

It is recognized in step 356, the processing of the claim content can include accessing a set of benefit codes 103 appropriate to the received claim 12, such that the set of benefit codes 103n is structured in a plurality of benefit containers including a primary benefit container 326 and a plurality of secondary benefit containers 328. Each of the plurality of secondary benefit containers 328 is coupled to the primary benefit container 326 by their respective benefit container reference 329. Each of the plurality of secondary benefit containers 328 contains one or more benefit codes 103 adapted for processing the claim content of the received claim 12, such that each of the one or more benefit codes 103 is coupled to their respective secondary benefit container 328 by their respective benefit reference 327, wherein the set of benefit codes 103 defines the benefit hierarchy 360.

It is also recognized that an optional step is 360 is comparing the claim date to the effective date(s) and/or expiry date(s) of the container references 227,229,327,329, in order to determine if the respective secondary rule containers 228 are part of the set of adjudication rules for use in processing the received claim 12, such that the non-matching dates exclude the respective secondary rule container 228 from being included in the execution order. As well, part of the optional step can include comparing the claim date to the effective date(s) and/or expiry date(s) of the container references 227, 229,327,329, in order to determine if the respective rules 100 are part of the set of adjudication rules for use in processing the received claim 12, such that the non-matching dates exclude the respective rules 228 from being included in the execution order of their secondary containers 228. It is recognized that similar comparisons can be done for the inclusion/exclusion decision making for the benefit codes 103 and the secondary benefit containers 328, as desired.

Example Operation of the Composer Engine 200

Figure 15:
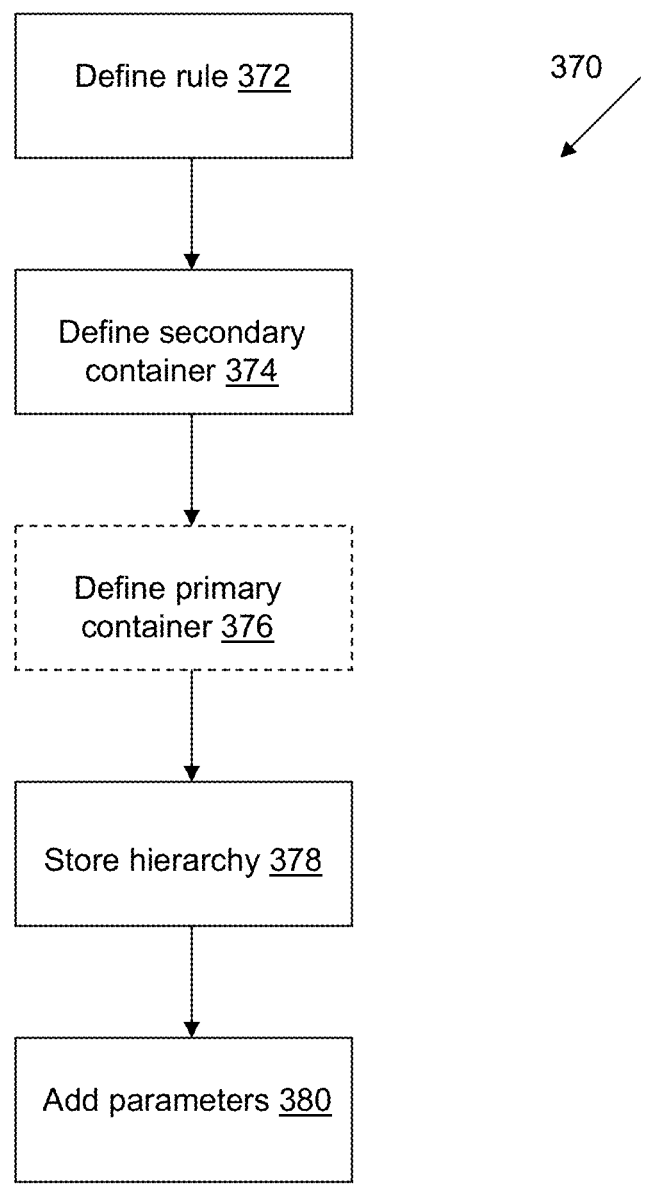
FIG. 15 is a flow-chart of steps performed by the composer engine of the environment of FIG. 2.

Referring to FIG. 15, shown is an example operation 370 of the composer engine 200 for generating a set of adjudication rules for use in processing an insurance claim, the set of adjudication rules representing the hierarchy 260. At step 372, defining adjudication rule(s) 100. At step 374, defining a secondary rule container 228 and coupling the adjudication rule 100 to the secondary rule container 228 by a rule reference 227 associated with the content of the secondary rule container 228. At step 376, defining a primary rule container 226 and coupling the secondary rule container 228 to the primary rule container 226 by a container reference 229 associated with the content of the primary rule container 226, such that the adjudication rule 100, the containers 226,228, and the rule and container references 227,229 defining the rule hierarchy 260 for representing the set of adjudication rules. At step 378, storing the set of adjudication rules in the memory 124,224; wherein the set of adjudication rules is configured to facilitate the processing of content of the insurance claim 12 with the adjudication rule by an execution order defined by the ordering of the container reference 229 in the primary rule container 226. At step 380, adding parameter values to the adjudication rules. It is recognized that similar steps can be done to the above, in order to include benefit codes in a benefit hierarchy 360 linked 240 to the rules 100, as described by example above.

Example Operation of the Plan Engine 44

Figure 21:
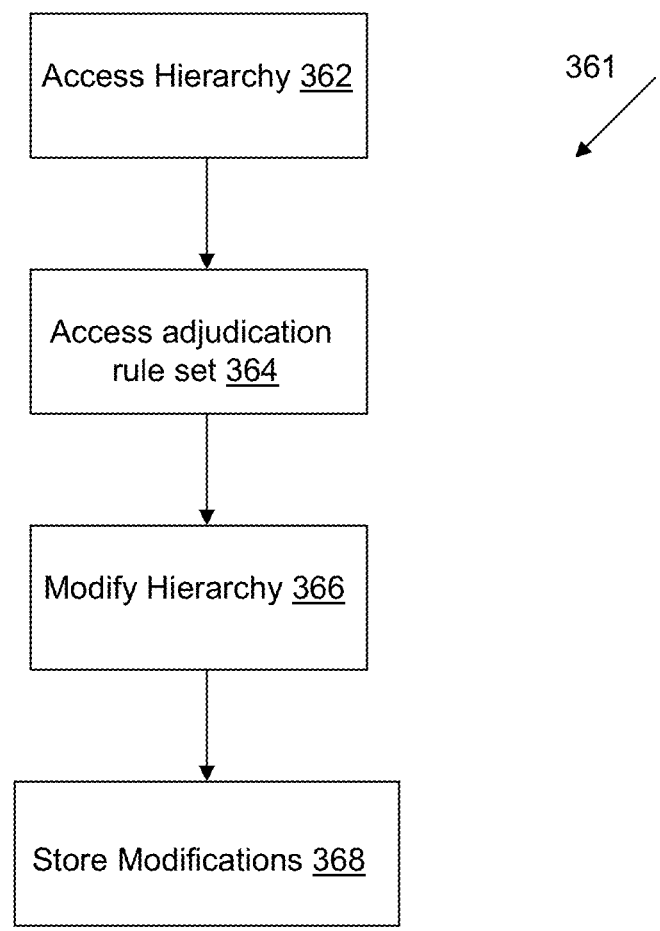
FIG. 21 is a flow chart of steps performed by the plan engine of FIG. 2.

Referring to FIG. 21, operation 361 of the plan engine 44 is shown, for modifying benefit coverage including a plurality of benefit codes 103 of an insurance plan 42, such that the insurance plan 42 is for use in adjudicating one or more insurance claims 12 by the adjudication engine 40. At step 362, the engine 44 accesses a set of benefit codes 103 structured in a plurality of benefit containers 326,328 including a primary benefit container 326 and a plurality of secondary benefit containers 328, each of the plurality of secondary benefit containers 328 being coupled to the primary benefit container 326 by a respective benefit container reference 329, each of the plurality of secondary benefit containers 328 containing one or more benefit codes 103 adapted for processing a claim content of the one or more insurance claims 12, each of the one or more benefit codes 103 being coupled to their respective secondary benefit container 328 by a respective benefit reference 327, the set of benefit codes 103 defining a benefit hierarchy 360. At step 364, the engine 44 selects the primary benefit container 326 for inclusion in the insurance plan 42. At step 366, the benefit module modifies the benefit hierarchy 360 by performing at least one of adding an additional benefit container reference 329 to the primary benefit container 326, modifying a container benefit parameter 52 of at least one of the benefit container references 329, or deleting at least one of the existing benefit container references 329. At step 368, the deployment module 438 stores the modified insurance plan 42 in the memory 224; wherein the stored modified insurance plan 42 is adapted for subsequent use in adjunction of appropriate insurance claims 12 received by the adjudication system 18.

It is recognized that step 366 can be substituted instead for accessing a set of adjudication rules structured in a plurality of containers including a primary rule container 226 and a plurality of secondary rule containers 228, each of the plurality of secondary rule containers 228 being coupled to the primary rule container 226 by a respective container reference 229, each of the plurality of secondary rule containers 228 containing one or more adjudication rules 100 adapted for processing the claim content of the received claim 12, each of the one or more adjudication rules 100 being coupled to their respective secondary container 228 by a respective rule reference 227, the set of adjudication rules defining the rule hierarchy 260.

It is recognized that step 366 can be substituted instead for selecting the primary rule container 226 for inclusion in the insurance plan 42, modifying the rule hierarchy 260 by performing at least one of adding an additional rule container reference 229 to the primary rule container 226, modifying a rule container parameter 52 of at least one of the rule container references 229, or deleting at least one of the existing rule container references 229.

It is recognized that step 366 can be substituted instead for modifying the benefit hierarchy 360 by performing at least one of adding an additional benefit reference 327 to at least one of the secondary benefit containers 328, modifying a benefit reference parameter 52 of at least one of the benefit references 327, or deleting at least one of the existing benefit references 327.

In view of the above, it is recognized that modification of the plan 42 can include any modifications to any of the references 227,229,327,329 (either existing or added or deleted) in any order (i.e. blocks 228,328 content is modified before blocks 226,326 content is modified, blocks 226,228 content is modified before blocks 326,328 content is modified, blocks 326,328 content is modified before blocks 226,228 content is modified, etc.).

Example Implementation of the Plan Engine 44

Referring to the following pages, the plan engine 44 is referred to as a plan manager and/or an assignment manager, which is/are used as an application, i.e. a set of instructions stored on a computer readable medium that is executable by a computer processor (see FIG. 13). It is also recognized that all example display screens could be configured for display on the user interface 102 of the device(s) 101 associated with use of the plan engine 44 by the user. The plan engine 44 is used to modify/maintain the configured adjudication rules 100 and benefits 103 in their configured hierarchy 260,360 of the plan 42, for use by the adjudication engine 40, see FIG. 2. It is recognized that the following example is only meant as one embodiment of a number of possible embodiments of the contents and functionality of the plan engine 44 and it's modules, as well as any described interaction with other engines (e.g. the rule composer aka the composer engine 200).

1 Overview

The Plan Manager application lets users create and manage plan coverage templates that are used as the basis of plan administration in Gamma (see the Gamma User Guide).

Plans are built by combining benefit blocks with rules and business-specific parameter-value groupings to create a unique coverage specification. Once a valid plan reaches its Active Date, the plan is promoted to a production server for access by Gamma users.

1.1 Benefit Hierarchy

The benefit hierarchy allows users to create unique plan configurations from a shared set of plan and benefit data.

The benefit hierarchy crosses multiple lines of business such as dental, drug, medical, and vision. Generally, each super-block contains only blocks of benefits of the same business. However, for reporting purposes users can define super-blocks that cross multiple lines of business.

There are 3 basic elements in the benefit hierarchy: Benefit-Super-Block, Benefit-Block, and Benefit.

1.1.1 Benefit Super-Blocks

Benefit Super-blocks are the highest object in the hierarchy. They are assigned to a plan, or as an override to the enrollment hierarchy. Super-blocks can be assigned to a plan and/or become a plan component.

A super-block can contain any number of benefit blocks. Benefit blocks can be included or excluded, and are time-lined, allowing them to change over time if required. See 5 Super Block Manager for details.

Benefit Super-Blocks can be created in 4 types:

Coverage: include or exclude specific benefit blocks.

Override: include or exclude benefits and override plan coverage.

Fiscal: assign specific Coinsurance, Deductible, and Maximum modules.

Adjudication: assign specific rules (for example, Pricing, COB, etc.) depending on business requirements.

1.1.2 Benefit Blocks

Benefit blocks are a logical grouping of benefit codes. These blocks can represent industry-level categorization or carrier-specific groupings. Benefit blocks are created once and may be referenced by multiple plans.

Benefit blocks can be time-lined, meaning that a benefit block can contain a different number of benefits over time, allowing a benefit that is no longer covered to remove itself from the block (and in turn any associated plans will no longer cover the benefit). See 4.2 Benefit Block Manager for details.

1.1.3 Benefit Codes

Benefits generically refer to a claimable item such as a dental procedure or a pharmacy prescription. A benefit code is a re-usable component. Each benefit is defined only once, and can have a relationship with multiple blocks. See 4.1 Benefit Code Manager for details.

Each benefit is defined with attributes such as benefit code, label, and line of business (dental/medical etc.). Most benefit codes in the Plan Manager system are derived from the CDA industry standards.

1.2 Plan Manager Interface

Each functional aspect of the Plan Manager is opened in a new window within the main application window.

1.2.1 Managing Application Windows

Figure 22:
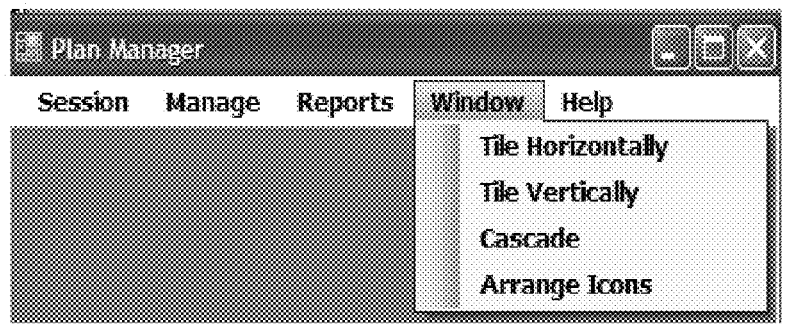
FIGS. 22-111 are exemplary user interfaces of the plan engine of FIG. 2.

Users can work in multiple functional windows simultaneously; functional windows can be minimized, maximized, tiled, or cascaded by selecting the appropriate selection under the Window menu. Refer to FIG. 22.

1.2.2 Sorting Columns

Whenever columns of information are displayed, any column can be selected to sort the display in descending or ascending order. By default, all columns are sorted in descending order based on the first column. To sort any column, click the column's title; clicking that column's title again switches between ascending and descending.

Figure 23:
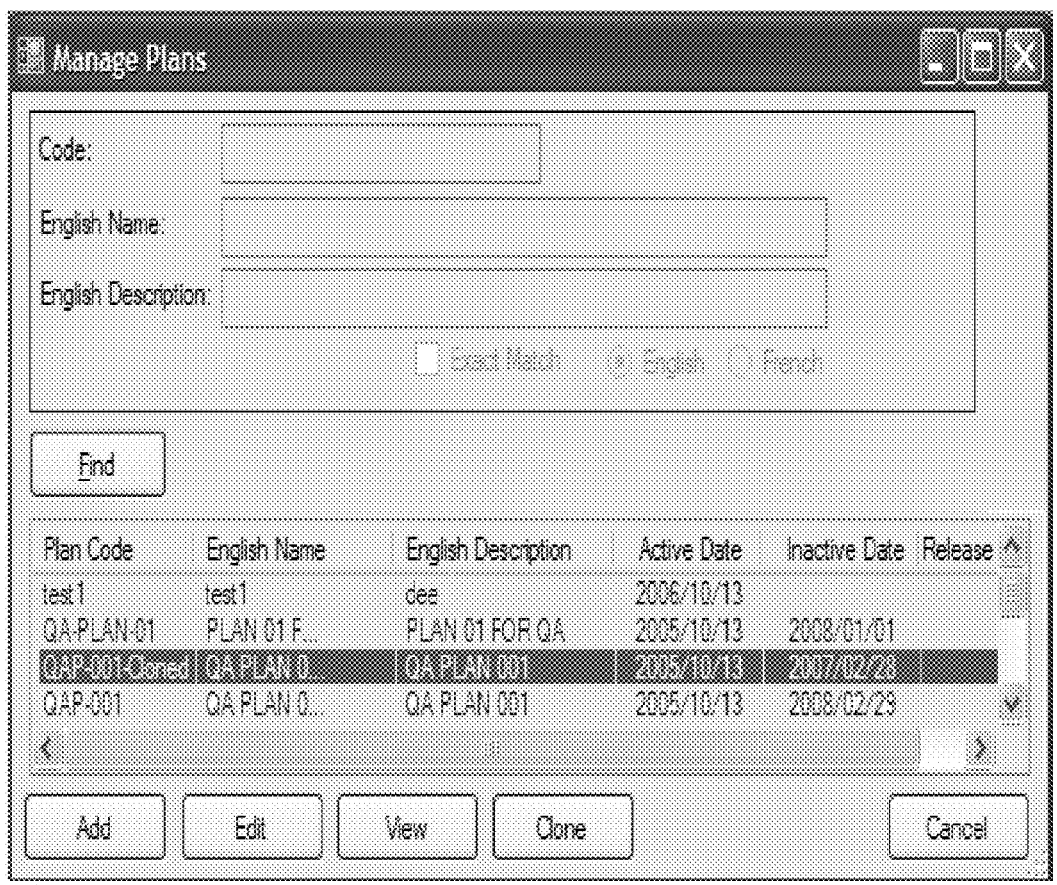

Columns that have been manually sorted are delineated with an arrow appended to the column's title: ^ (ascending) or ˅ (descending). Refer to FIG. 23.

2 Basic Functions

2.1 Logging In

To log into the Plan Manager, you must have a valid User ID and Password.

Figure 24:
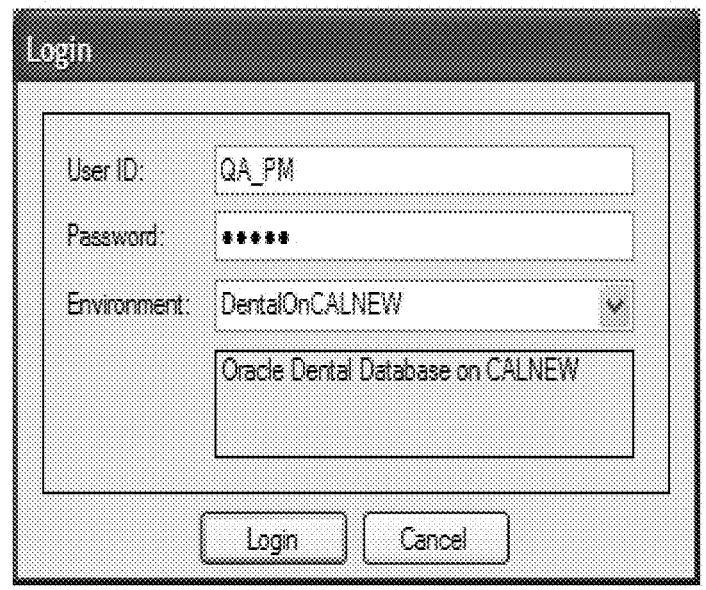

1. Start the Plan Manager application by double-clicking the desktop icon. Refer to FIG. 24.
2. Enter a valid User ID. The application will remember this User ID and automatically populate this field the next time you start the application. User IDs are case-sensitive.
3. Enter a valid Password. Passwords are case-sensitive.
4. Select an Environment from the available drop-down list. This selection will determine the database from which data will be derived. By default, this list is ordered alphabetically and always initially displays the first environment in the list.
5. Click Login.

2.1.1 Select Carrier

If the specified Environment supports multiple carriers, the system will prompt to select the required carrier.

Figure 25:
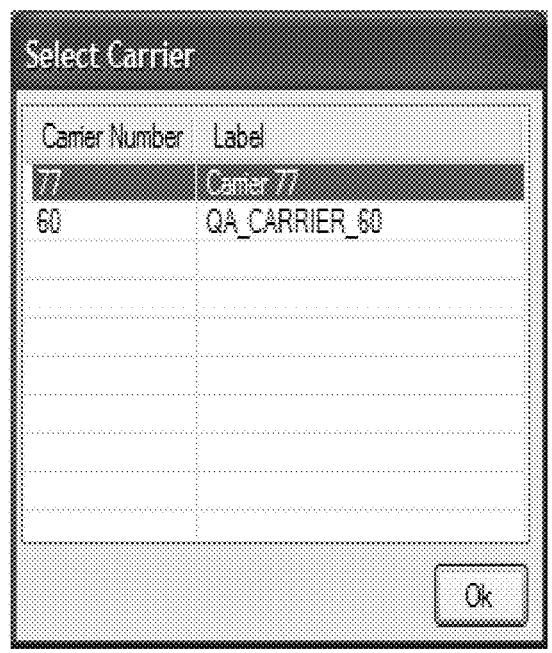

1. Click to select a specific carrier from the displayed list. Refer to FIG. 25.
2. Click Ok to confirm your choice and proceed with the login.

2.2 Logging Off

Figure 26:

To log off or change users:

1. From the Session menu, select Log Off. Refer to FIG. 26.

The log in screen will be re-displayed. You can enter a new User ID and Password, and select a different Environment if necessary.

2.3 Exiting Plan Manager

To close the Plan Manager application, select Exit from the Session menu. Any unsaved data will be lost.

2.4 Searching

Users can search lists of plan data for one or more specific items. Search functionality is common throughout Plan Manager.

Available search criteria is limited to the current screen's primary data identifiers; for example, some screens may allow users to search on Code, Name, and/or Description, while others may only allow a search on Label.

Searches can be performed on either French or English labels and descriptions. Click to select the desired language. If English language is selected, the search results will contain only those plans which match the code criteria and have an English name and description. If French is selected, the search results will contain only those plans that match the code and French name/description criteria. The English name and description will be displayed in the filtered list.

Figure 27:
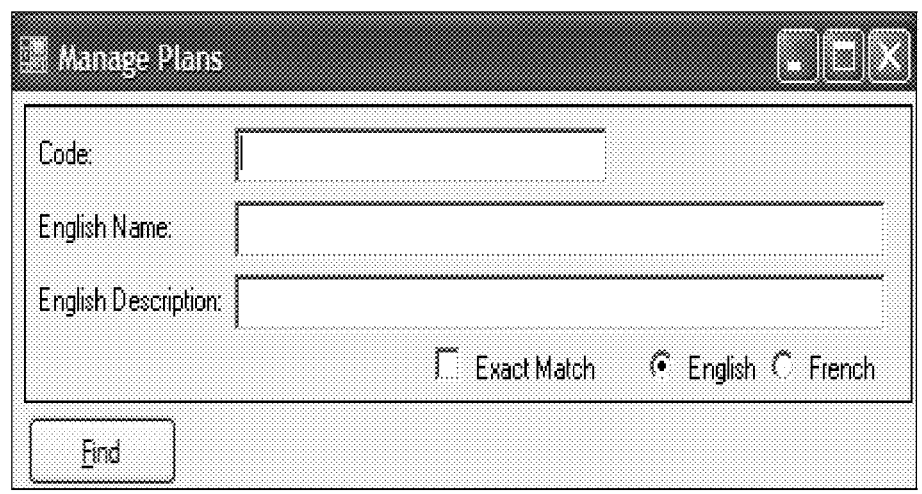

The available search fields are displayed above the Find button: Refer to FIG. 27.

Figure 28:
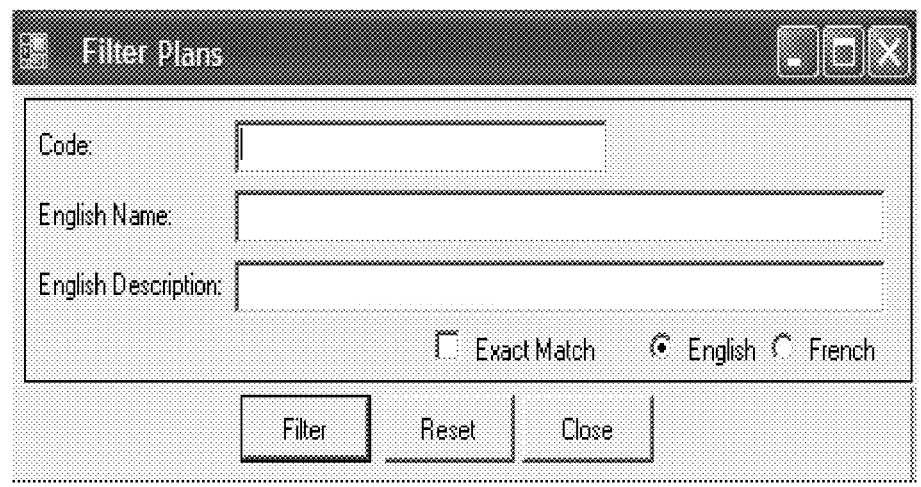

To search the displayed information:

1. Click Find. The filter window is displayed. Refer to FIG. 28.
2. Enter search criteria.

All search criteria are case sensitive. By default, searches will display all results that match the entered characters anywhere in the result. For example, searching on the name Smith would return all instances of Smith, Smithee, Smithereens, John Smith, etc., but would not return smith or hammersmith, etc.

To search only on the exact text that is entered, click to select Exact Match. In this case, searching on the name Smith would only return results that contain Smith.

If more than one search criteria field is specified, the displayed results will contain items that match all specified entries. For example, if code 10098 and name Smith are entered as search criteria, the search may fail even if code 10098 exists but does not have a name of Smith.

3. Click Filter to perform the search and display all matches. To clear all search criteria, click Reset.

3 Managing Plans

Plans are built by combining benefit blocks with rules and business-specific parameter-value groupings to create a unique coverage specification. Once a valid plan reaches its Active Date, the plan is promoted to a production server for access by Gamma users.

To add, edit, or view plan information:

4. From the Manage menu, select Plan.

Figure 29:

The Manage Plans screen displays all plans available in the environment that was specified during login. Refer to FIG. 29.

Figure 30:
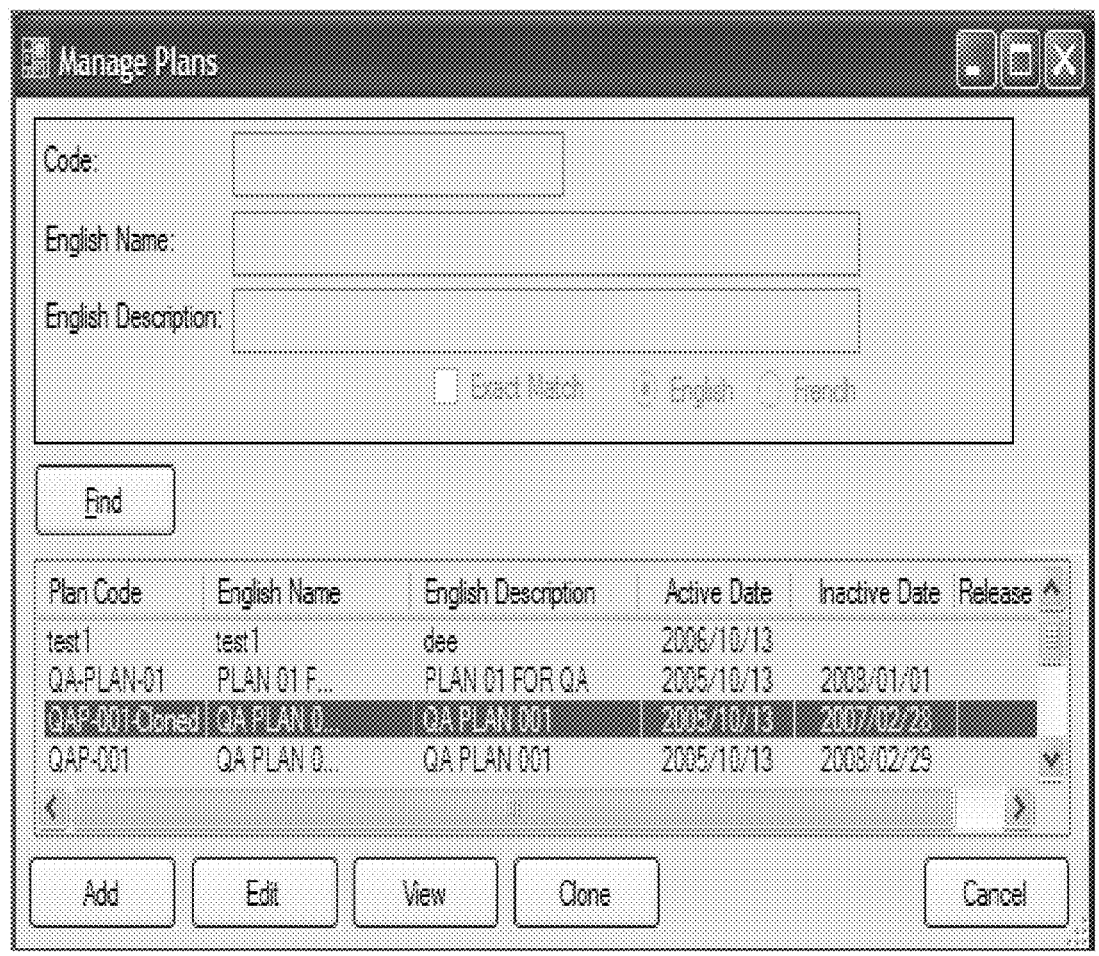

5. Click anywhere on a plan's row to select it. Refer to FIG. 30.

3.1 Adding Plans

To add a new plan:

6. Select Add.

The Add New Plan window displays all standard plan fields (code, language-specific name and description, type, dates, benefit super blocks, and rule super blocks), along with any modules created within Plan Manager (in the example below, coinsurance, deductible, maximum, pricing, COB, and DuplicateClaim-Check).

Figure 31:
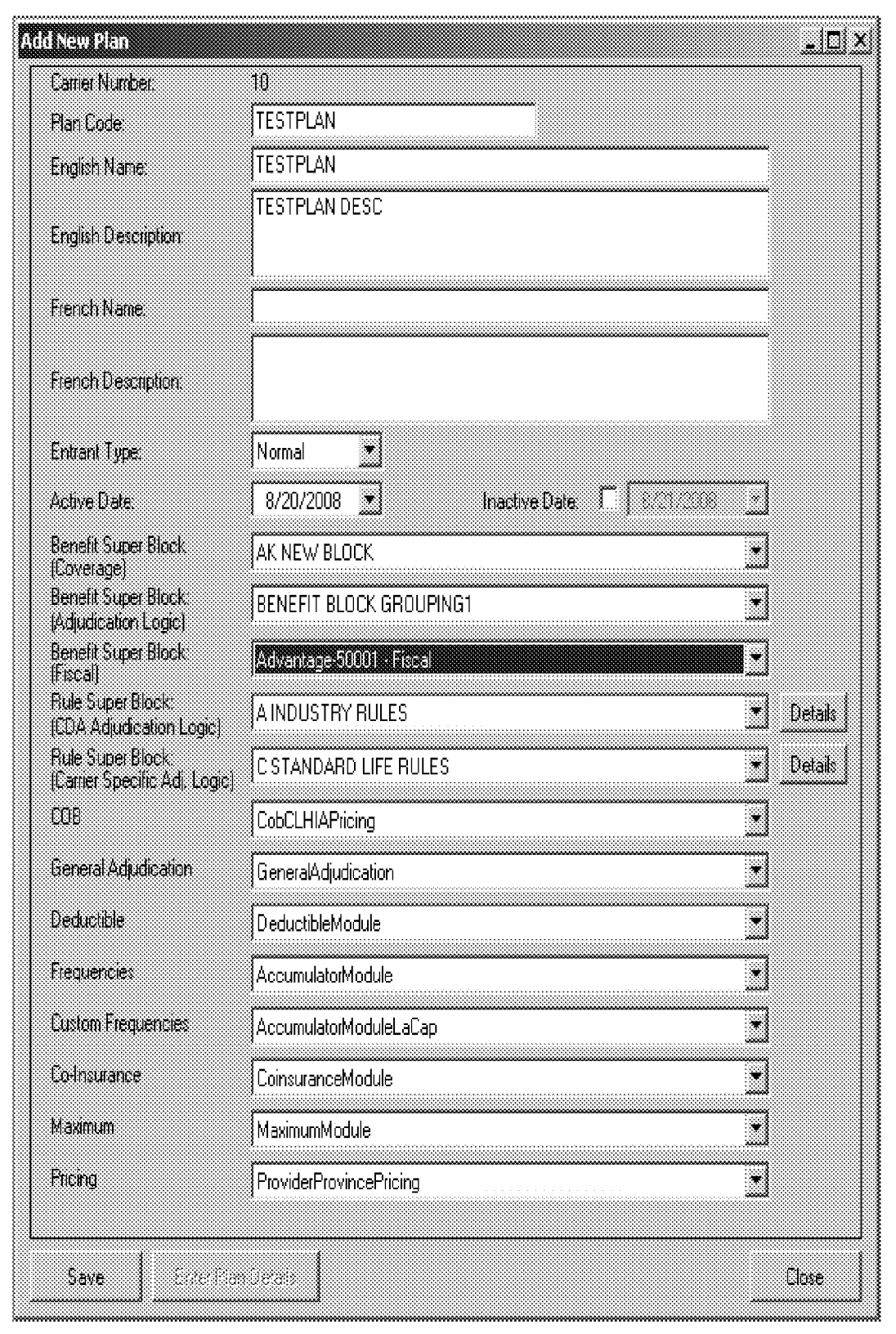

The list of available modules is dynamically created based on the current user's system configuration; users may see more or fewer modules than described here. See 6 Managing Parameter Groups for details. Refer to FIG. 31.

7. Enter or select all mandatory and any optional fields.

Note that any selection field text containing an asterisk (*—for example, Rule Super Block above) contains an ungrouped set of parameters and cannot be selected. See 6 Managing Parameter Groups for details.

Plan Code:

Enter a unique code for this plan. This code should be descriptive, so that other business users can easily identify the plan's content and intent.

Plan codes are case-sensitive and may not contain spaces or special characters (e.g., *, &, etc.). Plan codes are a maximum of ten (10) characters in length.

Plan Name:

Enter the plan name in either English or French. A corresponding language-specific Plan Description must be entered as well.

This name will be displayed whenever the plan information is referenced. This code should be descriptive, so that other business users can easily identify the plan's content and intent.

Plan names are a maximum of fifty (50) characters in length.

Plan Description:

Enter a free-form description of the plan in either English or French. A corresponding language-specific Plan Name must be entered as well.

Plan descriptions are a maximum of two hundred and fifty-five (255) characters in length.

Entrant Type:

Select Normal for regular plan assignments, or Late Entrant for members/recipients who are considered late.

Active Date:

Select the date on which this plan will become active. This field defaults to the current date.

Inactive Date:

If known, enter the date on which this plan will become inactive. Click ☐ to enable the calendar control and select the desired date.

Benefit Super Block (Coverage):

All available benefit super blocks are listed in descending alphabetical order. Select the benefit super block to which this plan will be assigned to define a list of covered services.

Benefit Super Block (Adjudication Logic):

Optionally, select an adjudication logic benefit super block to be applied along with the selected coverage super block.

Benefit Super Block (Fiscal):

Optionally, select a fiscal benefit super block to be applied along with the selected coverage super block.

Rule Super Block (CDA Adjudication Logic):

Select from the list of available CDA adjudication logic rule super blocks. To view information on any of the rule super blocks, select it in the drop-down list and click Details.

Rule Super Block (Carrier Specific Adj. Logic):

Select from the list of available carrier-specific adjudication logic rule super blocks. This rule super block cannot be the same as the CDA adjudication super block. To view information on any of the rule super blocks, select it in the drop-down list and click Details.

Co-Insurance Algorithm:

There is only one co-insurance algorithm currently available in the Plan Manager system. This algorithm is used to generate claims log and customer report information.

Deductible Algorithm:

There is only one deductible algorithm currently available in the Plan Manager system.

Maximum Algorithm:

There is only one maximum algorithm currently available in the Plan Manager system.

Pricing Algorithm:

Select from the available pricing algorithms.

COB Algorithm:

Select from the available COB algorithms.

8. Click Save. If all mandatory fields have not been completed with valid information, the system will prompt for required field entry. Otherwise, the system will prompt to confirm the save.

3.2 Entering Plan Details

Figures 32, 33, 34:
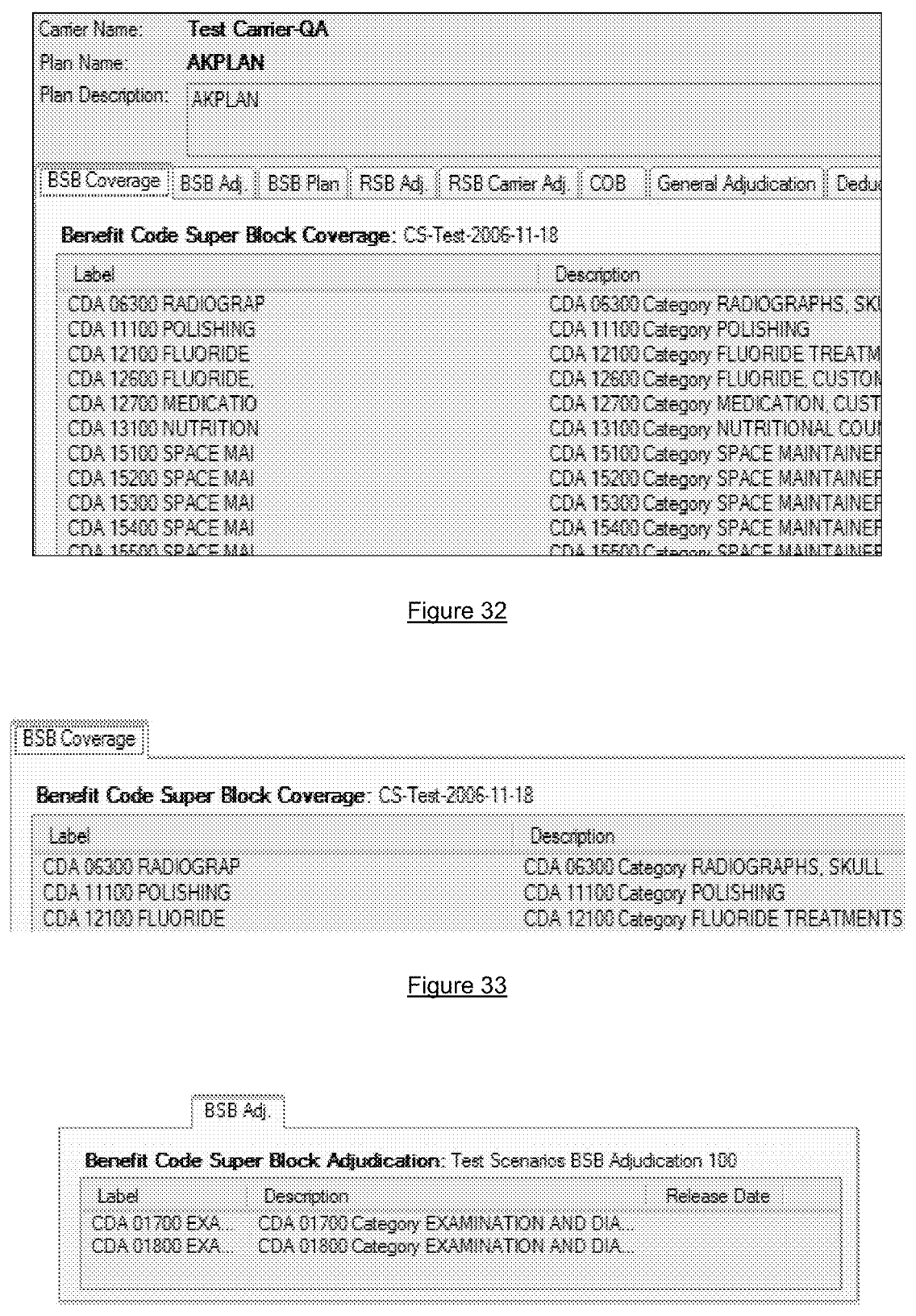

Upon successful save of a new plan, the system prompts to Add Component Details. Plan component details can be entered at a later time by selecting to Edit the plan and updating plan details, or immediately by clicking Enter Plan Details. Refer to FIG. 32.

The system only allows override entries on tabs where item details exist; new item details cannot be added here.

Plan detail parameters under each tab depend on each organization's unique setup: the sample screenshots displayed below may or may not represent the user's actual screen. See 6 Managing Parameter Groups for details.

Prior to saving changes, users must accept each relevant item by clicking to select .

When modifying plan details, users must save changes on each tab before moving to another tab; the system will prompt for save if the user did not click Save prior to changing tabs.

Depending on users' current system configuration, they may see more or fewer modules than described here. See 6 Managing Parameter Groups for further details.

3.2.1 BSB Coverage:

Benefit code super block coverage is display-only. This tab displays details associated with the benefit super block selected on the Create/Edit Plan screen. Refer to FIG. 33.

3.2.2 BSB Adj.:

Benefit code super block adjudication is display-only. This tab displays details associated with the benefit super block adjudication code selected on the Create/Edit Plan screen. The sample screenshot may or may not reflect the actual application screen: see XXX for details on parameters. Refer to FIG. 34.

3.2.3 BSB Plan:

Benefit code super block plan is display-only. This tab displays details associated with the benefit super block selected on the Create/Edit Plan screen. The sample screenshot may or may not reflect the actual application screen: see 6 Managing Parameter Groups for details on parameters. Refer to FIG. 35.

3.2.4 RSB Adj:

The rule super block adjudication tab displays all available parameter groupings to manage the adjudication process. The sample screenshot may or may not reflect the actual application screen: see 6 Managing Parameter Groups for details on parameters. Refer to FIG. 36.

3.2.5 RSB Carrier Adj.:

The rule super block carrier adjudication tab displays all available parameter groupings to manage the carrier adjudication process. The sample screenshot may or may not reflect the actual application screen: see 6 Managing Parameter Groups for details on parameters. Refer to FIG. 37.

Figure 38:
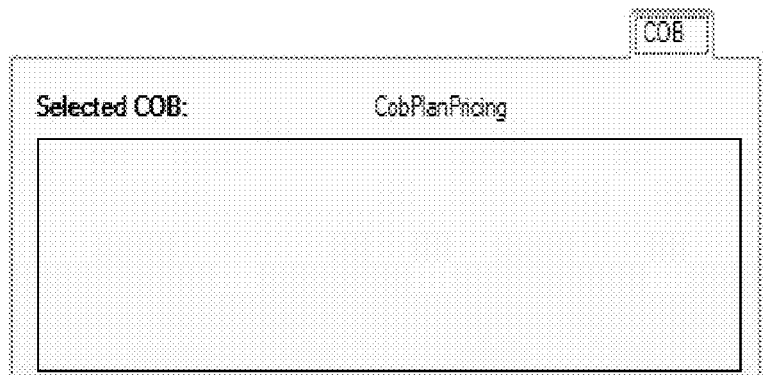

3.2.6 COB Algorithm:

The COB (Co-ordination of Benefits) tab displays all available parameter groupings to manage the cost of benefits. The sample screenshot may or may not reflect the actual application screen: see 6 Managing Parameter Groups for details on parameters. Refer to FIG. 38.

Figure 39:
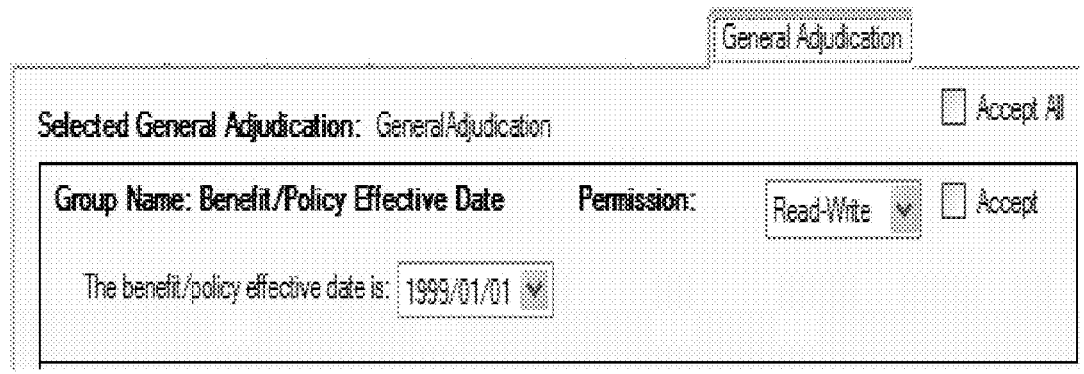

3.2.7 General Adjudication:

The General Adjudication tab displays parameter groupings to manage adjudication. The sample screenshot may or may not reflect the actual application screen: see 6 Managing Parameter Groups for details on parameters. Refer to FIG. 39.

3.2.8 Deductible

The deductible tab displays all available parameter groupings to manage deductibles. The sample screenshot may or may not reflect the actual application screen: see 6 Managing Parameter Groups for details on parameters. Refer to FIG. 40.

3.2.9 Frequencies:

The Frequencies tab displays parameter groupings to manage frequencies. The sample screenshot may or may not reflect the actual application screen: see 6 Managing Parameter Groups for details on parameters. Refer to FIG. 41.

3.2.10 Custom Frequencies:

The Custom Frequencies tab displays parameter groupings to custom frequencies. The sample screenshot may or may not reflect the actual application screen: see 6 Managing Parameter Groups for details on parameters. Refer to FIG. 42.

3.2.11 Co-Insurance

The rule co-insurance tab displays all available parameter groupings to manage co-insurance. The sample screenshot may or may not reflect the actual application screen: see 6 Managing Parameter Groups for details on parameters. Refer to FIG. 43.

3.2.12 Maximum

The maximum tab displays all available parameter groupings to manage limitations for specific procedures. The sample screenshot may or may not reflect the actual application screen: see 6 Managing Parameter Groups for details on parameters. Refer to FIG. 44.

3.2.13 Pricing:

The pricing algorithm tab displays all available parameter groupings to manage pricing specifications. The sample screenshot may or may not reflect the actual application screen: see 6 Managing Parameter Groups for details on parameters. Refer to FIG. 45.

3.2.14 CoPay:

The CoPay tab displays all available parameter groupings to manage CoPay. The sample screenshot may or may not reflect the actual application screen: see 6 Managing Parameter Groups for details on parameters. Refer to FIG. 46.

3.3 Cloning Plans

Figure 47:
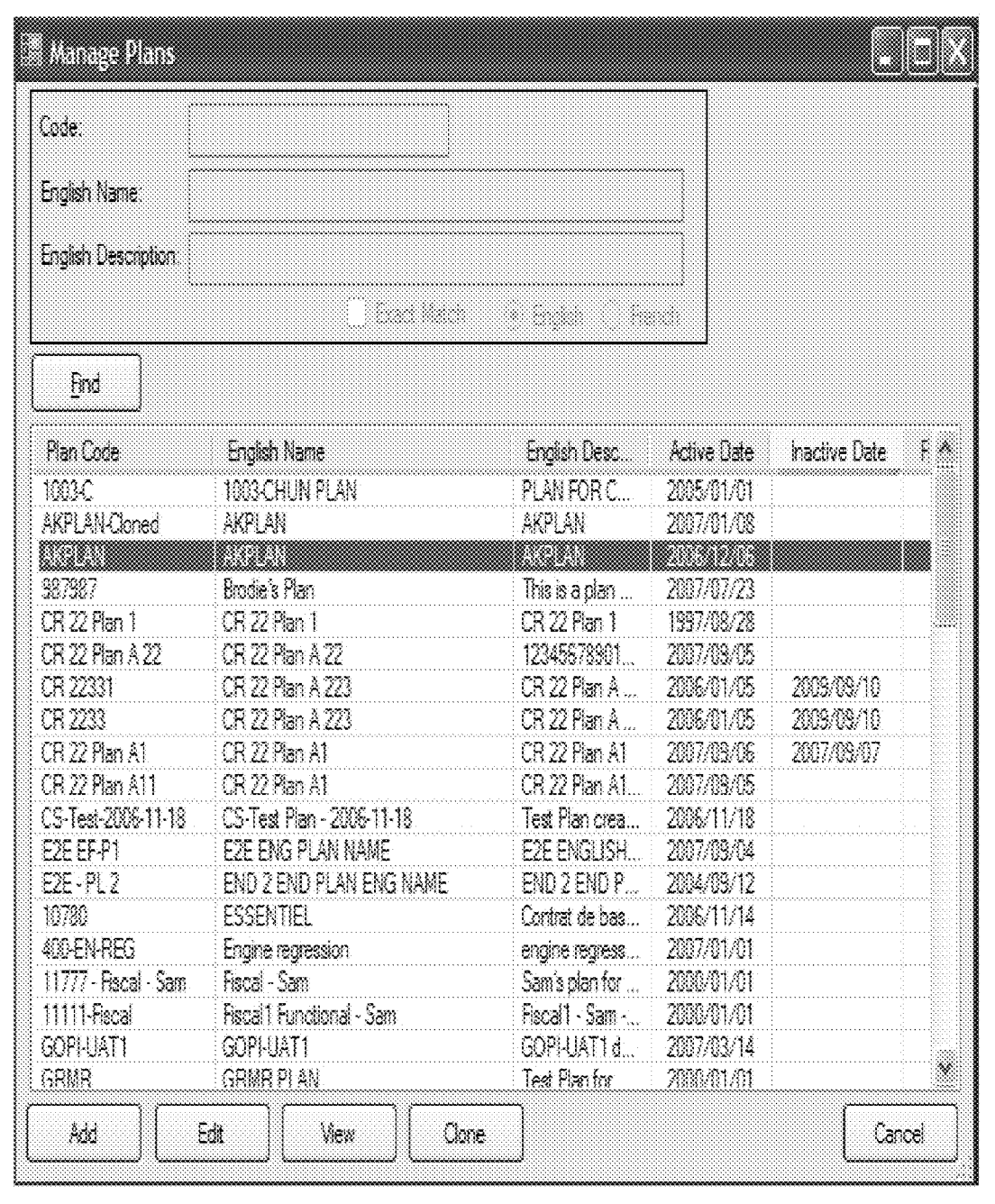

Cloned plans inherit all details of the original plan, including the original name (with—cloned automatically added). Refer to FIG. 47.

To clone a plan:

9. Click to select the plan that you would like to clone.
10. Click Clone.
    The Add New Plan window is displayed. The original name is displayed, with '-cloned' appended. The plan name can be changed, but must be unique. Refer to FIG. 48.
11. Modify fields according to the specific requirements for this plan. See 3.1 Adding Plans for field details.
12. Click Save. If all mandatory fields have not been completed with valid information, the system will prompt for required field entry. Otherwise, the system will prompt to confirm the save.
13. Click Enter Plan Details to modify plan details. See 3.2 Entering Plan Details for more information.

3.4 Editing Plans

To edit a plan:

14. Click to select the plan. Refer to FIG. 49.
15. Click Edit.
    The Edit Plan window is displayed.
    The Plan Code cannot be changed.
16. Change fields as required. See 3.1 Adding Plans and 3.2 Entering Plan Details for field details. Refer to FIG. 50.
17. Click Update to save your changes.

3.5 Viewing Plans

To view plan details:

18. Click to select a plan.
19. Click View to display the Viewing Plan window. Refer to FIG. 51.
20. To view further details, click any of the Details buttons.
21. Click Close to return to the Manage Plans screen.

3.6 Un-Releasing a Plan

Figure 52:
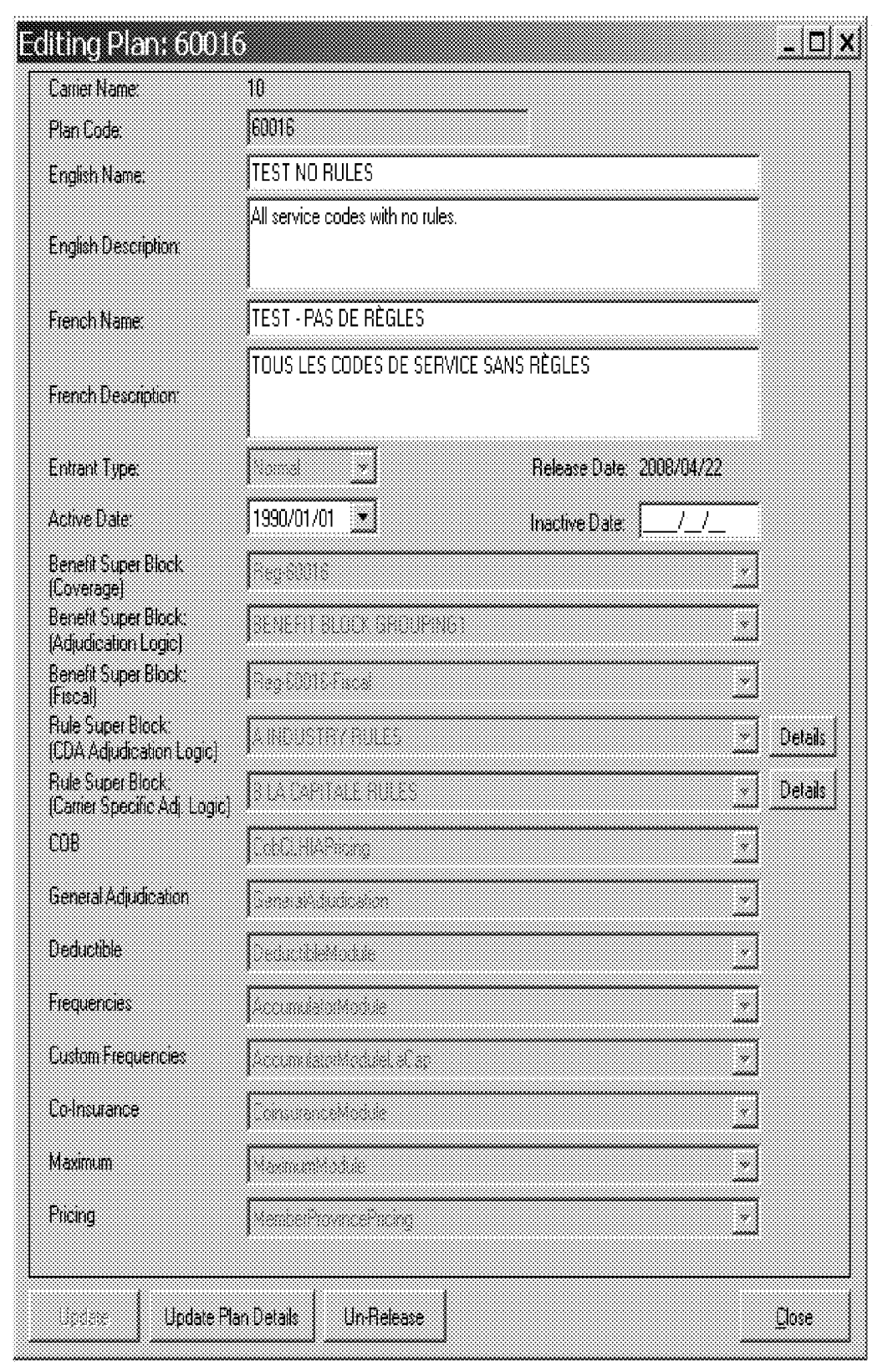

To edit a plan that has been released to production, click the "Un-Release" button. This will place the form in edit mode. Click the "Update" button to save the plan. Refer to FIG. 52.

Figure 53:
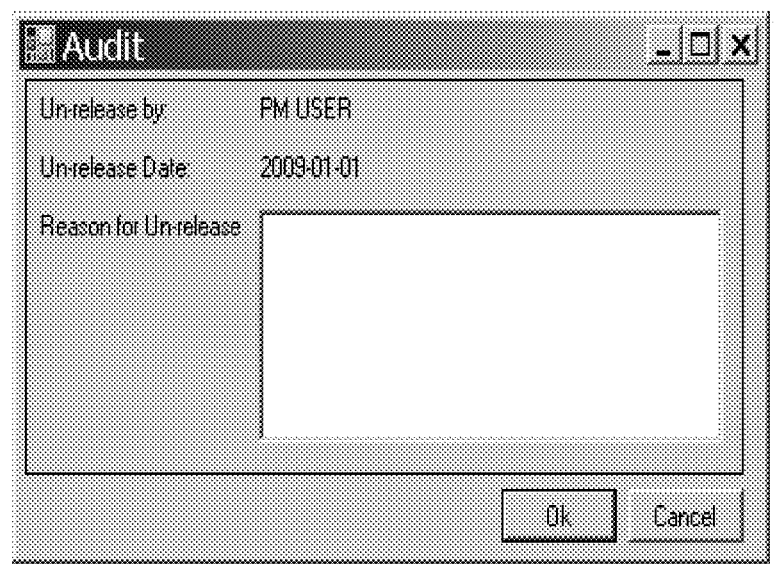

A dialog box will be displayed to capture the audit information. Click "Ok" button to save, this information will be saved in the audit tables and the plan is updated. Refer to FIG. 53.

4 Managing Benefits

Benefits in the system can be grouped in blocks and super blocks to accommodate any configuration of plan coverage.

4.1 Benefit Code Manager

Figure 54:
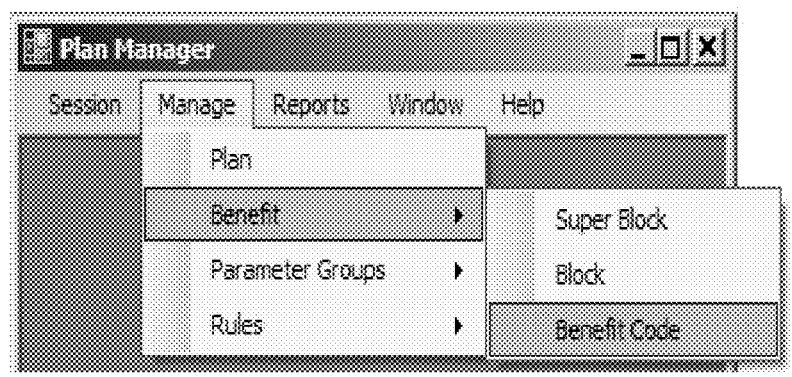
Figure 55:
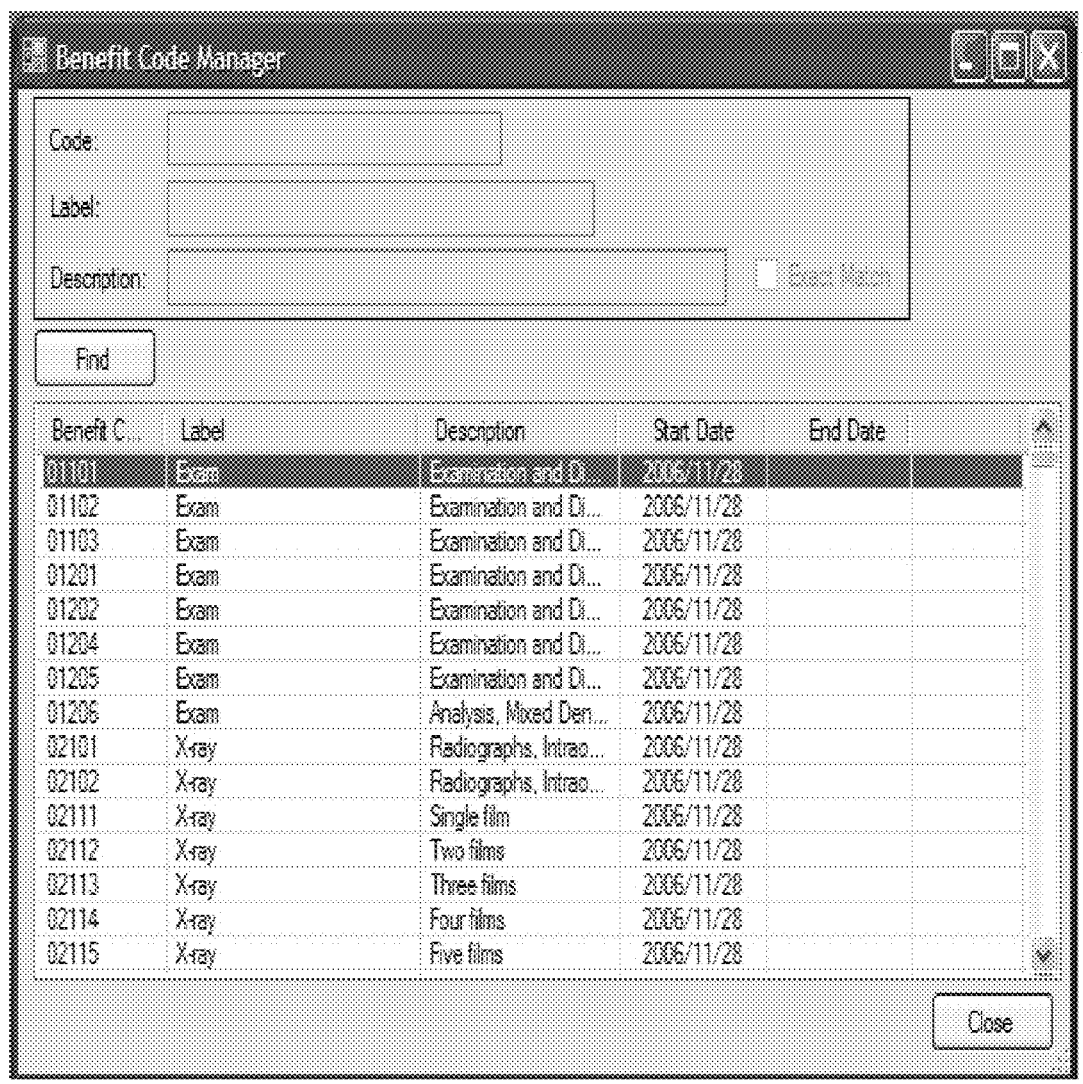

To find benefit codes:

22. From the Manage menu, select Benefit→Benefit Code. Refer to FIG. 54.
23. The Benefit Code Manager screen displays all benefits available in the environment that was specified during login. Refer to FIG. 55.

4.2 Benefit Block Manager

Benefit blocks are a logical grouping of benefits that serve a specific business requirement. These blocks can represent industry-level categorization or carrier-specific groupings.

The contents of benefit blocks is be used to create a list of service codes that are consider as eligible dental services for reimbursement.

It is important that Benefit Block labels are concise and make business sense. Benefit blocks are intended to be re-used, and also identify the coinsurance groupings of the covered dental services. Benefit block labels, when re-used for the fiscal coinsurance groupings, are returned in the claims experience logs.

Figure 56:
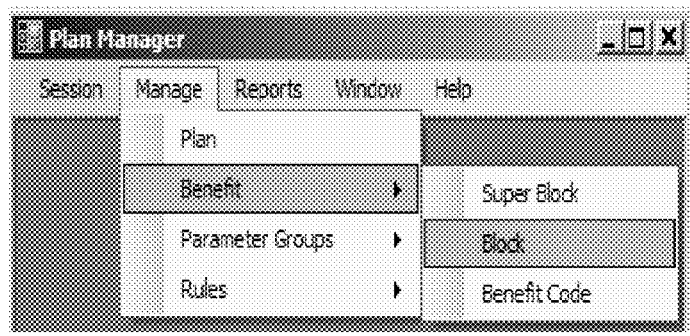
Figure 57:
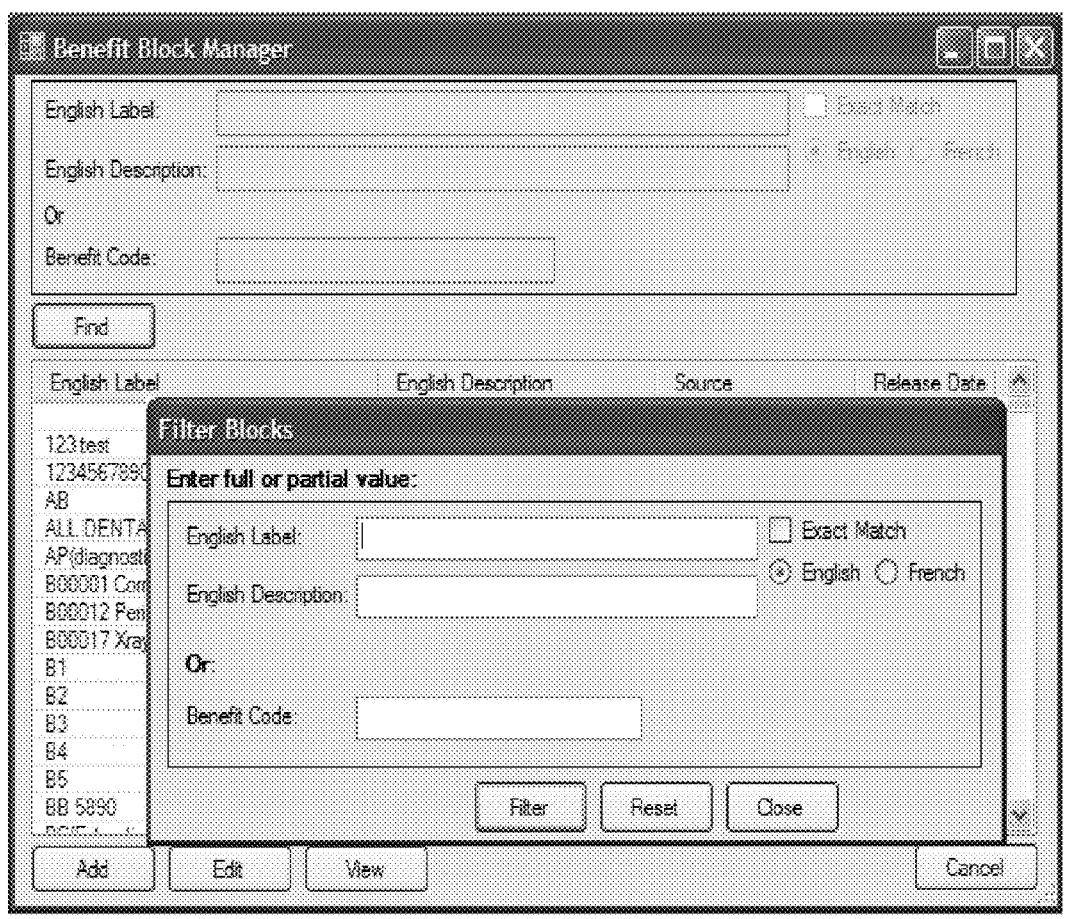

To display and manage benefit block information:

24. From the Manage menu, select Benefit→Block. Refer to FIG. 56.
    The Benefit Block Manager screen displays all benefit blocks currently available in the environment that was specified during login.
25. Click to select a benefit block.
    To find a specific benefit block (or benefit code within a block) within the displayed list, click Find. Enter search criteria, and click Filter. The list of available benefit blocks will be filtered to contain only those blocks that match the specified criteria. Refer to FIG. 57.

4.2.1 Configuring Benefit Blocks

Figure 58:
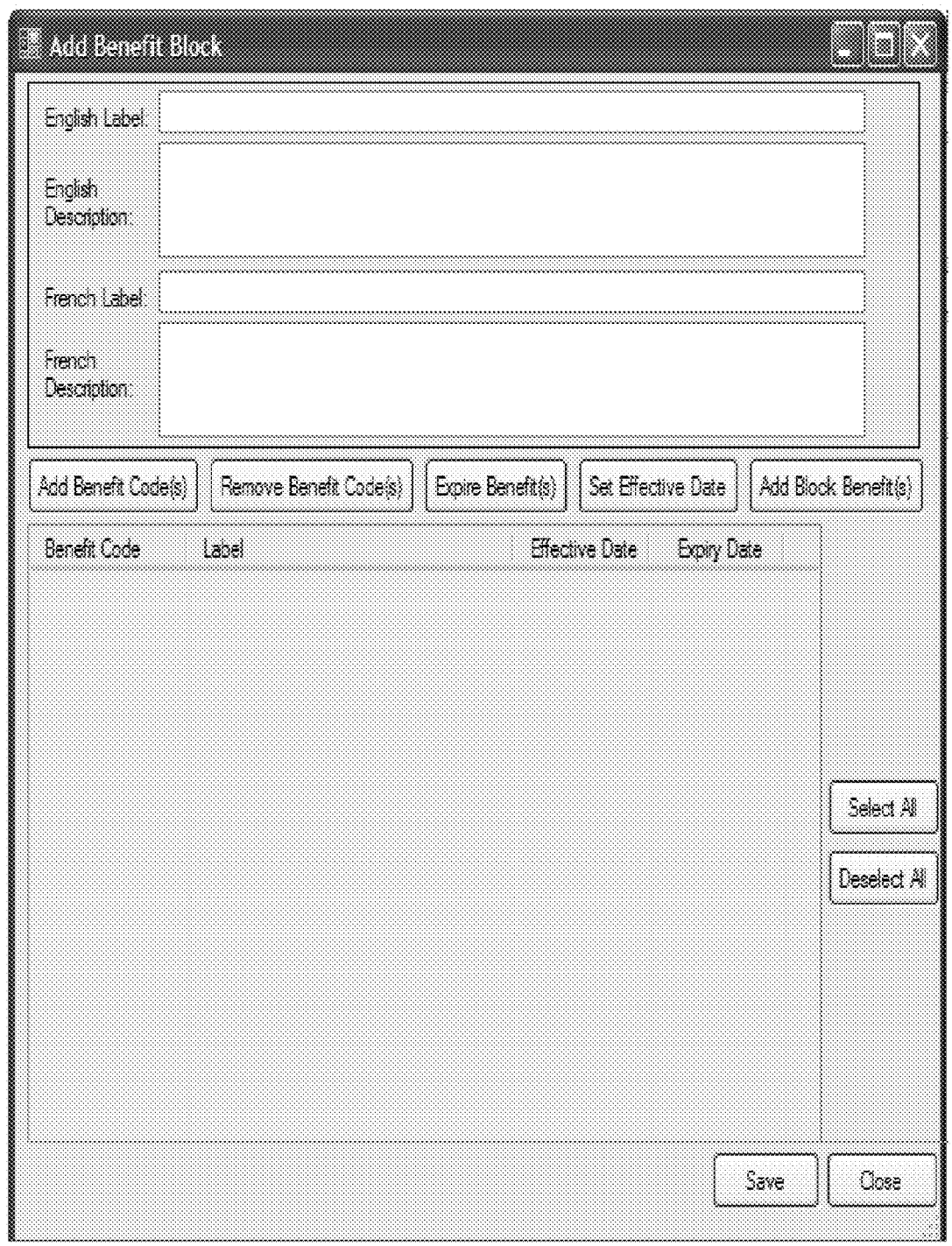

To configure a new benefit block:

26. Click Add to display the Add Benefit Block window. Refer to FIG. 58.
27. Enter a label and corresponding description for this block in either English or French.
    Labels are a maximum of fifty (50) characters in length, and descriptions are a maximum of two hundred and fifty-five (255) characters in length.
28. Click Add Benefit Code(s) to add benefits (see 4.2.2 Add Benefit Code(s) for details). Click Add Block Benefit(s) to add a block of benefits to this block (see 4.2.3 Add Blocks of Benefit(s) for details).
29. Remove, expire, and/or set the effective date for any or all benefit codes. See 4.2.4 Remove Benefit Code(s) from a Block, 4.2.5 Set Expiry Date for Benefit(s) in a Block, and 4.2.6 Set Effective Date for Benefits in a Block for details.
30. Click Save to save the new benefit block.

4.2.2 Add Benefit Code(s) to a Block

Benefit codes can be added to new or existing benefit blocks.

Figure 59:
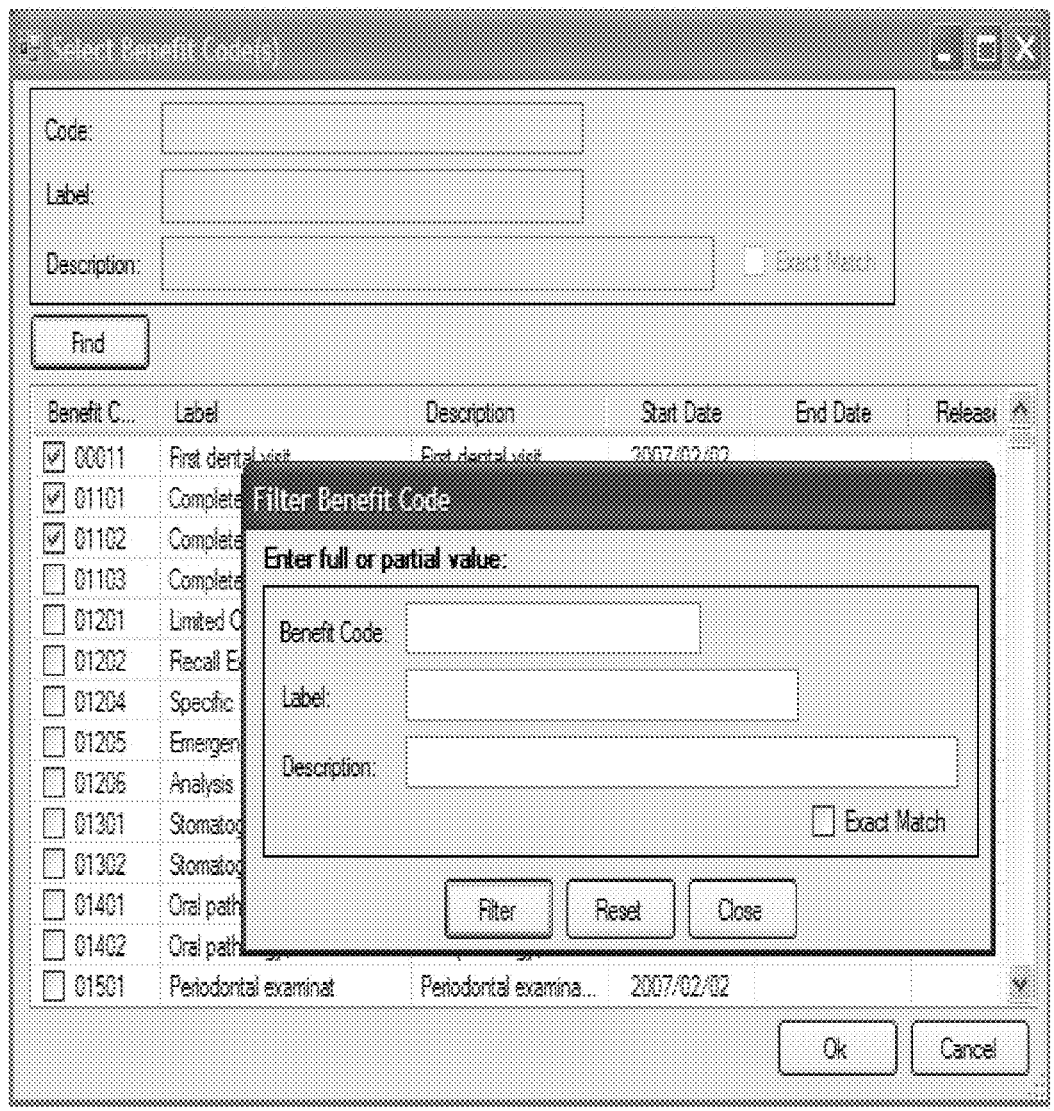

To add benefit codes:

31. Click Add Benefit Code(s) to display the Select Benefit Code(s) window. All available benefit codes are displayed.
    To find a specific benefit code within the displayed list, click Find. Enter search criteria, and click Filter. The list of available benefits will be filtered to contain only those benefits that match the specified criteria. Refer to FIG. 59.
32. Click ☐ to select any or all of the benefit codes.
33. Click OK to add the specified benefit(s) to the current block. If any of selected benefit codes already exist in the current block, a warning will be displayed and the duplicate benefits will not be added.

4.2.3 Add Blocks of Benefit(s)

A benefit block may contain another benefit block along with its individual benefit codes, as long as the secondary benefit block does not contain any of the benefits already included in the current block.

Figure 60:
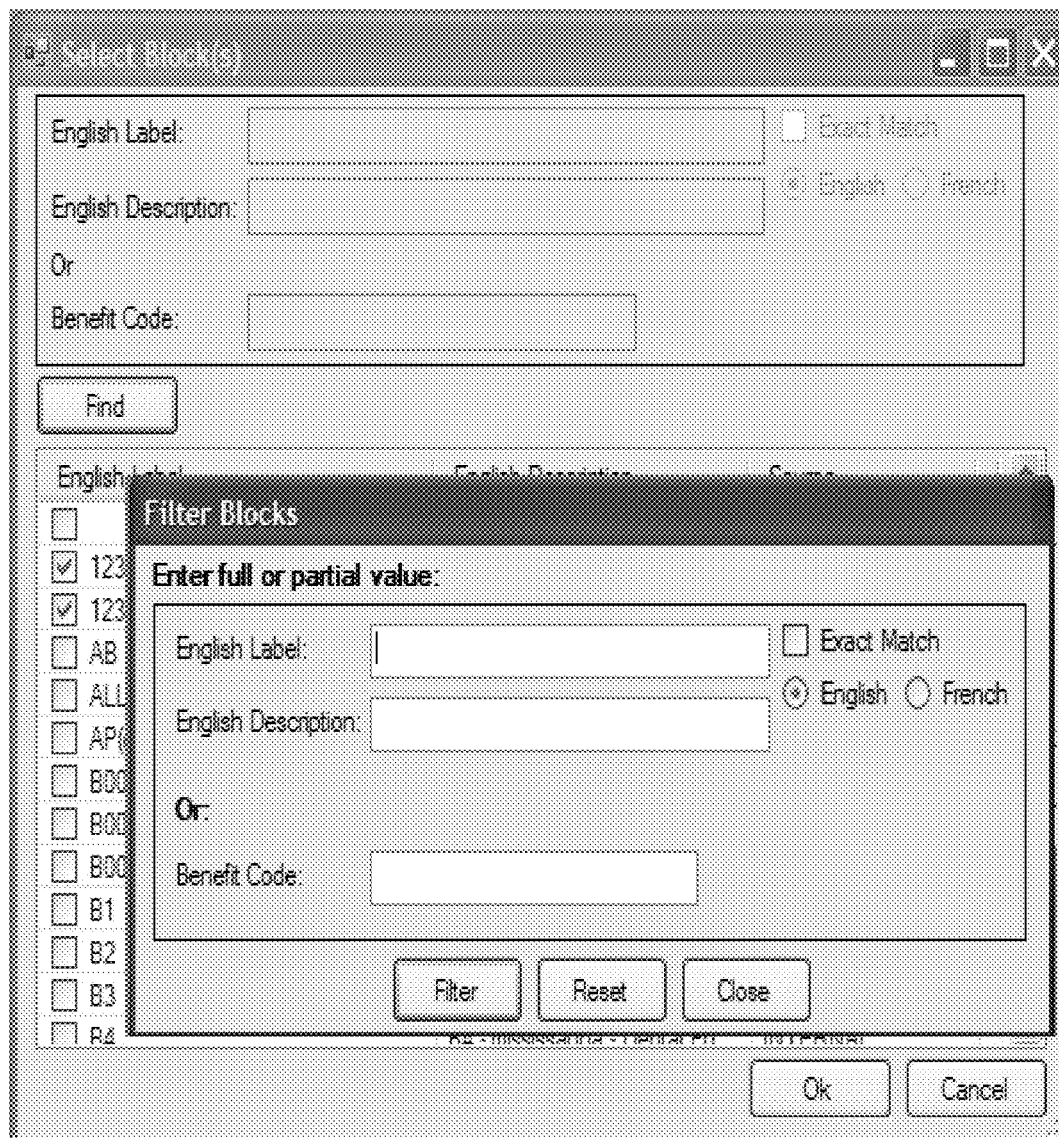

To add a block of benefits:

34. Click Add Block Benefit(s) to display a list of all available benefit blocks.
    To find a specific block within the displayed list, click Find. Enter search criteria, and click Filter. The list of available benefit blocks will be filtered to contain only those blocks that match the specified criteria. Refer to FIG. 60.
35. Click ☐ to select any or all of the benefit blocks.
36. Click OK to add the specified block(s) to the current block. If any of benefit codes contained within any of the selected blocks already exist in the current block, a warning will be displayed and the duplicate benefits will not be added.
37. Click Save to confirm all your changes.

4.2.4 Remove Benefit Code(s) from a Block

Figure 61:
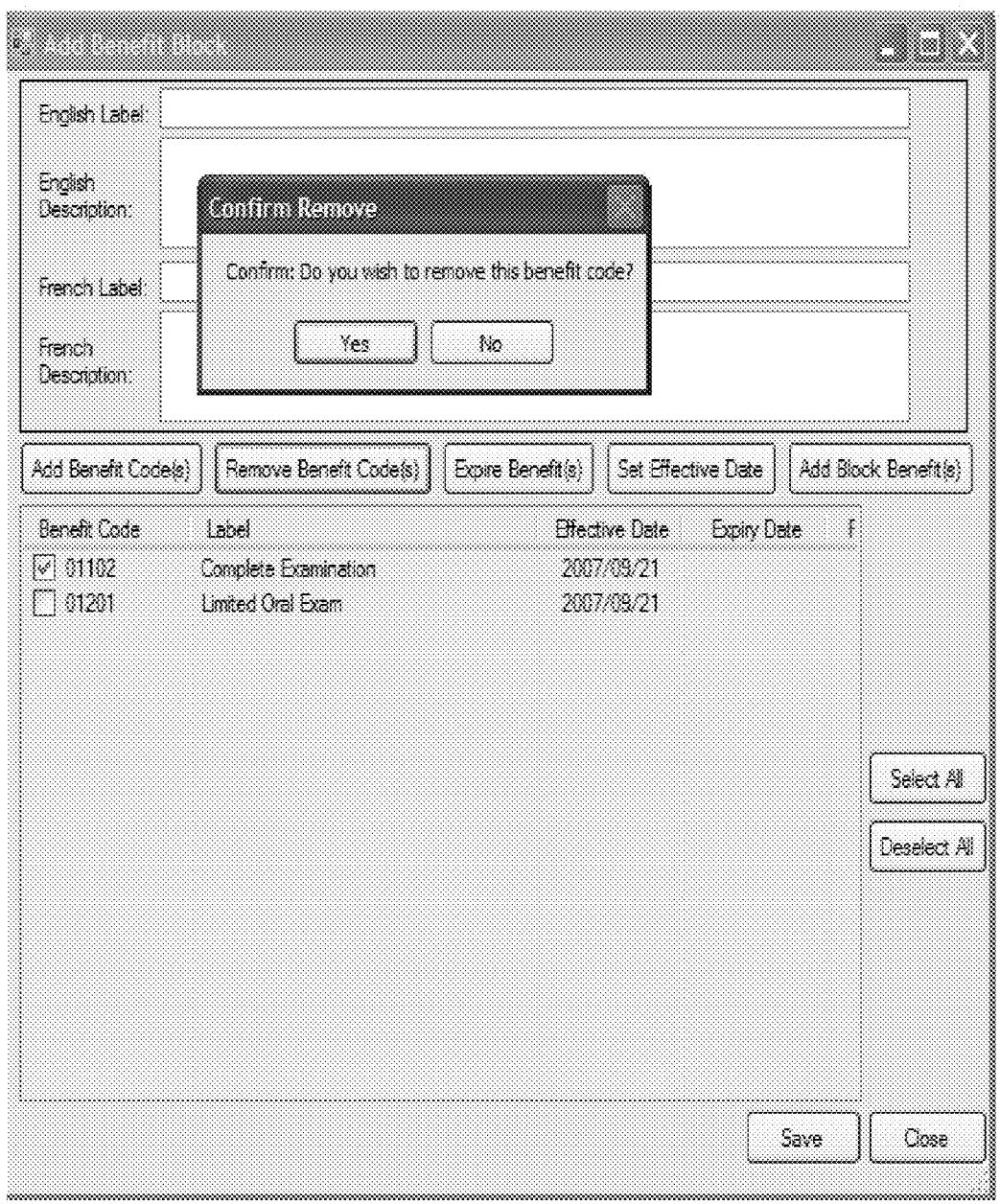

To remove one or more benefits from the block:

38. Select one or more benefit codes by clicking ☐ or click Select All.
39. Click Remove Benefit Code(s). The system will prompt to confirm the removal of all selected benefits from this block.
40. Click Yes to remove the selected benefits from this block.
41. The Benefit Block window will be refreshed.
42. Click Save to save your changes. Refer to FIG. 61.

4.2.5 Set Expiry Date for Benefit(s) in a Block

Figure 62:

To set the expiry date of one or more benefits:

43. Select the benefit codes by clicking ☐ or click Select All.
44. Click Expire Benefit(s) to display the Set Expiry Date window. Refer to FIG. 62.
45. Select the new expiry date for all selected benefits, and click Ok. The specified benefits will no longer be functional in this block after the expiry date.
46. The Benefit Block window will be refreshed with the changed expiry date information. Click Save to save your changes.

4.2.6 Set Effective Date for Benefits in a Block

To set the effective date of one or more benefits:

47. Select the benefit codes by clicking ☐ or click Select All.
48. Click Set Effective Date to display the Set Effective Date window.
49. Select the new effective date for all selected benefits, and click Ok. The specified benefits will not be functional in this block until the effective date has been reached.
50. The Benefit Block window will be refreshed with the changed effective date information. Click Save to save your changes.

4.2.7 Editing Benefit Blocks

To modify an existing benefit block:

51. From the Manage menu, select Benefit→Block.

The Benefit Block Manager screen displays all benefit blocks currently available in the environment that was specified during login.

52. Click to select a benefit block.

To find a specific benefit block (or benefit code within a block) within the displayed list, click Find. Enter search criteria, and click Filter. The list of available benefit blocks will be filtered to contain only those blocks that match the specified criteria.

53. Click Edit to modify the selected benefit block.

54. Modify the label and/or description for this benefit block if required.

55. Modify benefits within the block as required. See 4.2.2 Add Benefit Code(s) to a Block, 4.2.3 Add Blocks of Benefit(s), 4.2.4 Remove Benefit Code(s) from a Block, 4.2.5 Set Expiry Date for Benefit(s) in a Block, and 4.2.6 Set Effective Date for Benefits in a Block for details on managing benefits in a block.

56. Click Update to confirm and save your changes.

4.2.8 Viewing Benefit Blocks

57. From the Manage menu, select Benefit→Block.

The Benefit Block Manager screen displays all benefit blocks currently available in the environment that was specified during login.

58. Click to select a benefit block.

To find a specific benefit block (or benefit code within a block) within the displayed list, click Find. Enter search criteria, and click Filter. The list of available benefit blocks will be filtered to contain only those blocks that match the specified criteria.

Figure 63:
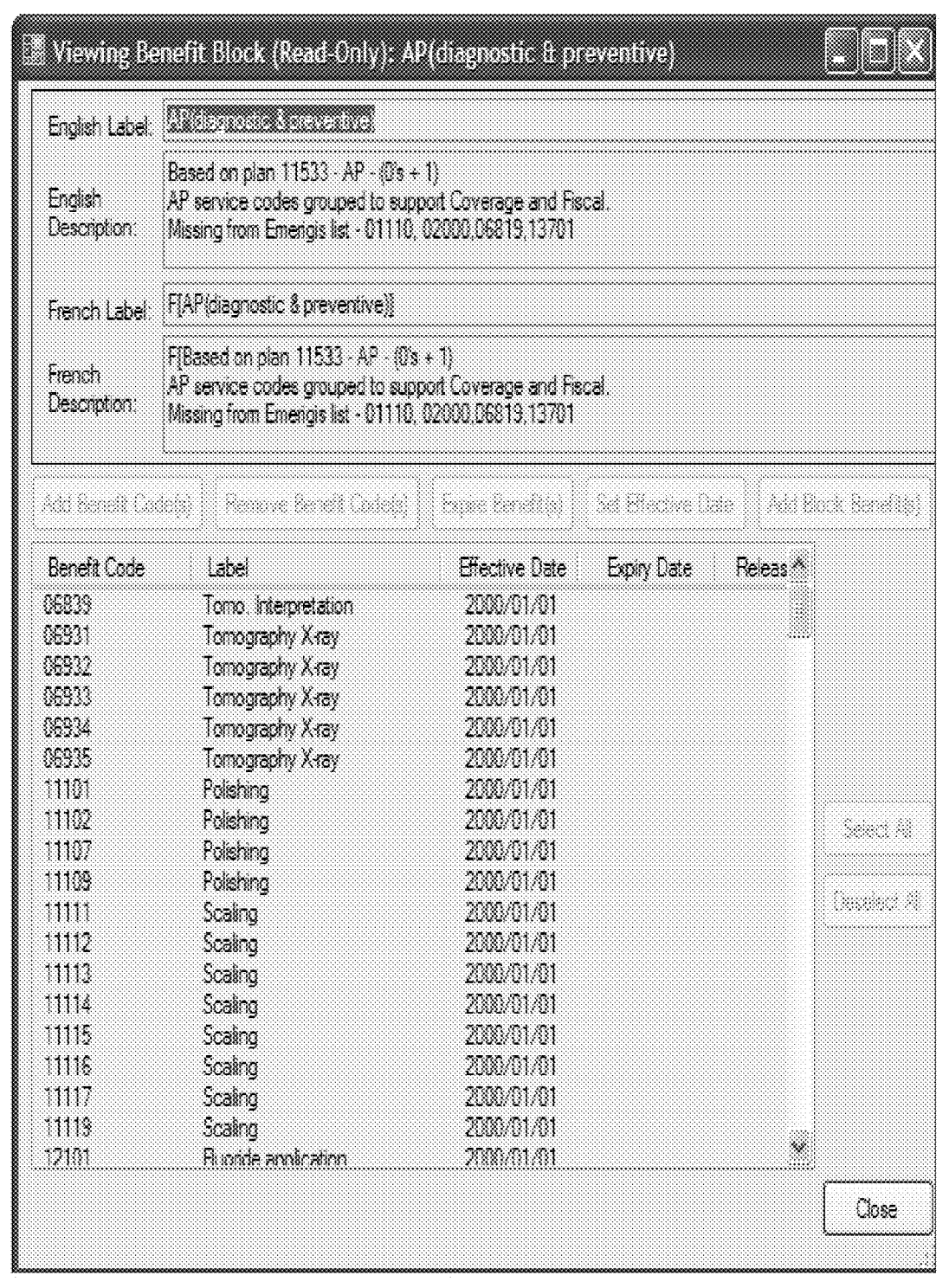

59. Click View to display the benefit block's details. Refer to FIG. 63.

4.2.9 Un-Releasing a Block

Figure 64:
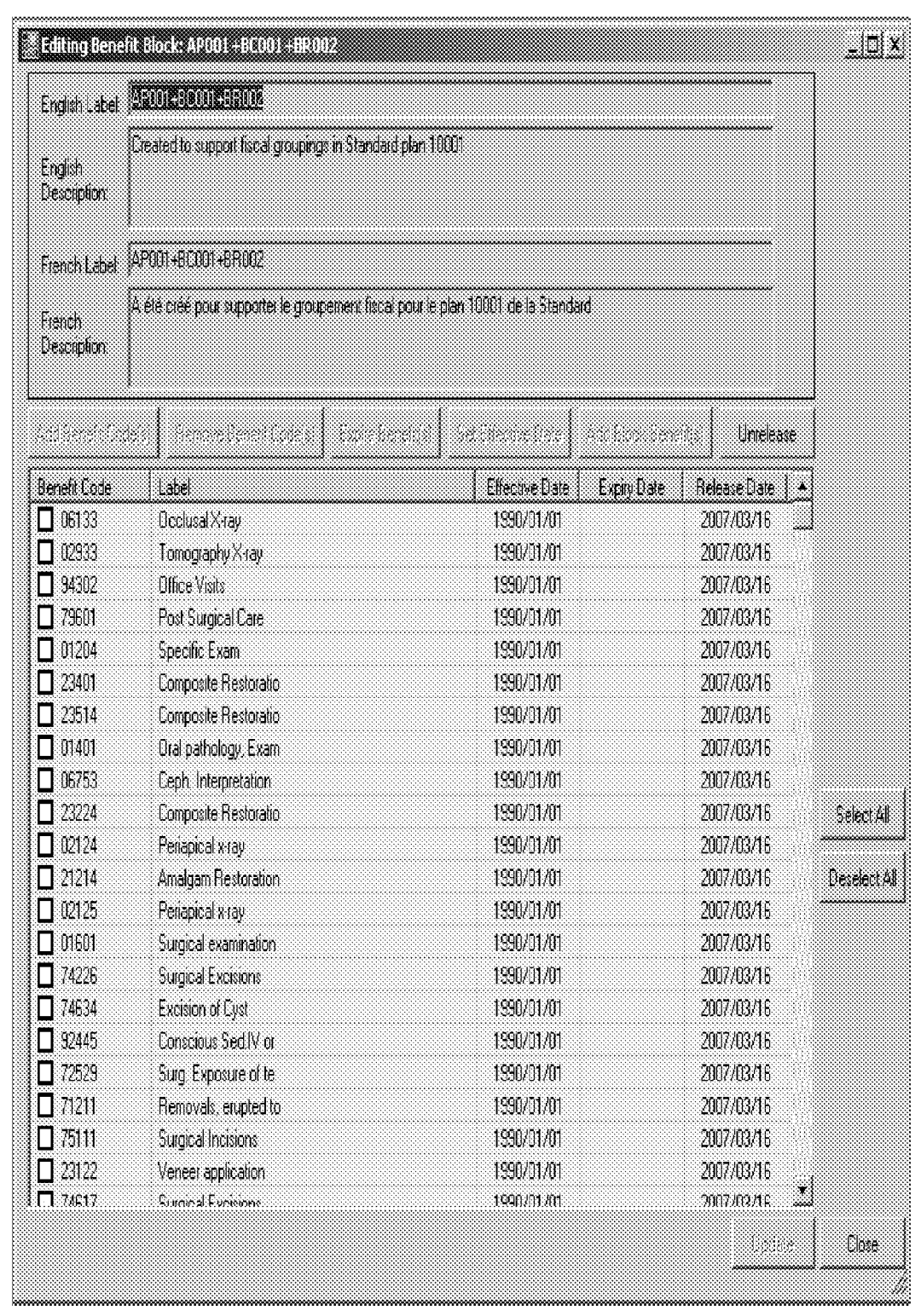

To edit a Block that has been released to production, click the "Un-Release" button. This will place the form in edit mode. Click the "Update" button to save the plan. Refer to FIG. 64.

Figure 65:
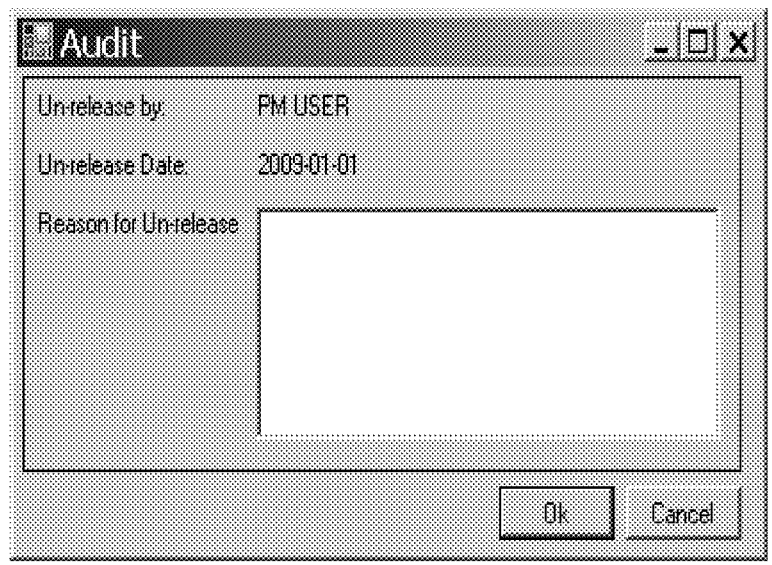

A dialog box will be displayed to capture the audit information. Clicks "Ok" button to save, this information will be saved in the audit tables and the Block is updated and the release date is set to null. Refer to FIG. 65.

5 Super Block Manager

A super-block may contain any number of benefit blocks.

Benefit blocks can be included or excluded and are time-lined, allowing them to change over time if required. Benefit super blocks are interpreted sequentially in ascending order; benefits that are part of an excluded block are ignored if they are part of a later included block.

To manage super blocks:

60. From the Manage menu, select Benefit→Super Block.

Figure 66:
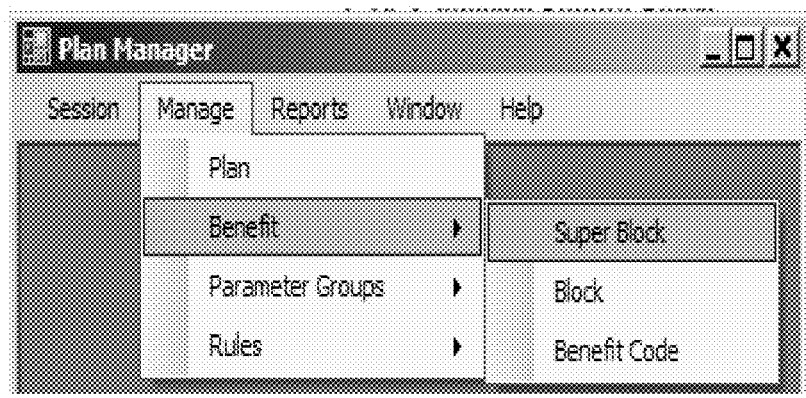

The Super Block Manager screen displays all benefit blocks currently available in the environment that was specified during login. Refer to FIG. 66.

61. Click to select a super block.

Figure 67:
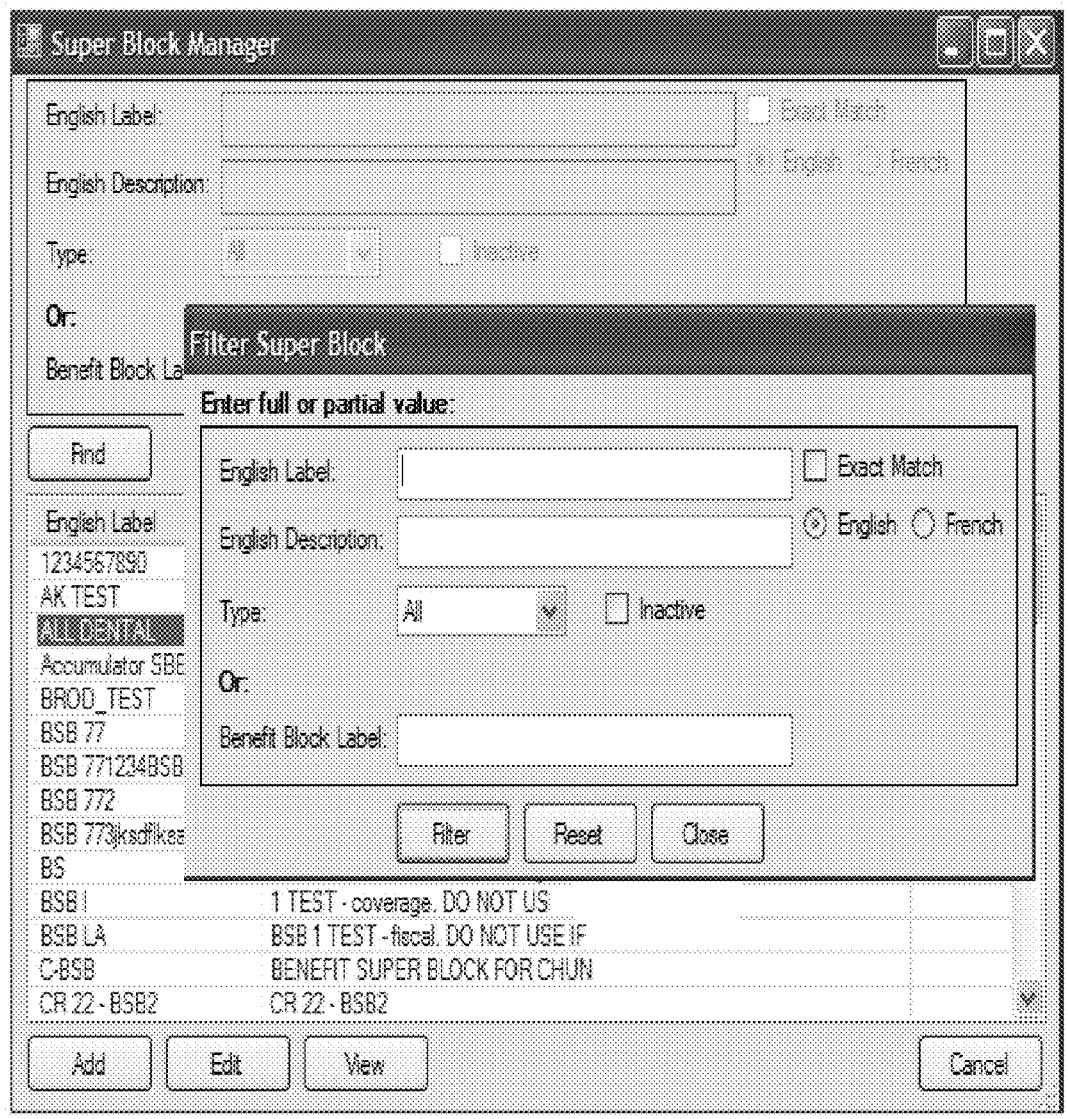

To find a specific super block (or benefit block within a super block) within the displayed list, click Find. Enter search criteria, and click Filter. The list of available super blocks will be filtered to contain only those super blocks that match the specified criteria. Refer to FIG. 67.

5.1 Configuring Super Blocks

Figure 68:
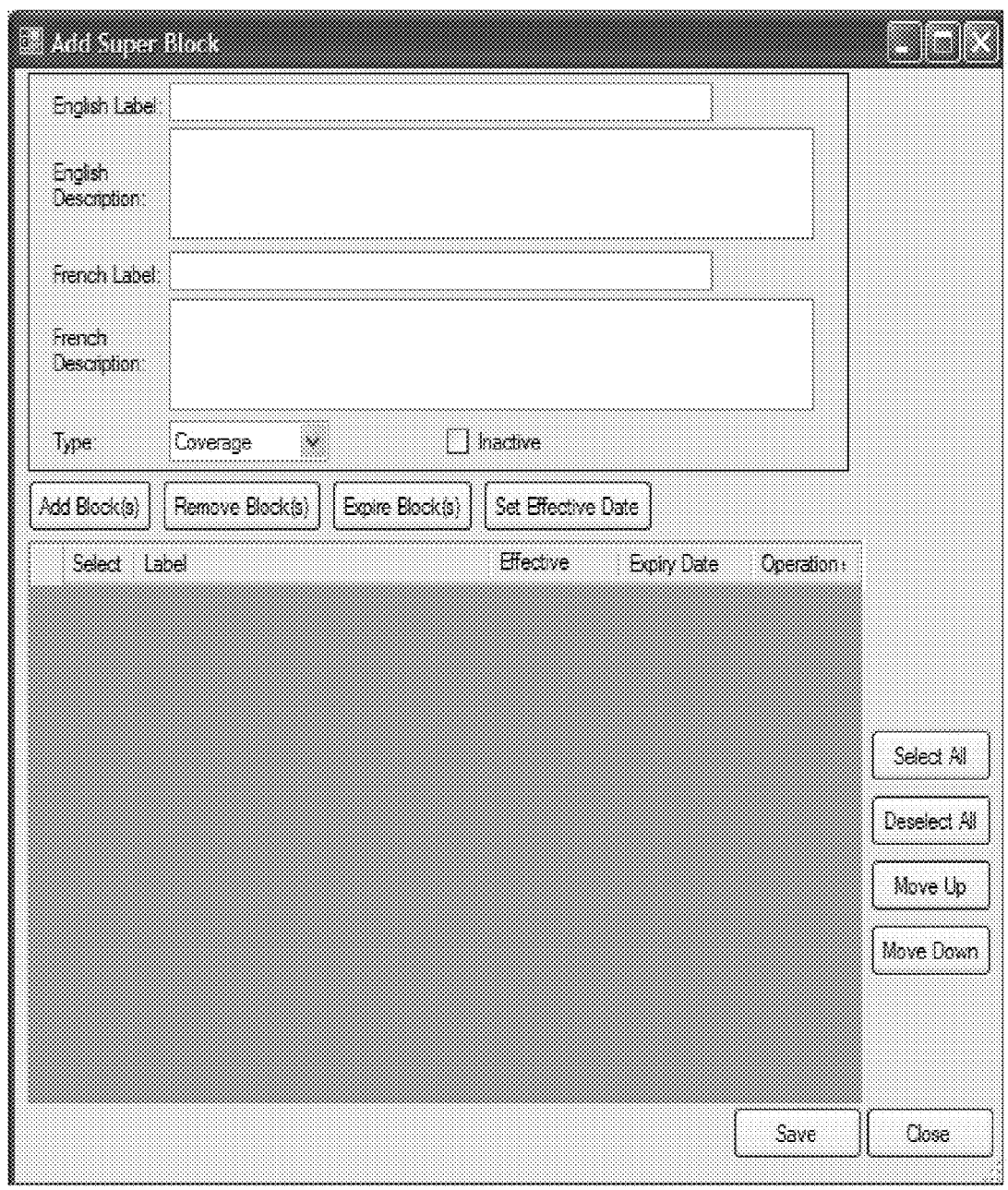

To configure a new benefit super block:

62. Click Add to display the Add Super Block window. Refer to FIG. 68.

63. Enter a label and corresponding description for this super block in either English or French.

Labels are a maximum of fifty (50) characters in length, and descriptions are a maximum of two hundred and fifty-five (255) characters in length.

64. Select the super block Type from the drop-down list:

Coverage
      include or exclude specific benefit blocks
   Override
      Include or exclude benefits and override plan coverage.
   Fiscal
      In Plan Manager, service codes are grouped and labelled into benefit blocks needed to support Coinsurance, Deductibles and Maximums. The content of the benefit block is used by the engine to determine if the Plan Fiscal restrictions apply. The contents of a fiscal Super Benefit Block do not ensure coverage.
   Adjudication
      Assign specific rules (for example, Pricing, COB, etc.) depending on business requirements.

65. Click ☐ Inactive to put this super block in a dormant state. Inactive super blocks are no longer available for inclusion in plans; however, any plan that referenced the super block prior to its inactivation will not be affected.

66. Click Add Block(s) to add benefit blocks (see 5.1.1 Add Benefit Block(s) to a Super Block for details).

67. Remove, expire, and/or set the effective date for any or all blocks benefit codes. See 5.1.2 Remove Block(s) from a Super Block, 5.1.3 Set Expiry Date for Block(s) in a Super Block, and 5.1.4 Set Effective Date for Blocks in a Super Block for details.

68. Click Save to save the new benefit block.

5.1.1 Add Benefit Block(s) to a Super Block

Benefit blocks codes can be added to new or existing benefit blocks.

To add benefit codes:

69. Click Add Block(s) to display the Select Block(s) window. All available benefit blocks are displayed.

Figure 69:
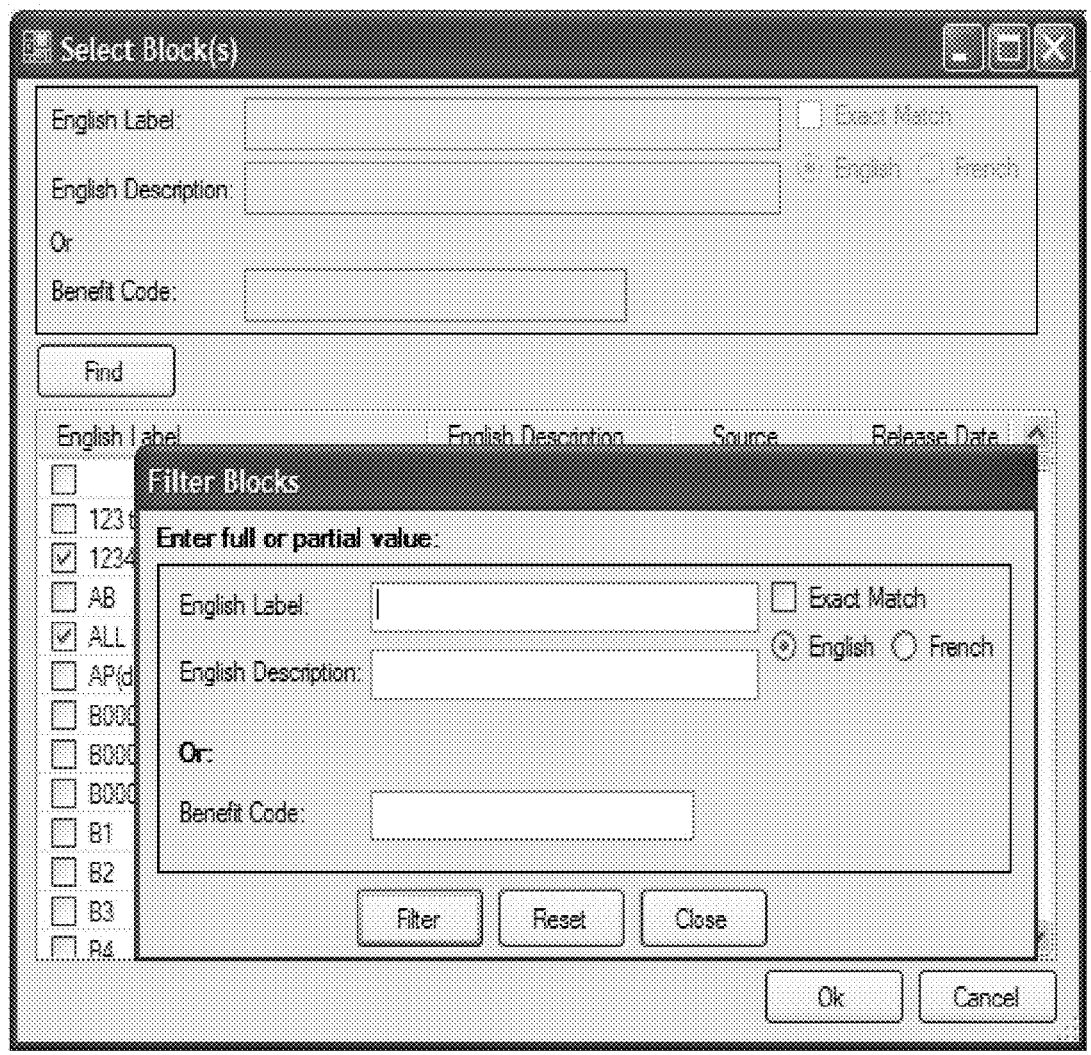

To find a specific block within the displayed list, click Find. Enter search criteria, and click Filter. The list of available blocks will be filtered to contain only those blocks that match the specified criteria. Refer to FIG. 69.

70. Select blocks by clicking ☐ beside each relevant block.

71. Click Ok to add the selected blocks to the current super block.

Figure 70:
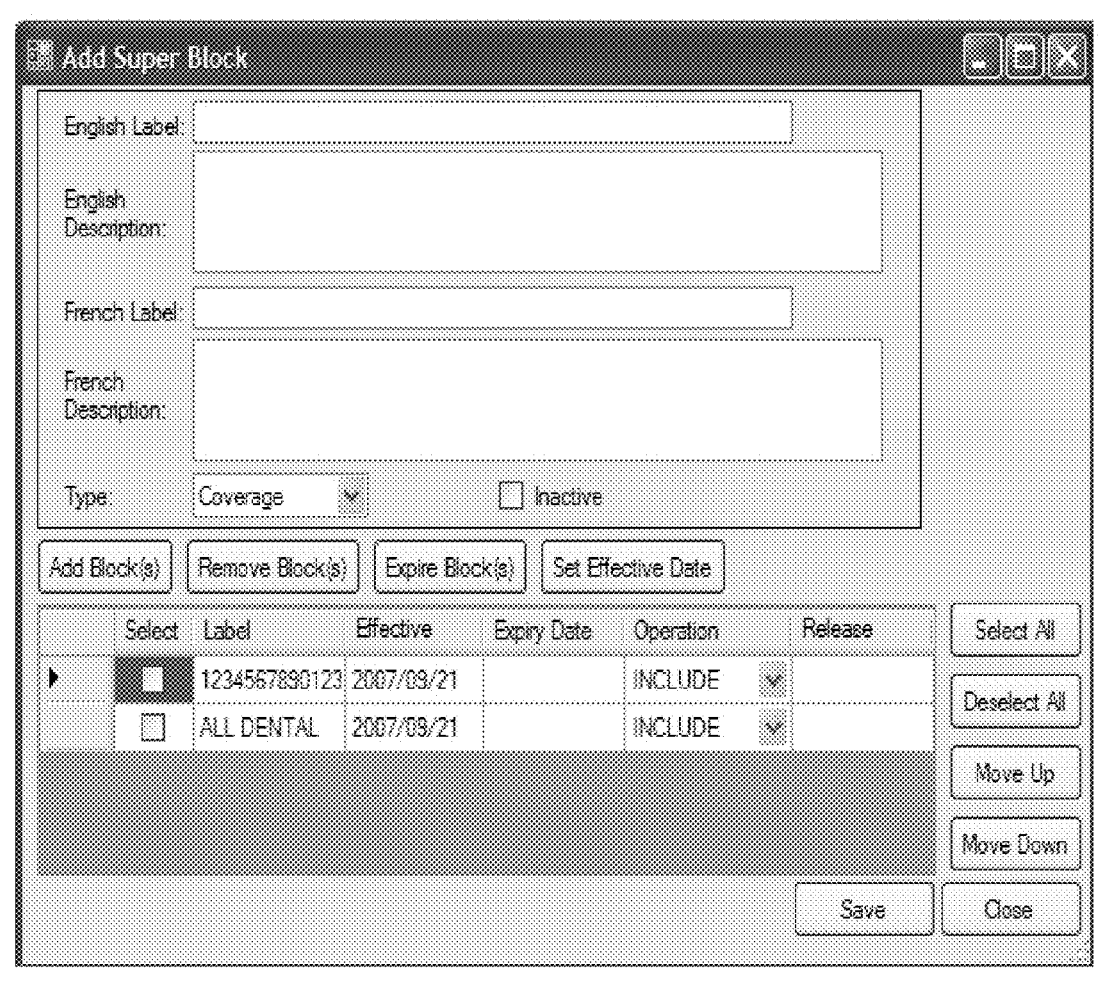

72. The Super Block window will be refreshed. Click Save to Save your changes. Refer to FIG. 70.

5.1.2 Remove Block(s) from a Super Block

To remove one or more blocks from a super block:

73. Select one or more blocks by clicking ☐ or click Select All.

74. Click Remove Block(s). The system will prompt to confirm the removal of all selected blocks from this super block.

75. Click Yes to remove the selected blocks.

Figure 71:
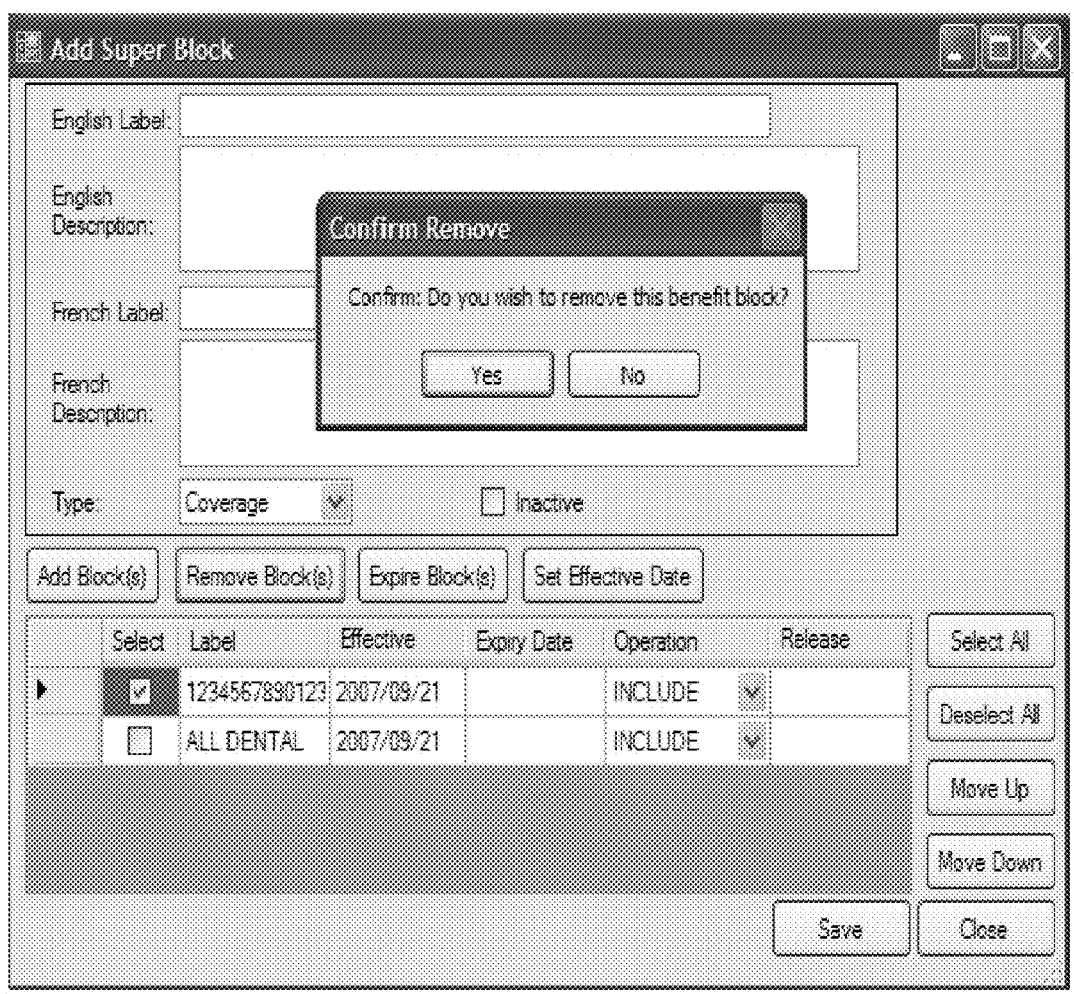

76. The Super Block window will be refreshed. Click Save to save your changes. Refer to FIG. 71.

5.1.3 Set Expiry Date for Block(s) in a Super Block

To set the expiry date of one or more benefits:

77. Select the blocks by clicking a or click Select All.

78. Click Expire Block(s) to display the Set Expiry Date window.

Figure 72:
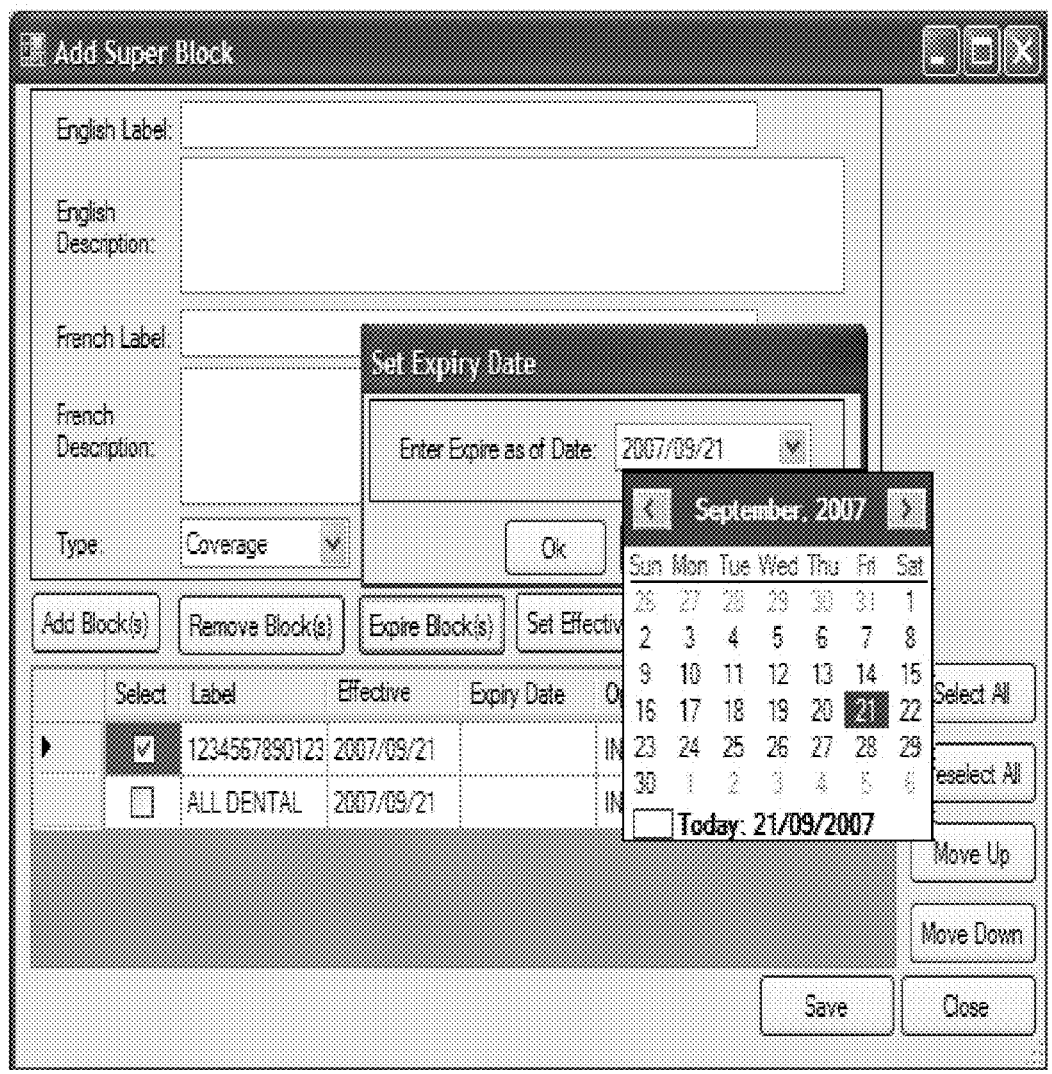

79. Select the new expiry date for all selected blocks, and click Ok. The specified blocks will no longer be functional in this super block after the expiry date.
80. The Super Block window will be refreshed with the changed expiry date information. Click Save to save your changes. Refer to FIG. 72.

5.1.4 Set Effective Date for Blocks in a Super Block

To set the effective date of one or more blocks:
81. Select the blocks by clicking a or click Select All.
82. Click Set Effective Date to display the Set Effective Date window.
83. Select the new effective date for all selected blocks, and click Ok. The specified blocks will not be functional in this super block until the effective date has been reached.
84. The Super Block window will be refreshed with the changed effective date information. Click Save to save your changes.

5.1.5 Specify the Order of Blocks in a Super Block

Super blocks process each block in sequential order: benefits that have been configured in a prior block cannot be changed in successive blocks. Therefore, the benefits contained in an Excluded block will be ignored if they are Included in a later block.

Include/Exclude

By default, all blocks added to a super block are Included with the exception of Override type Super Block. In Override type Super Block, all the Blocks are defaulted to "Exclude" and the Operations column is disabled.

Excluded blocks are treated as an anti-requisite. All benefits contained within an Excluded block are removed from any subsequent blocks.

Figure 73:
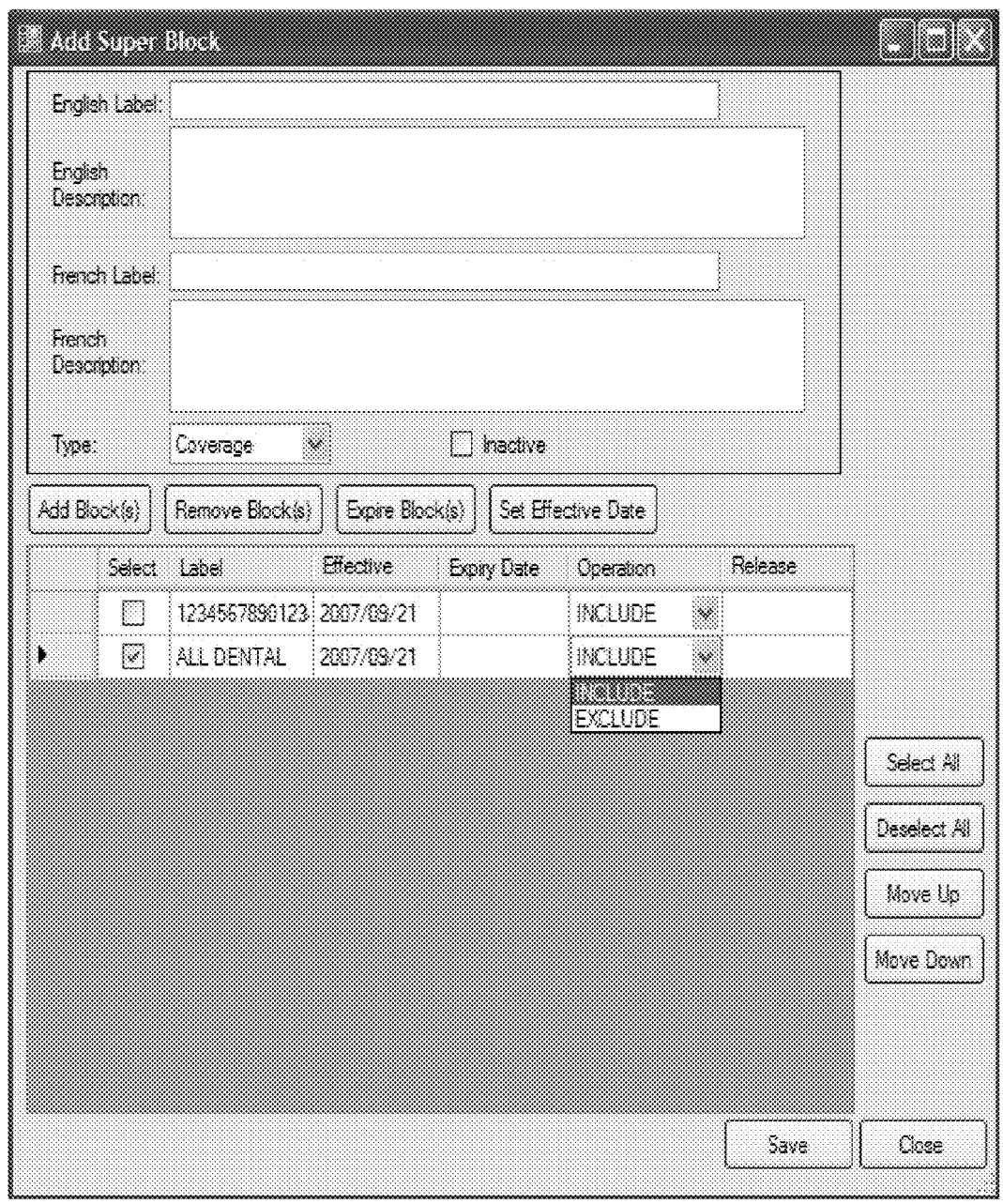

To change a block's operation:
85. Select from the drop-down: Include or Exclude. Refer to FIG. 73.
86. Click Save to save your changes.

Move Up/Move Down

Super blocks process each block in sequential order.

To move a block up or down:
87. Click ☐ to select the block to be moved. Only one block can be moved at a time.
88. Click the Move Up or Move Down buttons until the block is in the correct position.
89. Click Save to save your changes.

5.1.6 Edit Super Blocks

To modify an existing super block:
90. From the Manage menu, select Benefit→Super Block.
   The Super Block Manager screen displays all super blocks currently available in the environment that was specified during login.
91. Click to select a super block.
   To find a specific super block (or block within a super block) within the displayed list, click Find. Enter search criteria, and click Filter. The list of available super blocks will be filtered to contain only those super blocks that match the specified criteria.
92. Click Edit to modify the selected super block.
93. Modify the label and/or description in each language for this super block if required.
94. Select the super block Type from the drop-down list:
   Coverage
      Include or exclude specific benefit blocks
   Override
      Include or exclude benefits and override plan coverage.
   Fiscal
      In Plan Manager, service codes are grouped and labeled into benefit blocks needed to support Coinsurance, Deductibles and Maximums. The content of the benefit block is used by the engine to determine if the Plan Fiscal restrictions apply. The contents of a fiscal Super Benefit Block do not ensure coverage.
   Adjudication
      Assign specific rules (for example, Pricing, COB, etc.) depending on business requirements.
95. Click ☐ Inactive to put this super block in a dormant state. Inactive super blocks are no longer available for inclusion in plans; however, any plan that referenced the super block prior to its inactivation will not be affected.
96. Click Add Block(s) to add benefit blocks (see 5.1.1 Add Benefit Block(s) to a Super Block for details).
97. Remove, expire, and/or set the effective date for any or all blocks. See 5.1.2 Remove Block(s) from a Super Block, 5.1.3 Set Expiry Date for Block(s) in a Super Block, and 5.1.4 Set Effective Date for Blocks in a Super Block for details.
98. Click Update to save your changes.

Figure 74:
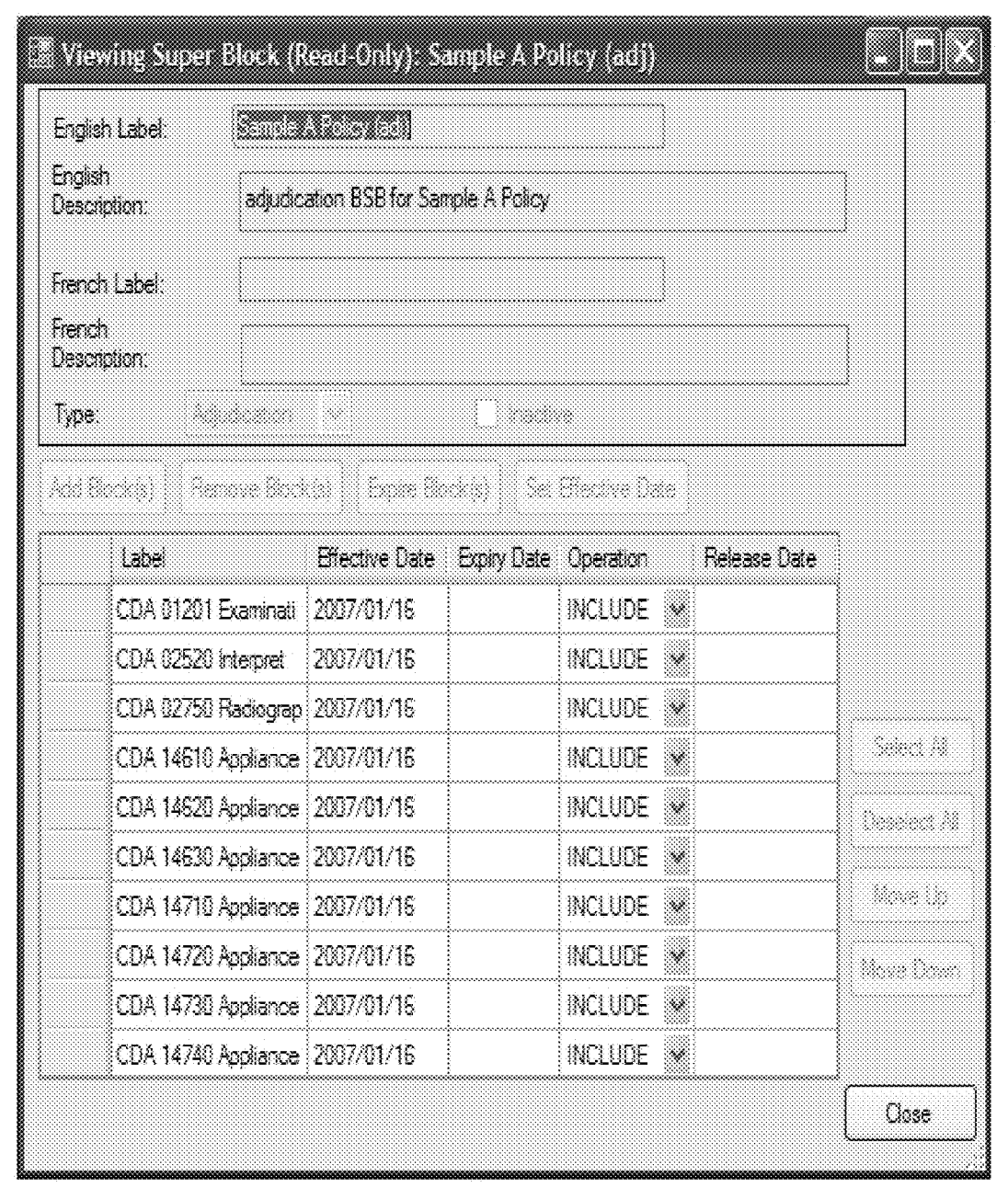

5.1.7 Viewing Benefit Blocks
99. From the Manage menu, select Benefit→Super Block.
   The Super Block Manager screen displays all super blocks currently available in the environment that was specified during login.
100. Click to select a super block.
   To find a specific super block (or a block within a super block) within the displayed list, click Find. Enter search criteria, and click Filter. The list of available super blocks will be filtered to contain only those super blocks that match the specified criteria.
101. Click View to display the super block's details. Refer to FIG. 74.

5.1.8 Un-Releasing Super Block

Figure 75:
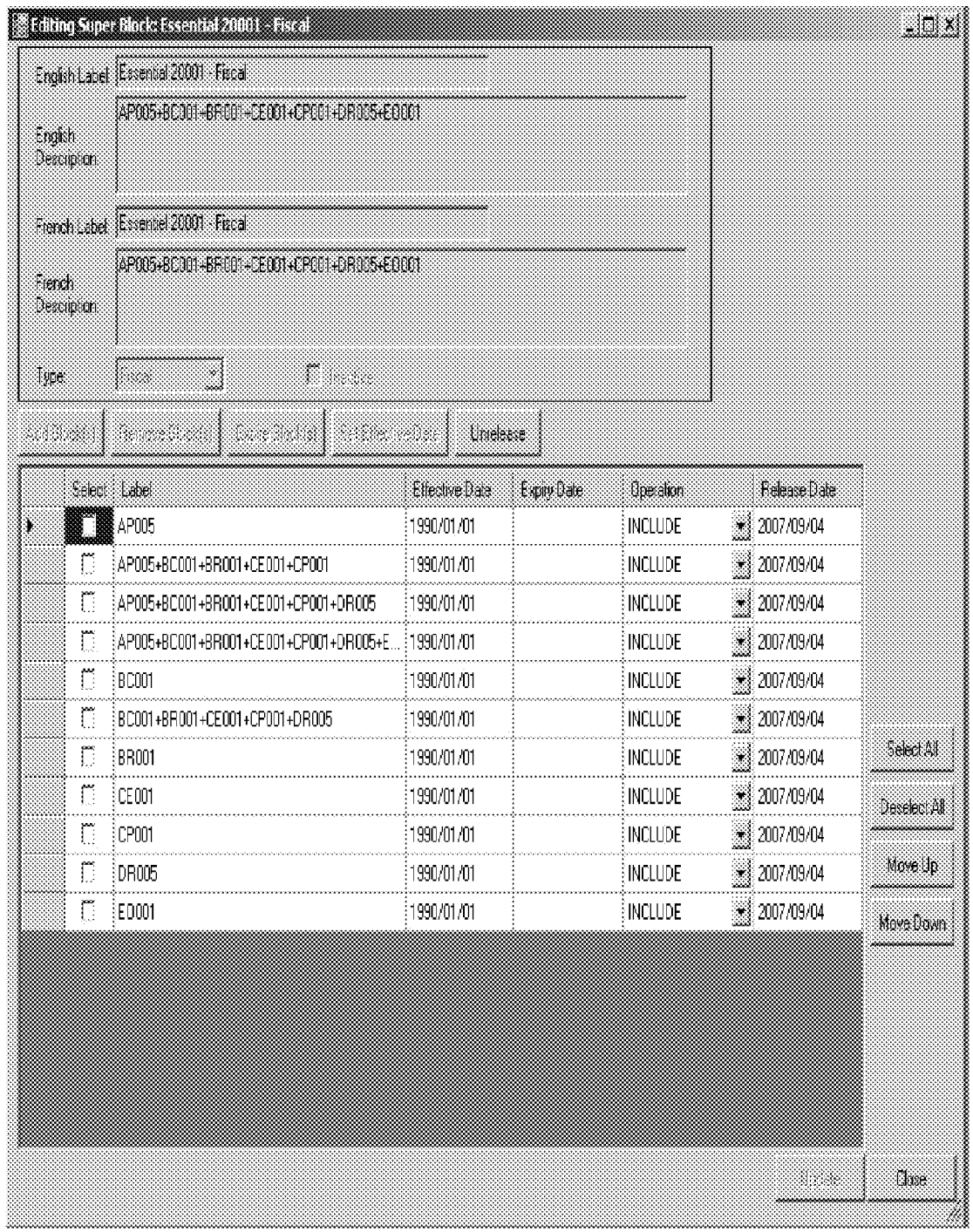

To edit a Super Block that has been released to production, click the "Un-Release" button. This will place the form in edit mode. Click the "Update" button to save the plan. Refer to FIG. 75.

Figure 76:
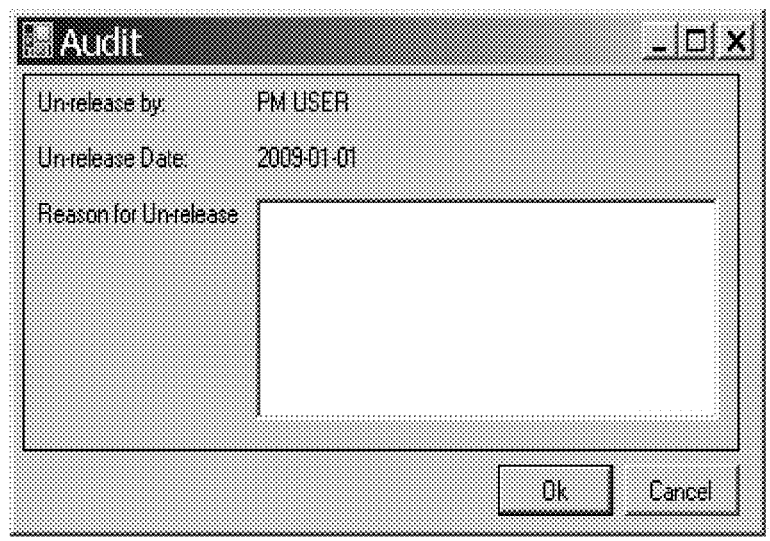

A dialog box will be displayed to capture the audit information. Clicks "Ok" button to save, this information will be saved in the audit tables and the Super Block is updated and the release date is set to null. Refer to FIG. 76.

6 Managing Parameter Groups

Parameter grouping allows users to configure unique rule and algorithm groupings based on their business needs. Parameter definitions are only available for addition to plans once they have been grouped and saved.

6.1 Module Manager

Figure 77:
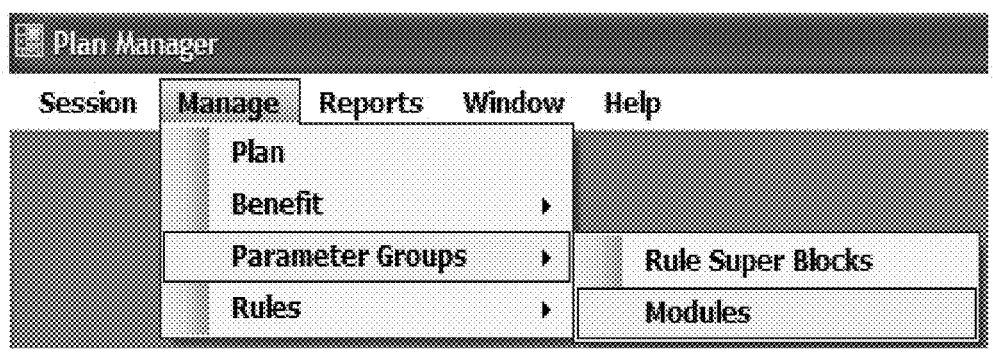
Figure 78:
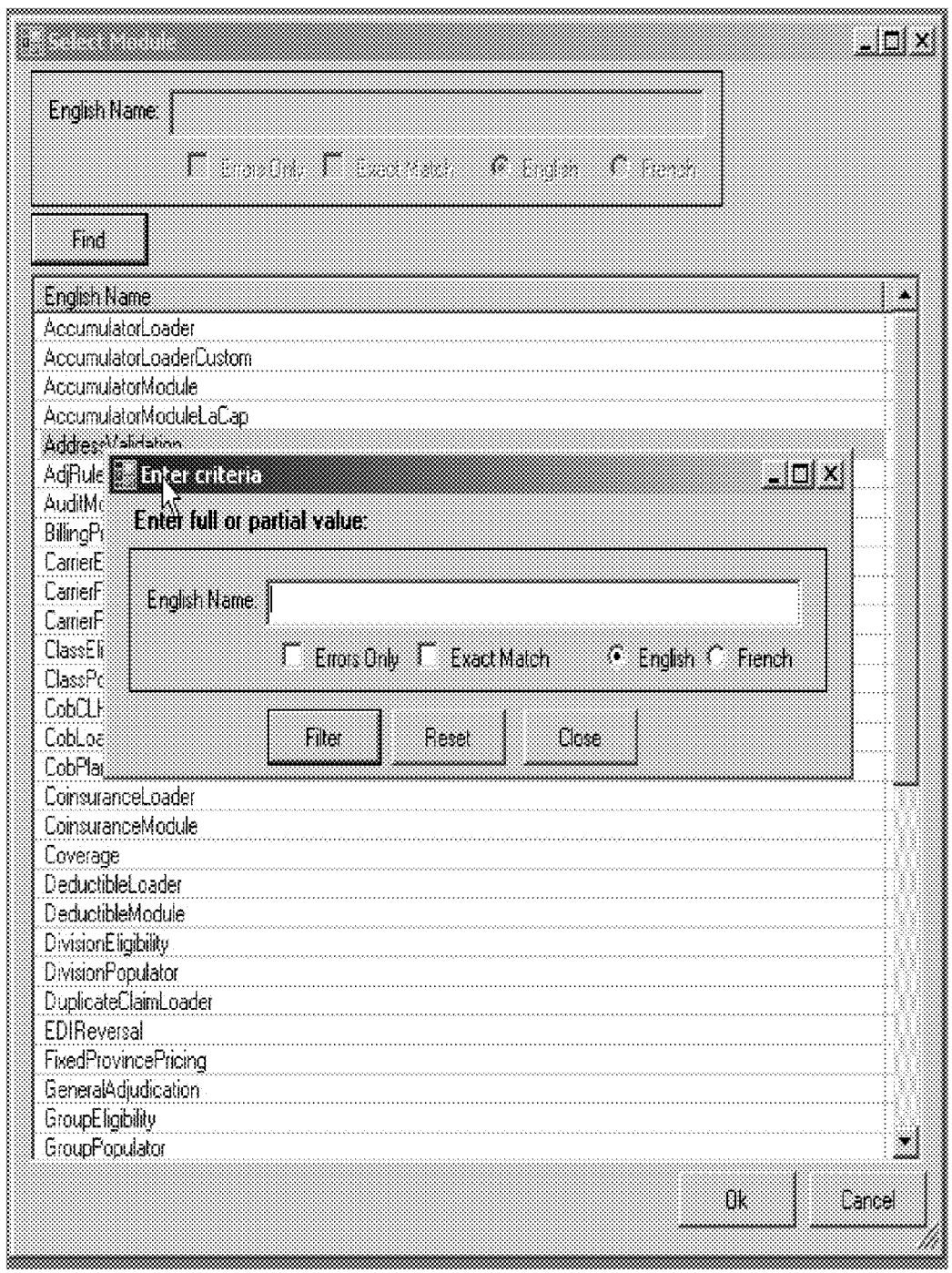
Figure 79:

To view, edit, or add module parameter groups:
102. From the Manage menu, select Parameter Groups→Modules. Refer to FIG. 77.
103.
104. The Select Module window displays all currently available modules. Refer to FIG. 78.
105. Click to select a parameter group, and click Ok to display the Parameter Grouping window. Refer to FIG. 79.

6.1.1 Adding New Parameter Groups to a Module

All available parameters are derived from the Rule Composer. To add or modify a parameter or rule, see the Rule Composer user guide.

To add a new parameter group to the currently selected module:
106. From the Manage menu, select Parameter Groups→Modules.

Figure 80:
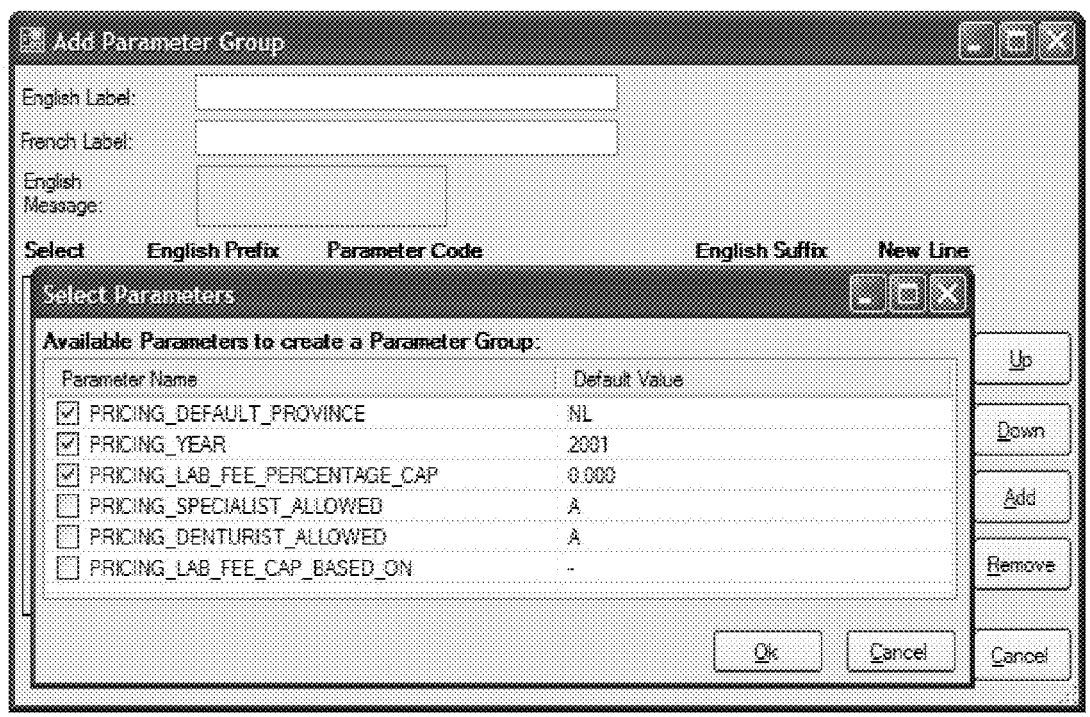
Figure 81:
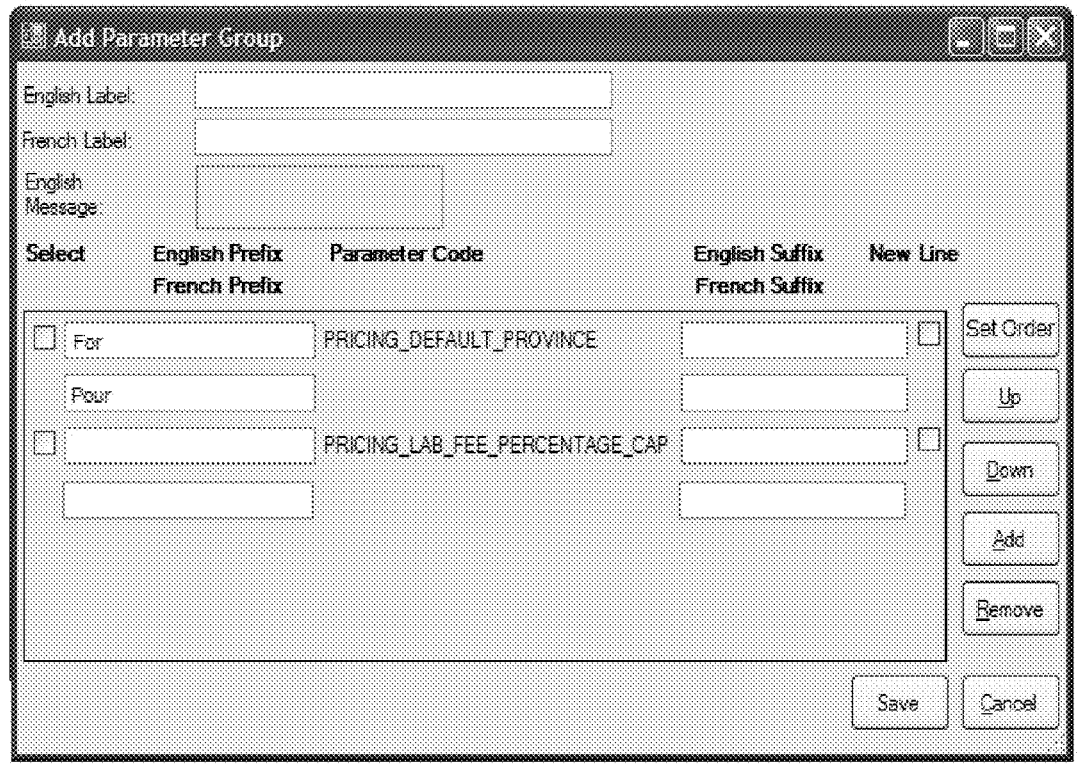

107. The Select Module window displays all currently available modules.
108. Click to select a parameter group, and click Ok to display the Parameter Grouping window
109. Click New to open the Add Parameter Group window.
110. The Select Parameters selection window is automatically displayed with a list of available parameters. Click to select each required parameter, then click Ok to add the parameters to the parameter group. See the Rule Composer user guide for details on creating or modifying specific parameters. Refer to FIG. 80.
111. Enter an English and/or French Label that will uniquely identify this group of parameters. Refer to FIG. 81.
112. Enter contextual prefix and suffix text for each parameter in each language. Prefix and suffix text is required for all supported languages.
113. Click ☐ to select New Line for any parameter line requiring a hard return when displayed.
    New lines should be used to clarify meaning when the parameter group is displayed.
114. Click ☐ to select any line, then click Up or Down to reposition the parameter line if required. Only one line can be moved at a time.
115. Click ☐ to select any line, then click Remove to remove the selected line from the parameter grouping.
116. Click Add to re-display the Select Parameters window. Only those parameters that are not currently in the parameter group are available for selection.
117. Click Save to save your changes and create the new parameter group.

6.1.2 Setting Parameter Order

Figure 82:
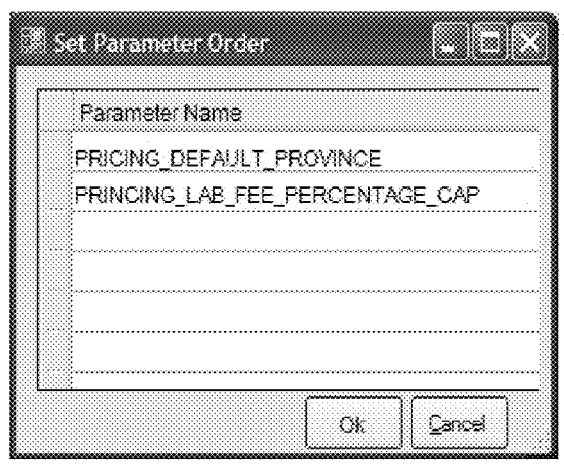

The order in which each parameter is displayed should be taken into account to clarify meaning.
To set the order of a parameter:
118. From the Manage menu, select Parameter Groups→Modules.
    The Select Module window displays all currently available modules.
119. Click to select a parameter group, and click Ok to display the Parameter Grouping window.
120. Click Set Order to display the Set Parameter Order window. Refer to FIG. 82.
121. Click to select one or more parameters, and drag to change the order.
122. Click Ok to save your changes, or Cancel to revert to the last saved order setting.

6.1.3 Editing Parameter Groups in a Module

Figure 83:
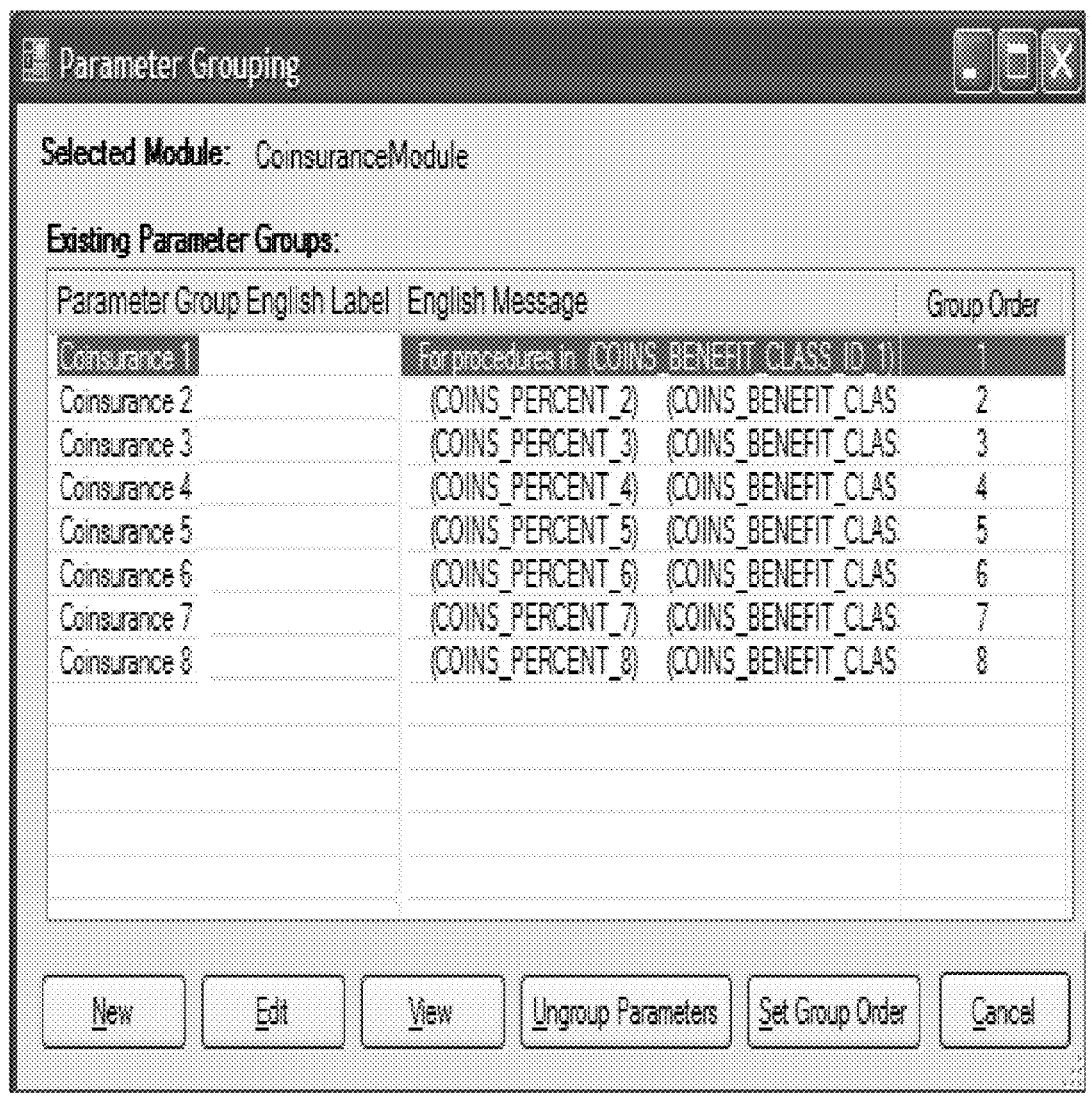
Figure 84:
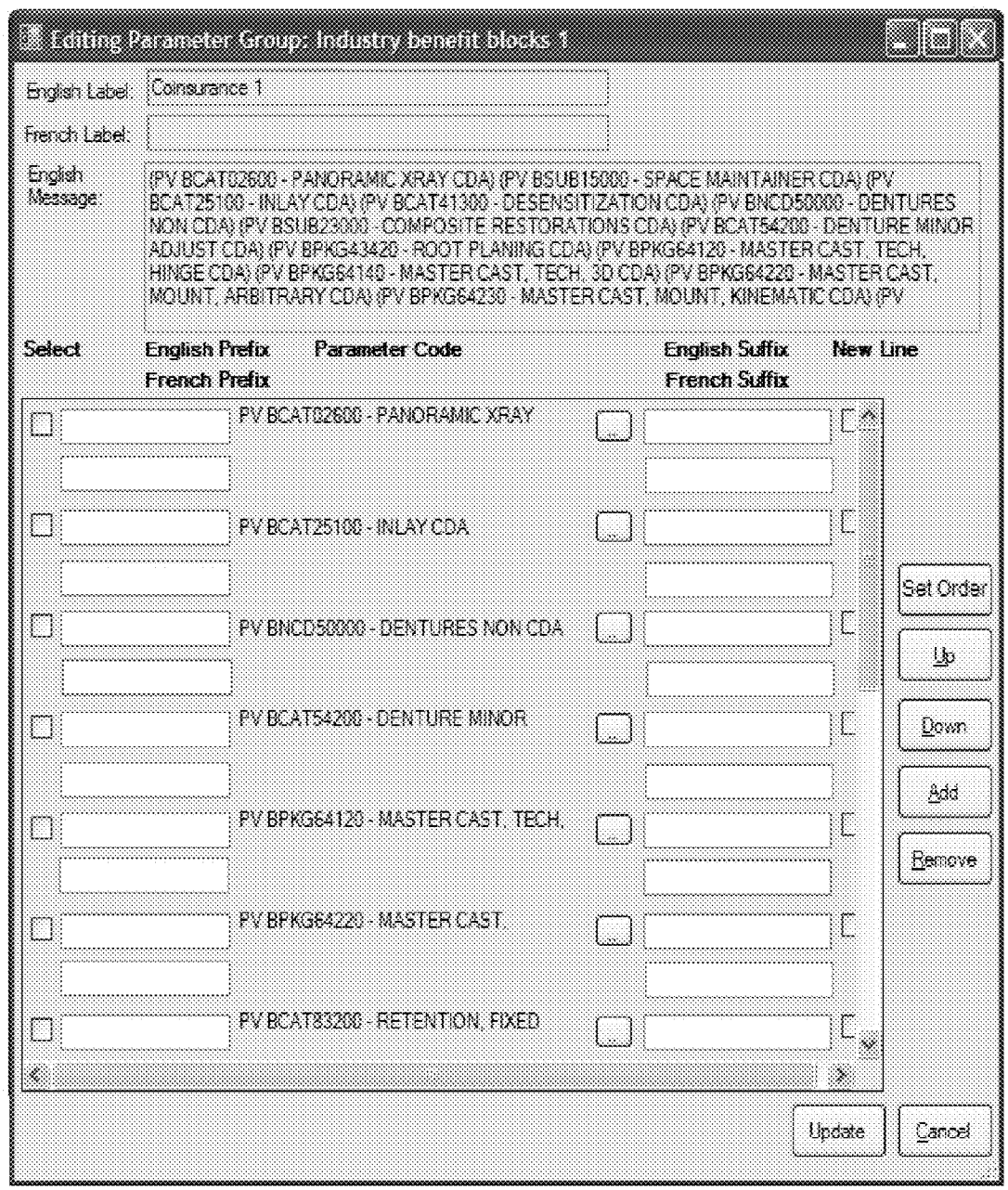

To edit the parameter groups in an existing module:
123. From the Manage menu, select Parameter Groups→Modules.
    The Select Module window displays all currently available modules.
124. Click to select a module, and click Ok to display the Parameter Grouping window. Refer to FIG. 83.
125. Click to select a group from the displayed list, and click Edit. Refer to FIG. 84.
126. Modify the parameter group as required. See 6.1.1 Adding New Parameter Groups to a Module for details on adding, removing, or moving parameters within a group.
127. Click Update to save your changes.
128. Repeat steps 3-5 for any other groups in this module that require changes.

6.1.4 Viewing Parameter Groups in a Module

To view parameter group details in an existing module:
129. From the Manage menu, select Parameter Groups→Modules.
    The Select Module window displays all currently available modules.
130. Click to select a module, and click Ok to display the Parameter Grouping window.
131. Click to select a group, and click View.
    The Viewing Parameter Group window is display-only.

6.1.5 Ungrouping Parameters in a Module

Parameters must be grouped before they become active for addition to plans. Ungrouped parameters are displayed with an asterisk (*) in the plan details window, and are not available for use.
To ungroup parameters in a module:
132. From the Manage menu, select Parameter Groups→Modules.
    The Select Module window displays all currently available modules.
133. Click to select a module, and click Ok to display the Parameter Grouping window.
134. Click to select a group from the displayed list, and click Ungroup Parameters. You will be prompted to confirm the ungrouping, and the group will be removed from the list of existing parameter groups.

6.1.6 Setting Group Order in a Module

Figure 85:
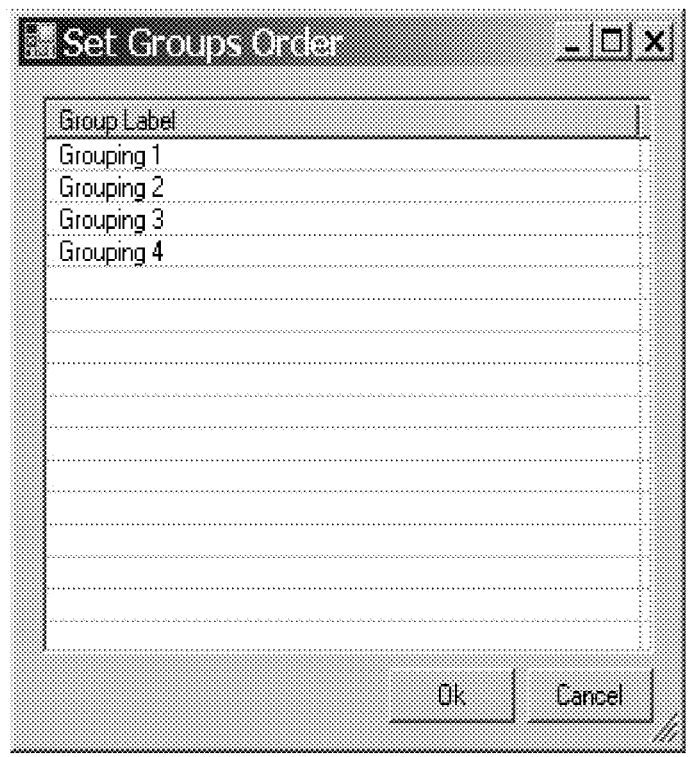

The order in which each group is displayed should be taken into account to clarify meaning when the module groups are displayed.
To set the order of an existing module's parameter groups:
135. From the Manage menu, select Parameter Groups→Modules.
    The Select Module window displays all currently available modules.
136. Click to select a module, and click Ok to display the Parameter Grouping window.
137. Click Set Group Order.
138. Click to select one or more Groups, and drag to change the order. Refer to FIG. 85.
139. Click Ok to save your changes and display the Parameter Grouping window with new group order, or Cancel to revert to the last saved order setting.

6.2 Rule Super Block Manager

Figure 86:
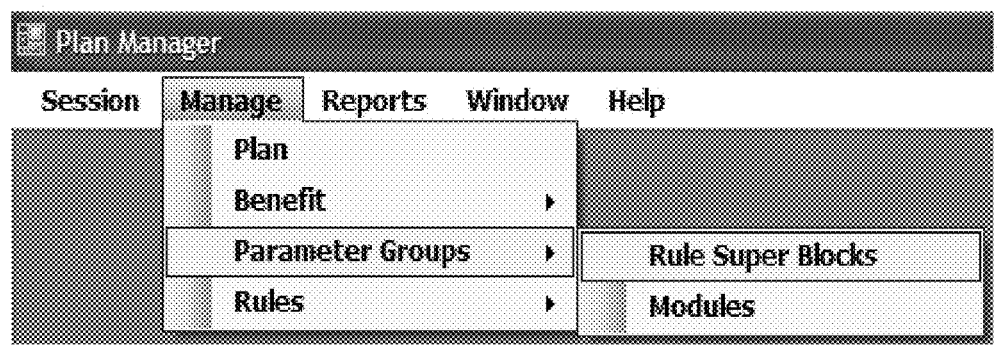
Figure 87:
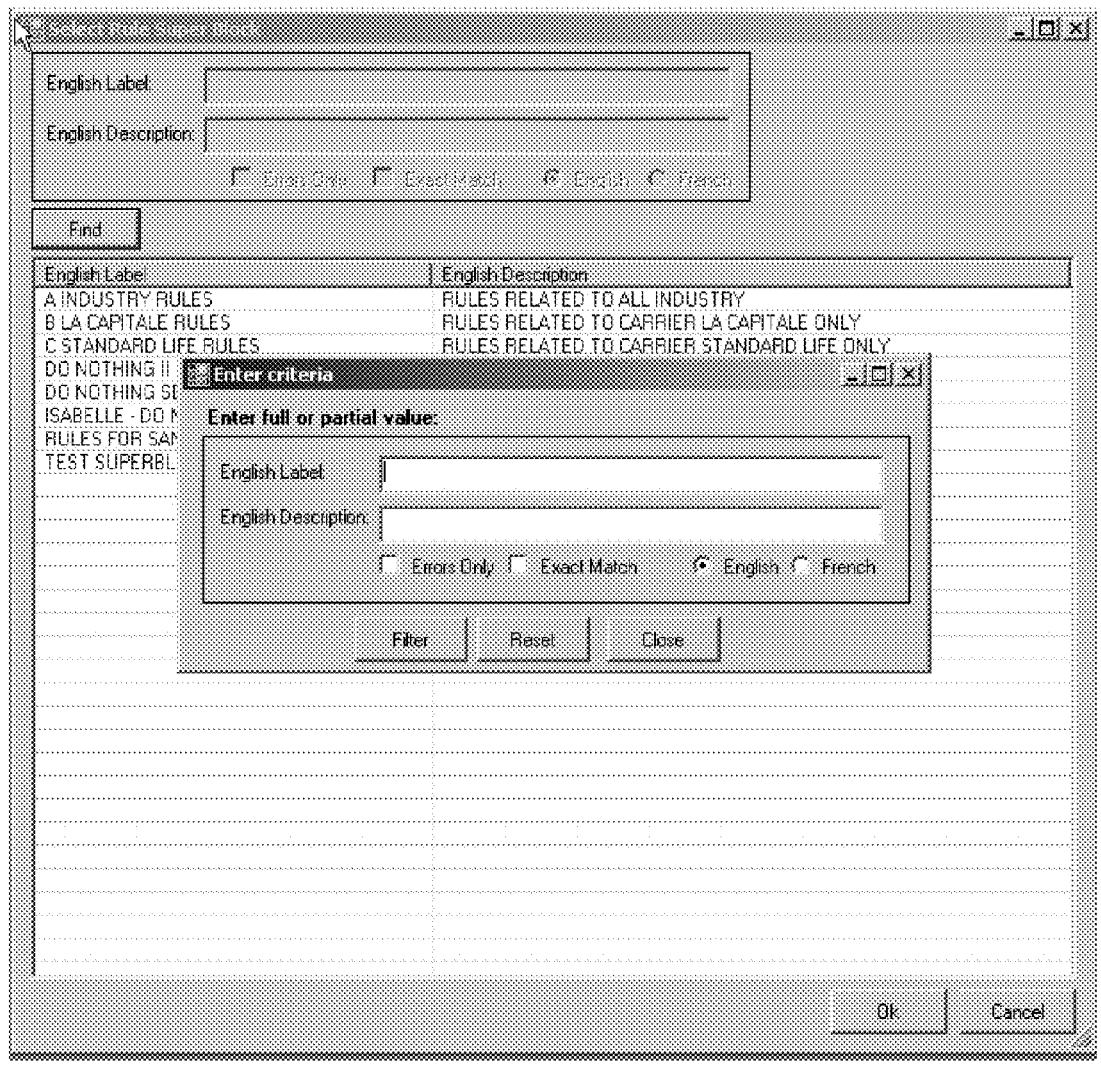
Figure 88:
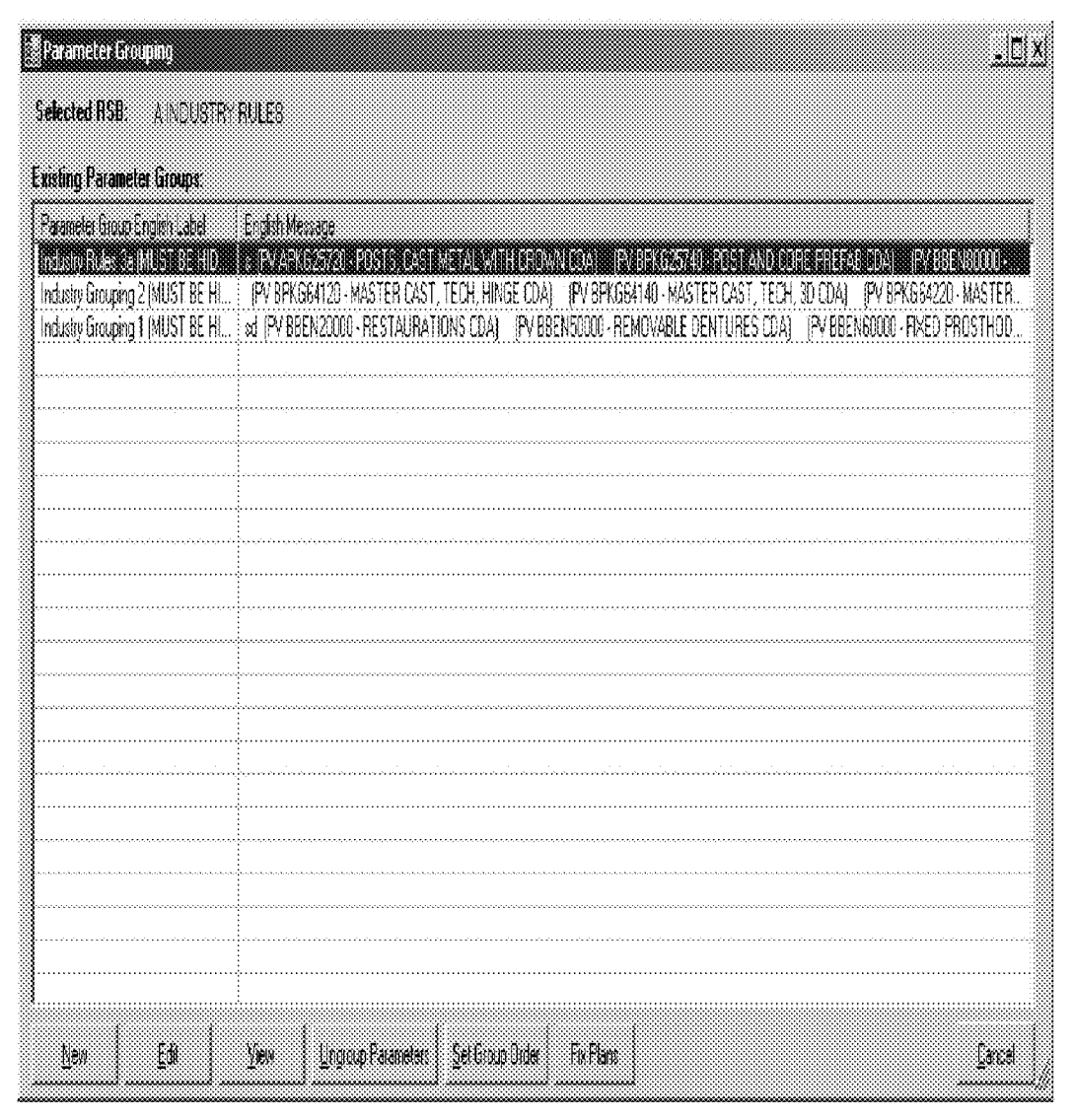

To view, edit, or add rule super blocks:
140. From the Manage menu, select Parameter Groups→Rule Super Blocks. Refer to FIG. 86.
141. The Select Rule Super Block window displays all currently available rule super blocks. Refer to FIG. 87.
142. Click to select a rule super block, and click Ok to display the Parameter Grouping window. Refer to FIG. 88.

Figure 89:
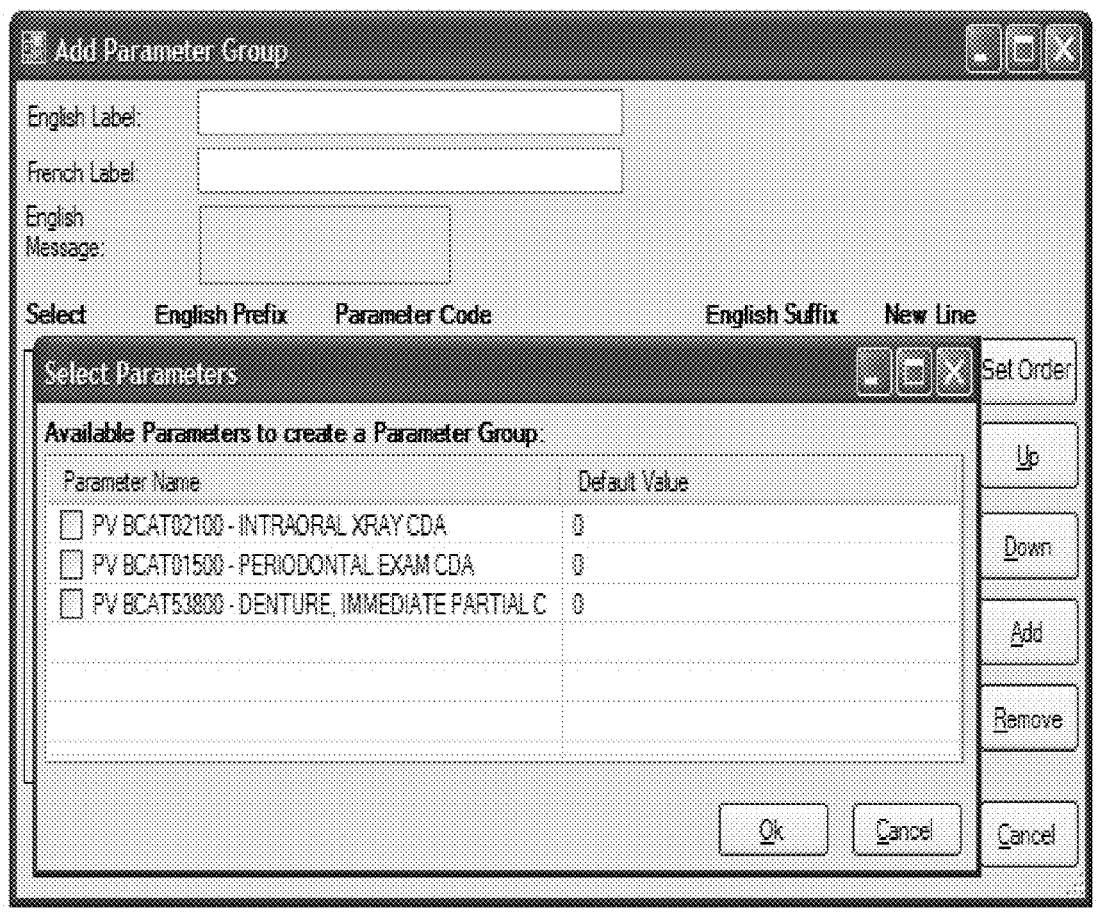

6.2.1 Adding New Parameter Groups to a Rule Super Block:

All available parameters are derived from the Rule Composer. To add or modify a parameter or rule, see the Rule Composer user guide.
To add a new parameter group to the currently selected Rule Super Block:
143. From the Manage menu, select Parameter Groups→Rule Super Blocks.
    The Select Rule Super Block window displays all currently available Rule Super Blocks.
144. Click to select a parameter group, and click Ok to display the Parameter Grouping window
145. Click New to open the Add Parameter Group window.
146. The Select Parameters selection window is automatically displayed with a list of available parameters. Click to select each required parameter, then click Ok to add the parameters to the parameter group. See the Rule Composer user guide for details on creating or modifying specific parameters. Refer to FIG. 89.

Figure 90:
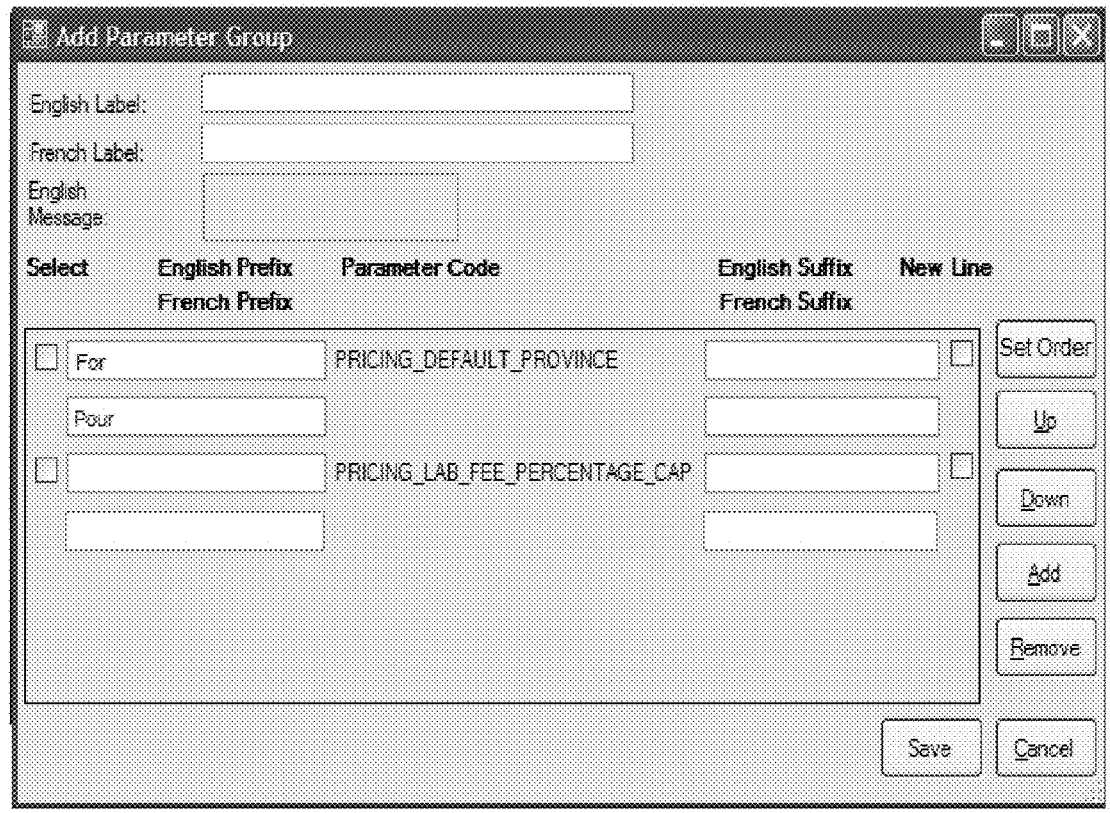

147. Enter an English and/or French Label that will uniquely identify this group of parameters. Refer to FIG. 90.
148. Enter contextual prefix and suffix text in all languages for each parameter. The text entered here should clarify each parameter's business function.
149. Click ☐ to select New Line for any parameter line requiring a hard return when displayed.
   New lines should be used to clarify meaning when the parameter group is displayed.
150. Click ☐ to select any line, then click Up or Down to reposition the parameter line if required. Only one line can be moved at a time.
151. Click ☐ to select any line, then click Remove to remove the selected line from the parameter grouping.
152. Click Add to re-display the Select Parameters window. Only those parameters that are not currently in the parameter group are available for selection.
153. Click Save to save your changes and create the new parameter group.

6.2.2 Editing Parameter Groups in a Rule Super Block

Figure 91:
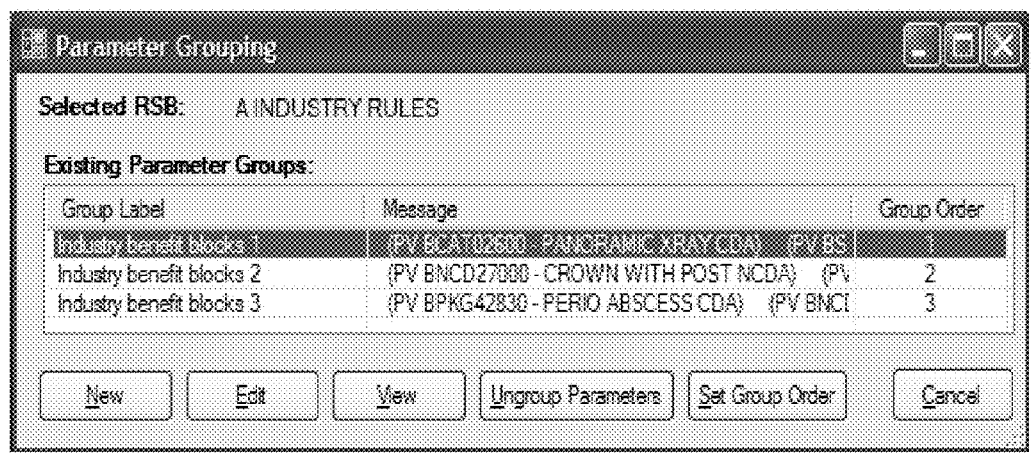
Figure 92:
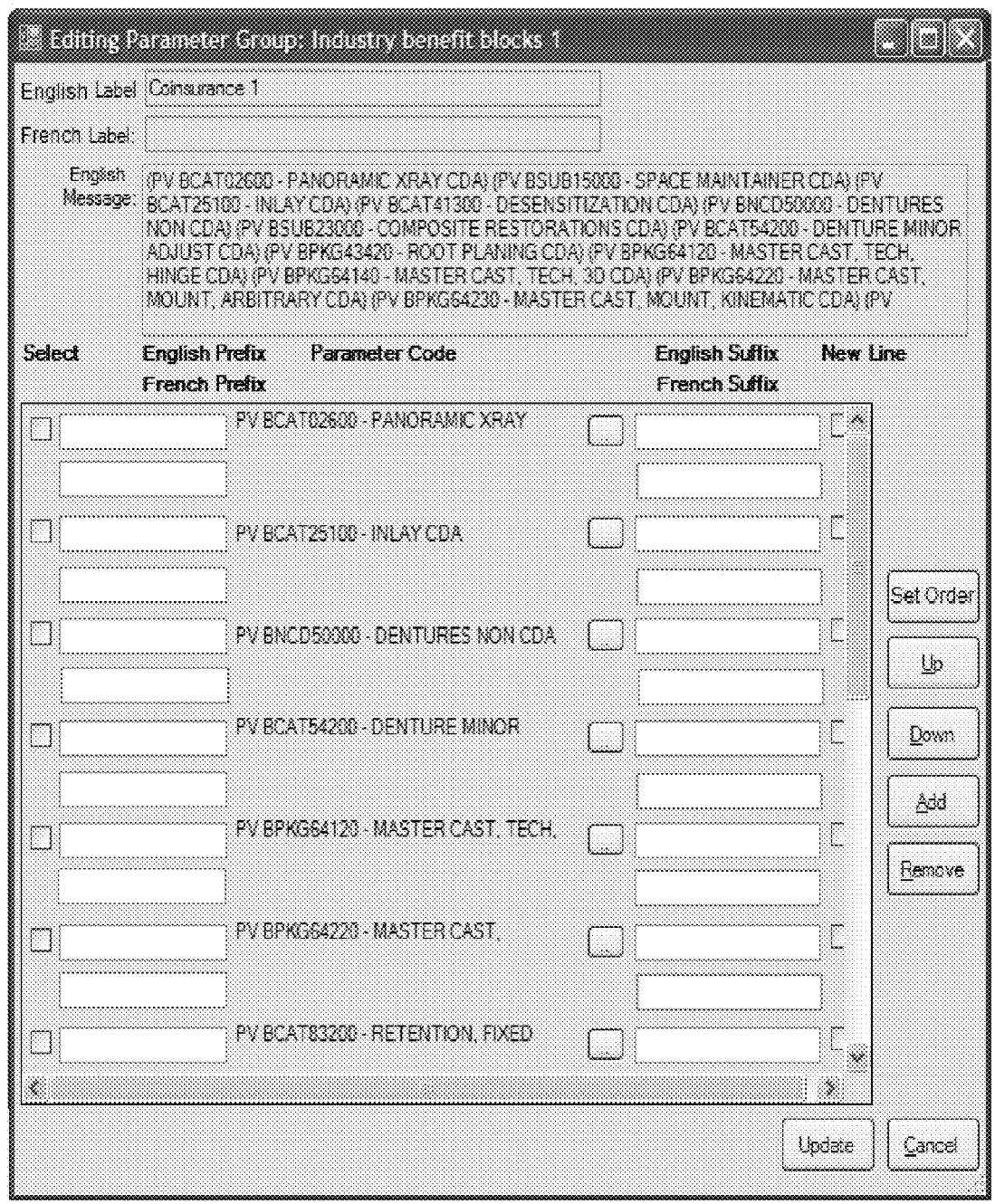

To edit the parameter groups in an existing Rule Super Block:
154. From the Manage menu, select Parameter Groups→Rule Super Blocks.
   The Select Rule Super Block window displays all currently available Rule Super Blocks.
155. Click to select a Rule Super Block, and click Ok to display the Parameter Grouping window. Refer to FIG. 91.
156. Click to select a group from the displayed list, and click Edit. Refer to FIG. 92.
157. Modify the parameter group as required. Select ☐ beside any parameter line to select a default setting for that parameter.
   See 6.2.1 Adding New Parameter Groups to a Rule Super Block for details on adding, removing, or moving parameters within a group.
158. Click Update to save your changes.
159. Repeat steps 3-5 for any other groups in this Rule Super Block that require changes.

6.2.3 Viewing Parameter Groups in a Rule Super Block

To view parameter group details in an existing Rule Super Block:
160. From the Manage menu, select Parameter Groups→Rule Super Blocks.
   The Select Rule Super Block window displays all currently available Rule Super Blocks.
161. Click to select a Rule Super Block, and click Ok to display the Parameter Grouping window.
162. Click to select a group, and click View.
   The Viewing Parameter Group window is display-only.

6.2.4 Ungrouping Parameters in a Rule Super Block

Parameters must be grouped before they become active for addition to plans. Ungrouped parameters are displayed with an asterisk (*) in the plan details window, and are not available for use.

To ungroup parameters in a Rule Super Block:
163. From the Manage menu, select Parameter Groups→Rule Super Blocks.
   The Select Rule Super Block window displays all currently available Rule Super Blocks.
164. Click to select a Rule Super Block, and click Ok to display the Parameter Grouping window.
165. Click to select a group from the displayed list, and click Ungroup Parameters. You will be prompted to confirm the ungrouping, and the group will be removed from the list of existing parameter groups.

6.2.5 Setting Group Order in a Rule Super Block

The order in which each group is displayed should be taken into account to clarify meaning when the Rule Super Block groups are displayed.

Figure 93:
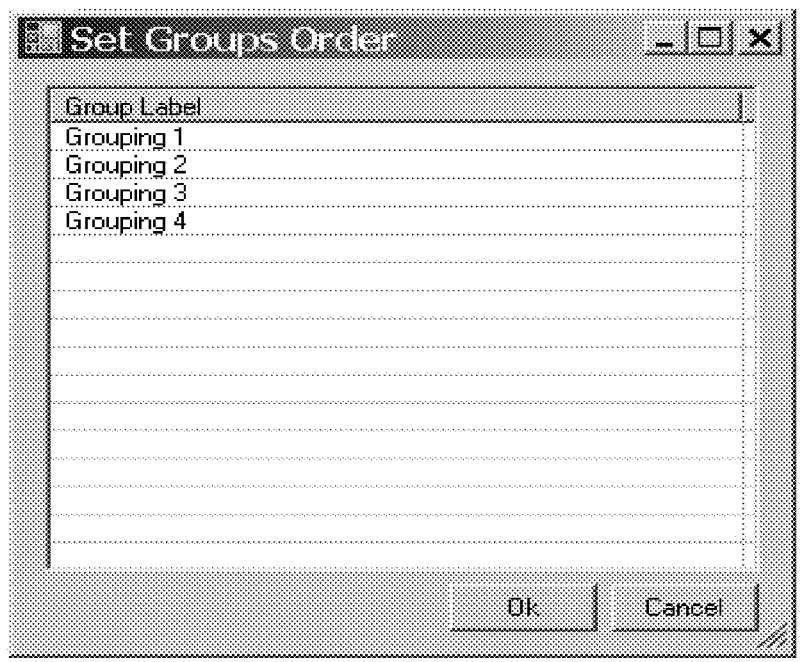

To set the order of an existing Rule Super Block's parameter groups:
166. From the Manage menu, select Parameter Groups→Rule Super Blocks.
   The Select Rule Super Block window displays all currently available Rule Super Blocks.
167. Click to select a Rule Super Block, and click Ok to display the Parameter Grouping window.
168. Click Set Group Order.
169. Click to select one or more Groups, and drag to change the order. Refer to FIG. 93.
170. Click Ok to save your changes and display the Parameter Grouping window with new group order, or Cancel to revert to the last saved order setting.

6.2.6 Checking Parameter Group Errors.

Figure 94:
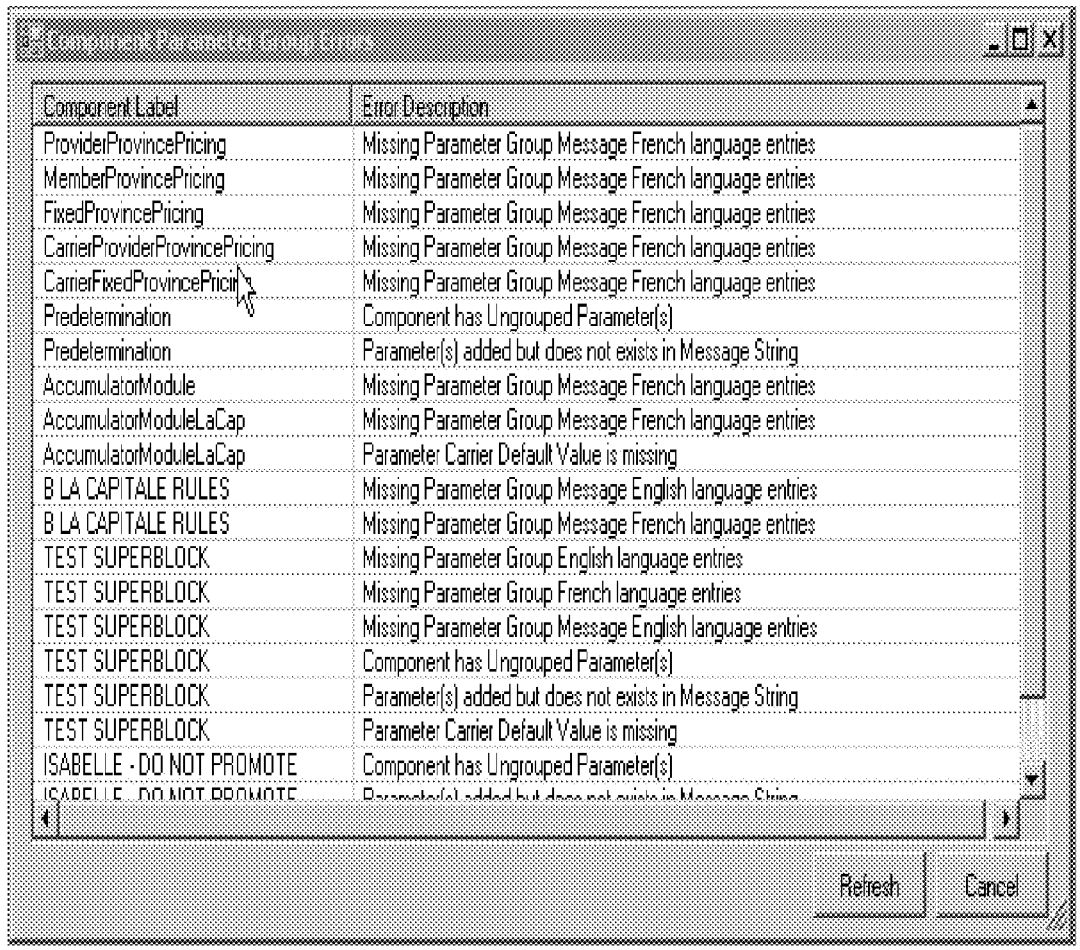

From the Manage menu, select Parameter Groups→Check Parameter Group Errors. This will run a routine that checks for any Parameter Group errors or any missing parameter carrier default values. This routine also runs automatically on logon and checks for the following errors:
   Missing Parameter Group English and French Labels.
   Missing Parameter Group English and French Message strings.
   Ungrouped parameter(s) in RSB and Modules.
   Parameter(s) deleted in RSB/Module but exists in the Parameter Group Message string.
   Parameter(s) added in RSB/Module but don't exist in the Parameter Group Message string.
   Parameters of type benefit block that are missing a carrier default value. Refer to FIG. 94.

To refresh the errors list, click the Refresh button. It runs the routine that checks for the parameter group errors again.

Figure 95:
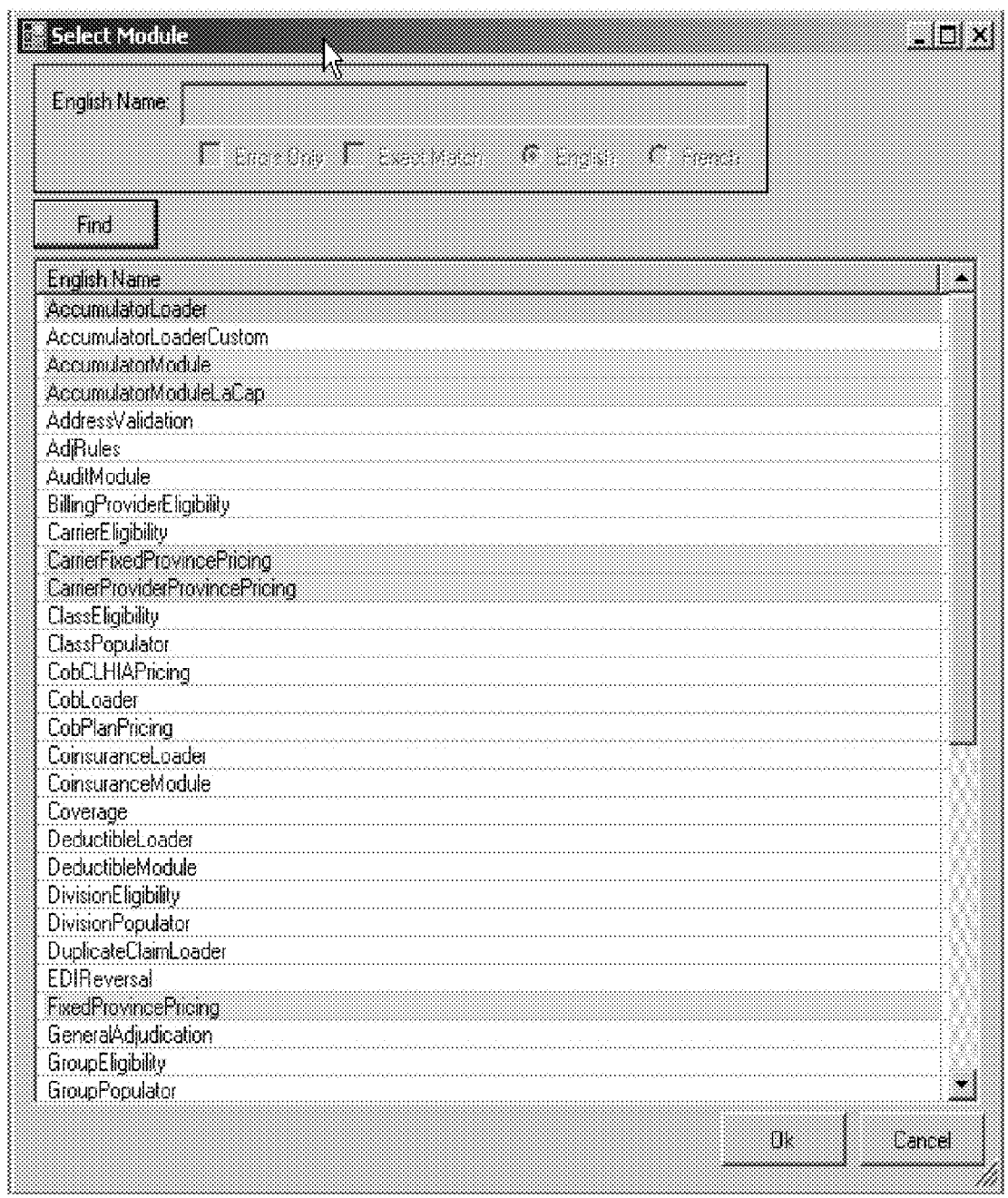

All the RSB and Modules that have errors will be highlighted in the list. Refer to FIG. 95.

Figures 96, 97:
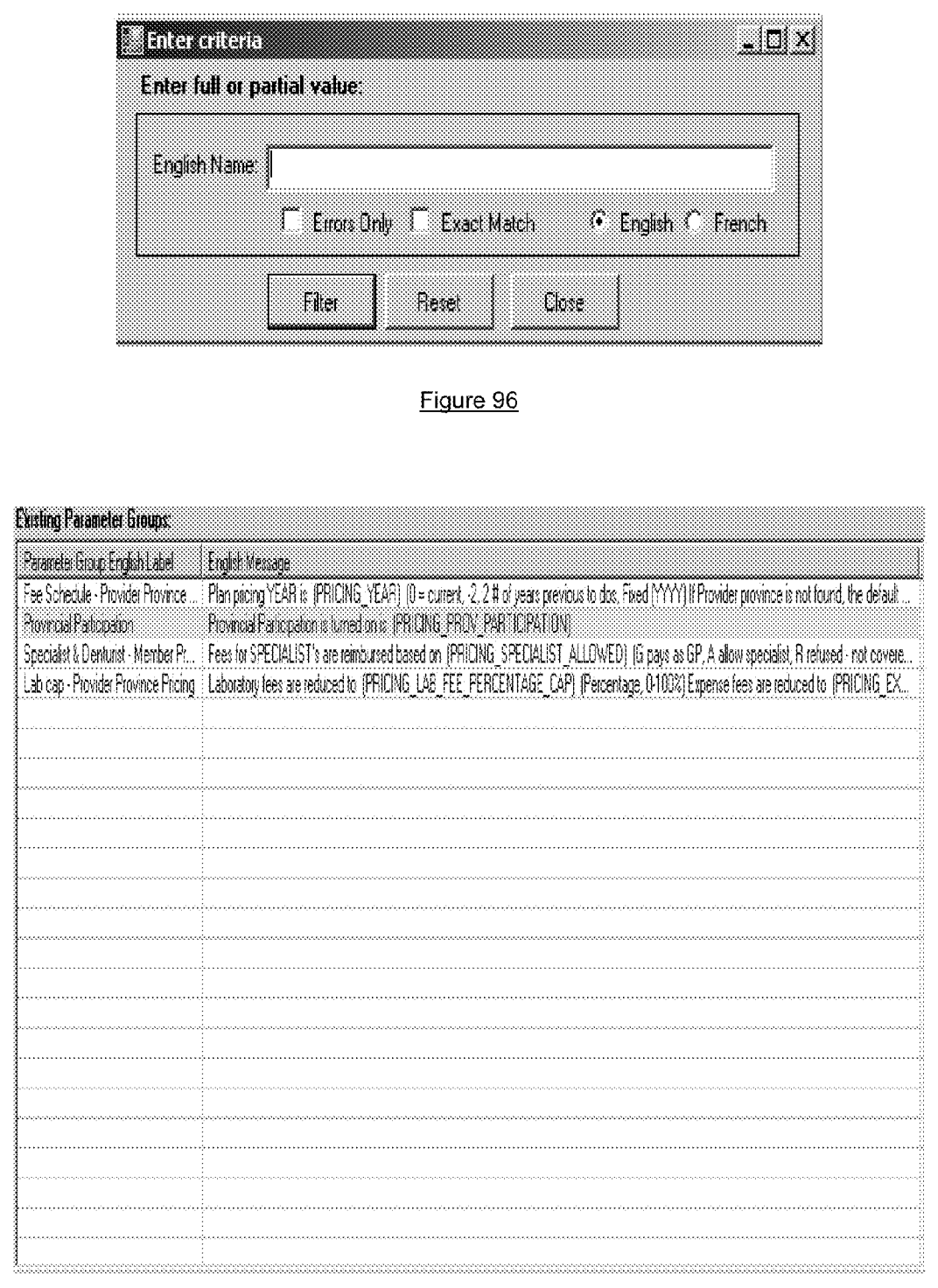

There will be a "Errors Only" checkbox on the form to filter the list. Enter the name and check the "Error Only" check box and click "Filter" button to get only RSB/Modules that have errors. Refer to FIG. 96.

Selecting the desired RSB/Module and clicking "ok" will get the list of parameter groups. The groups with errors and need to be addressed are highlighted. Mouse over on highlighted parameter group shows the error message to indicate why it is highlighted. Refer to FIG. 97.

Figure 98:
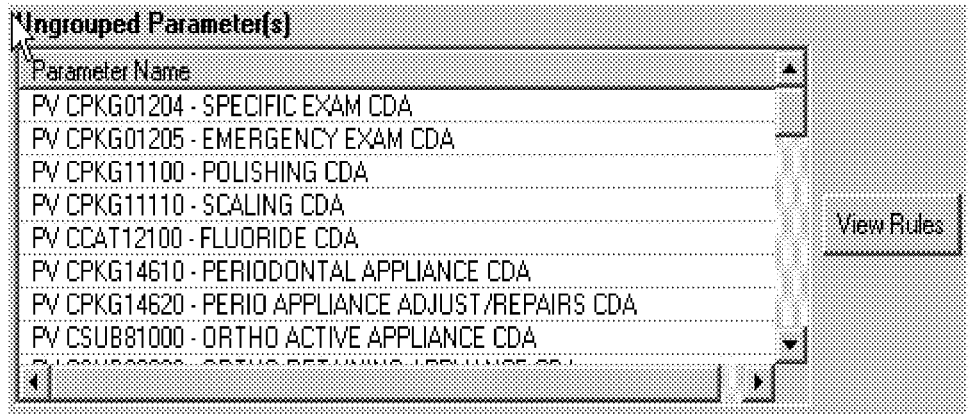

Parameters added to Rule Super Blocks and Modules that are not grouped will appear in the Un-grouped parameters list. Refer to FIG. 98.

Figure 99:
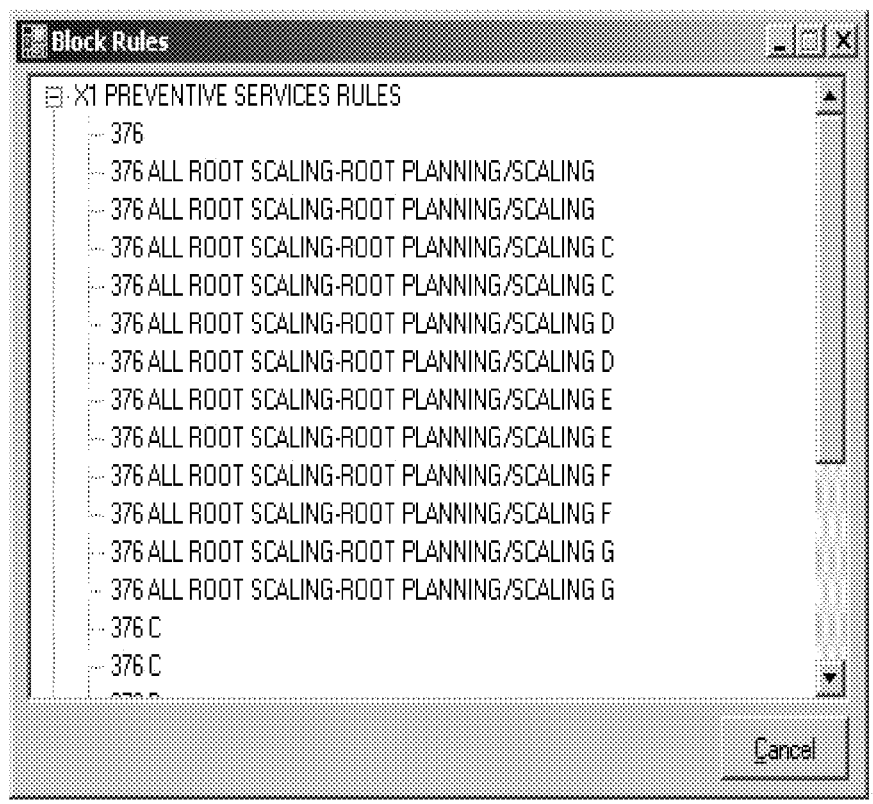

By selecting a Parameter and clicking on the "View Rule" button will open another screen with a list of Block-Rules. By looking at the Block-Rules, the user will be able to include this parameter in the proper group. This button will be visible only for Rule Super Blocks. Refer to FIG. 99.

Figure 100:
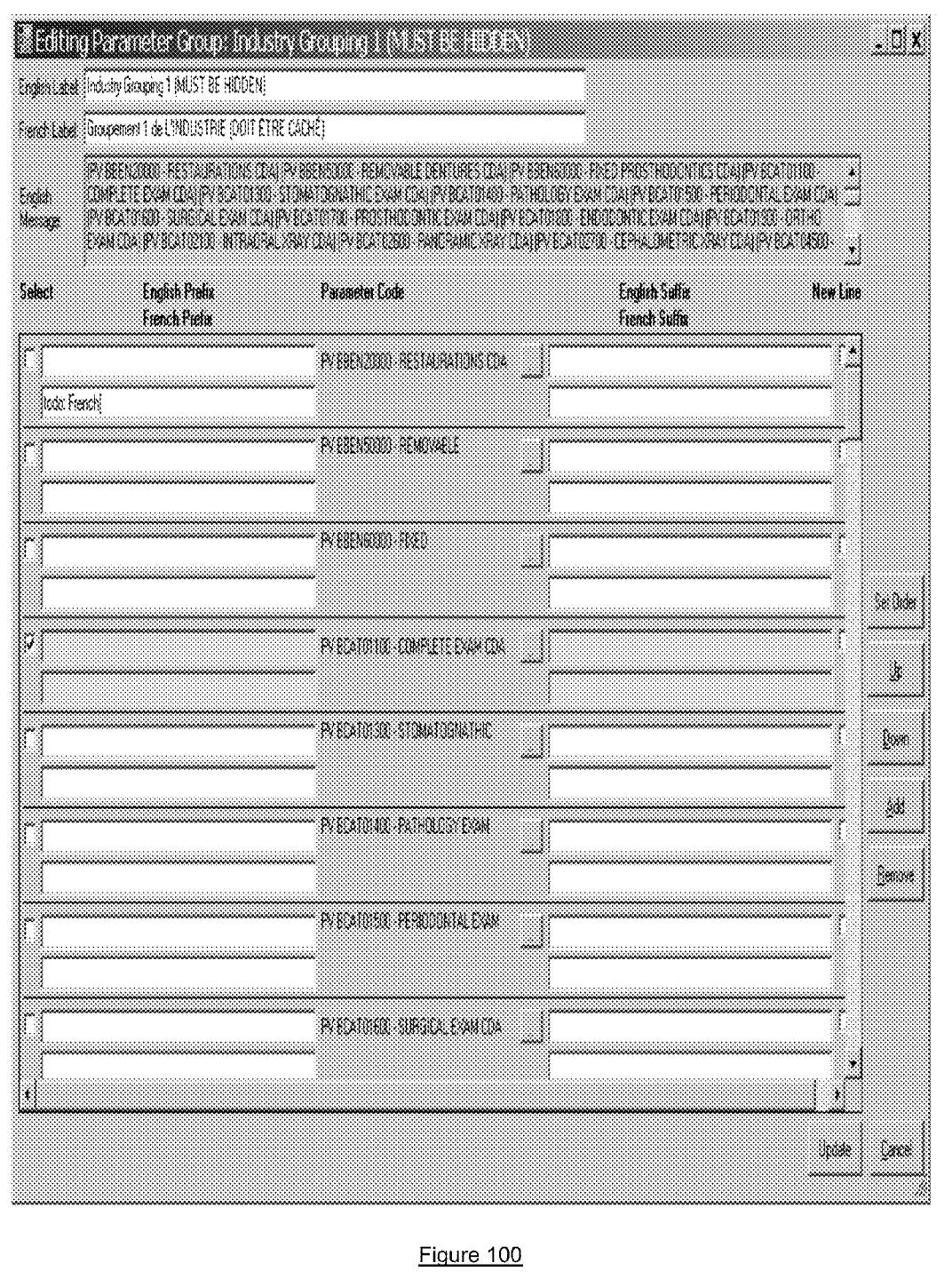

When a parameter is removed from Rule Super Block or Module, the group that contains this parameter will be highlighted. Mouse over on the highlighted group will show the actual error message. The users can open the highlighted group in edit mode and remove the highlighted parameter from the group. Mouse over on highlighted parameter shows the error message to indicate why it is highlighted. Refer to FIG. 100.

6.2.7 Fixing Plans

To fix plan(s) whose RSB parameter(s) have been added or removed

171. From the Manage menu, select Parameter Groups→Rule Super Blocks.

The Select Rule Super Block window displays all currently available Rule Super Blocks.

Figure 101:
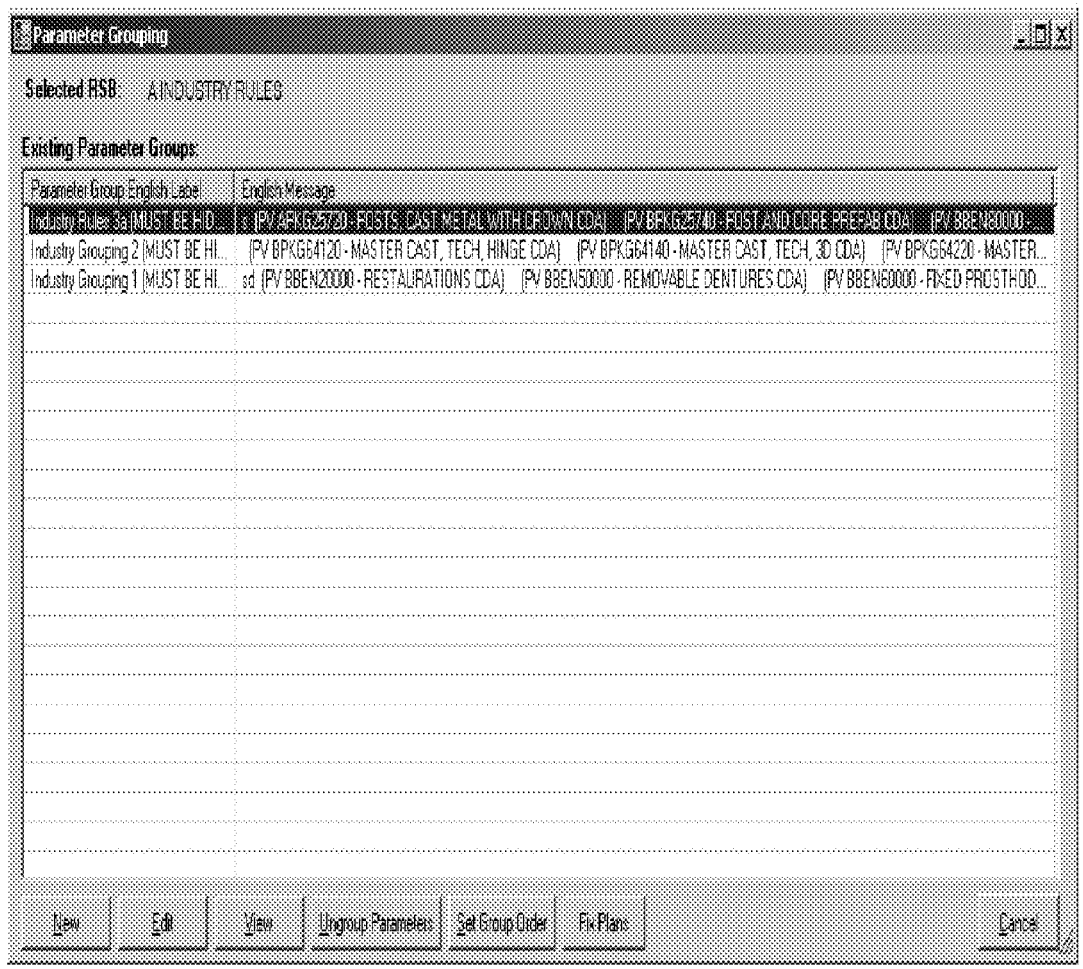

172. Click to select a Rule Super Block, and click Ok to display the Parameter Grouping window. Refer to FIG. 101.

173. Click the "Fix Plan" button to display screen that display all the plans that needs to be fixed. It also display the parameters that needs to be added to the plan or removed from the plan.

To fix plan(s) whose Module parameter(s) have been added or removed

174. From the Manage menu, select Parameter Groups→Modules.

The Select Module window displays all currently available Modules.

Figure 102:
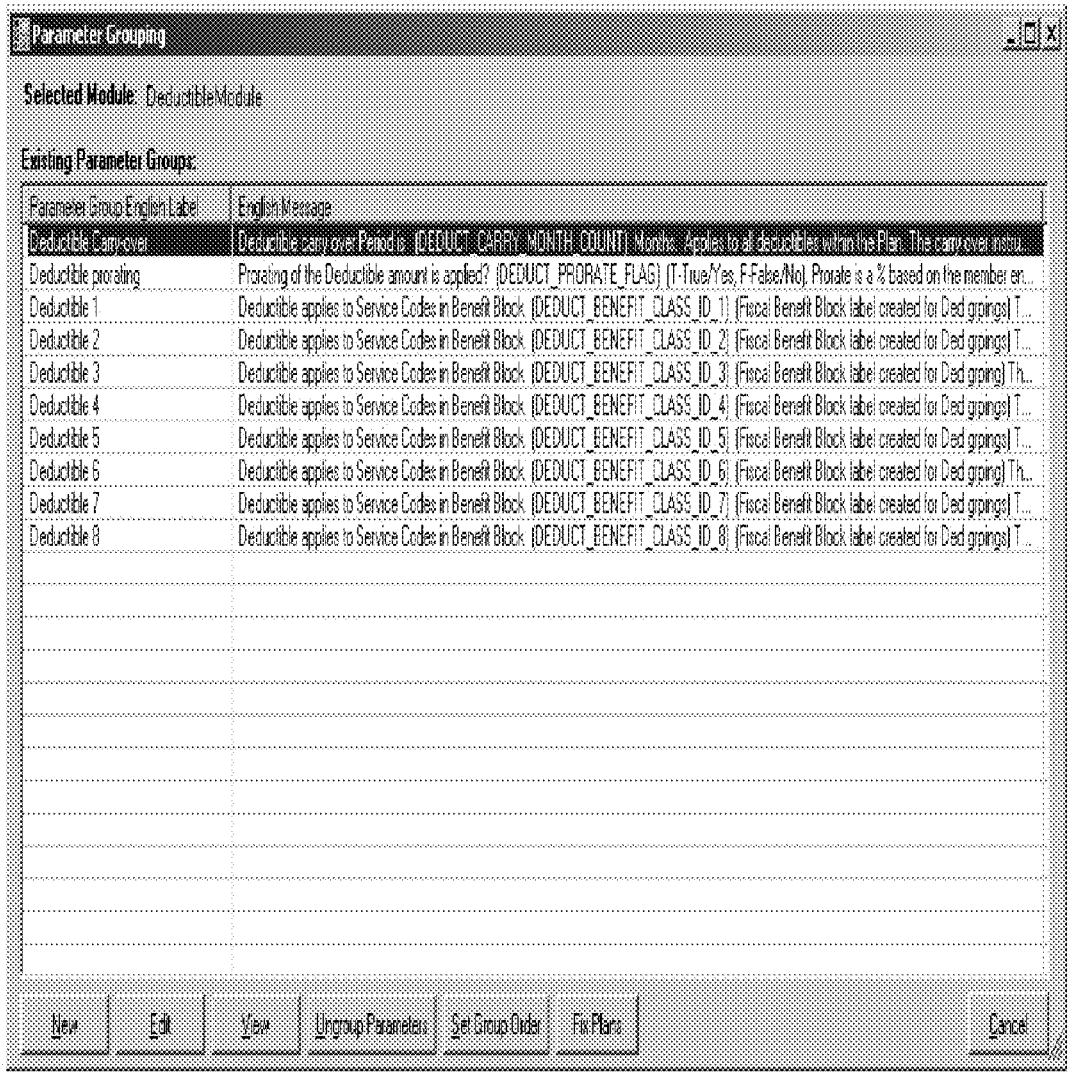

175. Click to select a Module, and click Ok to display the Parameter Grouping window. Refer to FIG. 102.

Figure 103:
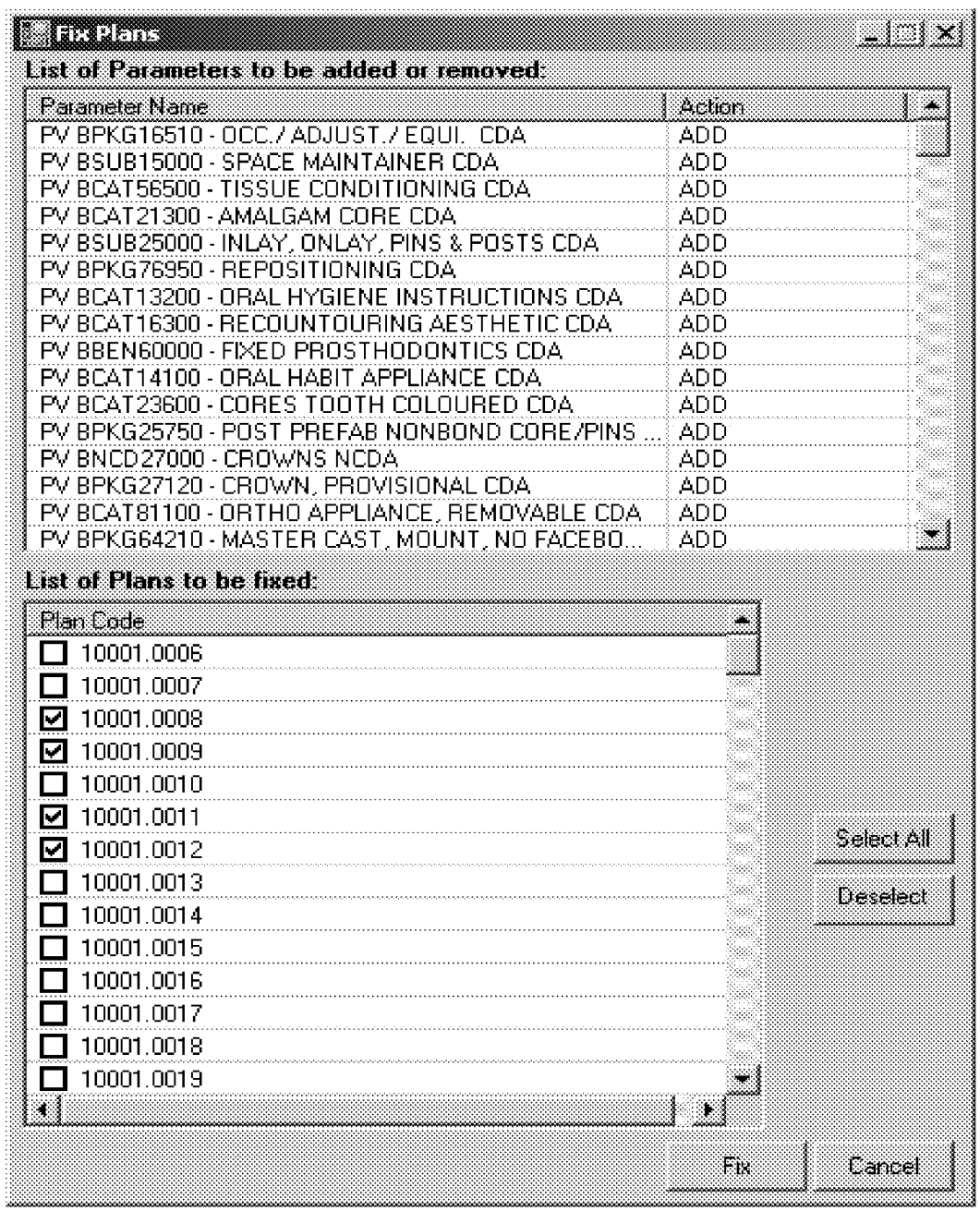

176. Click the "Fix Plan" button to display screen that display all the plans that needs to be fixed. It also display the parameters that needs to be added to the plan or removed from the plan. Refer to FIG. 103.

177. Click ☐ to select any plan; or click "Select All" to select all the plans. Click ☐ again to deselect the selected plan; or click "Deselect" to deselect all the plans.

178. Click Fix to fix the selected plan(s).

7 Rule Composer

The Rule Composer application works in conjunction with the Plan Manager application.

7.1 Browse Rule Super Blocks

Figure 104:
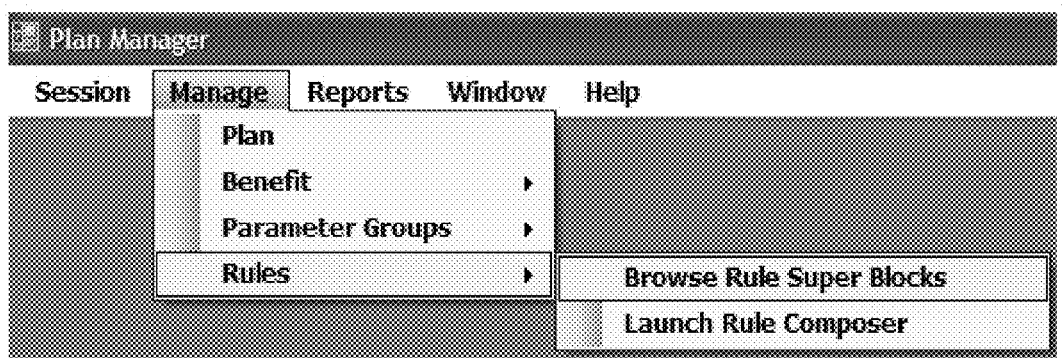

To display rule super block details:

179. From the Manage menu, select Rules→Browse Rule Super Blocks. Refer to FIG. 104.

Figure 105:
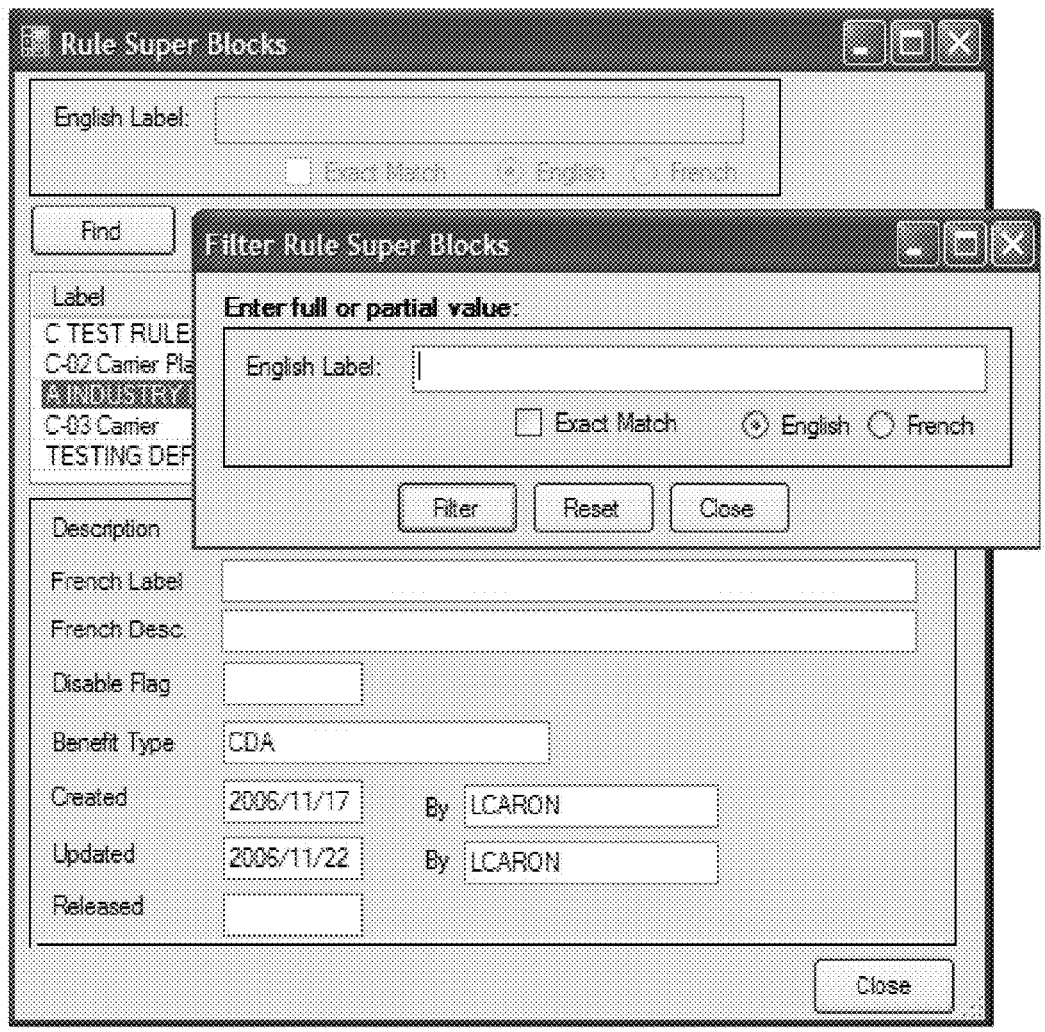

180. Click any of the listed rule super blocks to display related information in the bottom section of the Rule Super Blocks window. Refer to FIG. 105.

7.2 Launch Rule Composer

Figure 106:
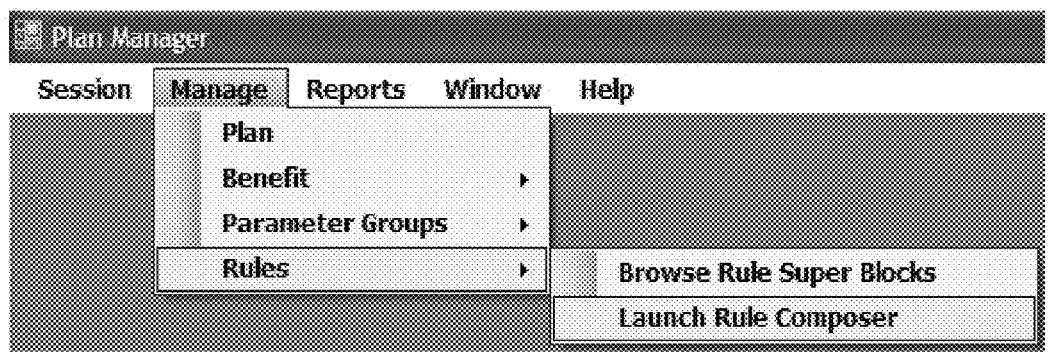

To launch the Rule Composer application:

181. From the Manage menu, select Rules→Launch Rule Composer. Refer to FIG. 106.

182. The Rule Composer application will open in a new window. See the Rule Composer user guide for details.

8 Reports 8.1 Managing Reports

Figure 107:
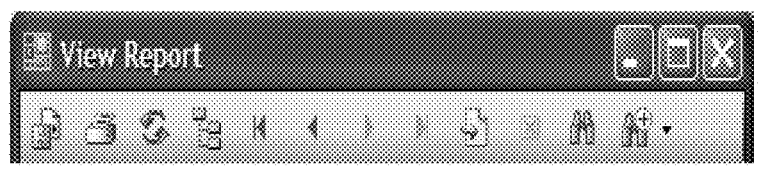

The View Report window allows a common set of report management tools for all Plan Manager reports. Refer to FIG. 107.

8.1.1 Export Reports

To save the current report information in a specific format, click ..

183. Enter a report name.

184. Select an output format. This field defaults to .rpt (Crystal Reports) format, but can be changed to .pdf (Adobe Acrobat), .xls (Excel), .doc (Word), or .rtf (Rich Text) format as required.

185. Click Save to export the contents of the displayed report to the specified file.

8.1.2 Print Report

To print the currently displayed report, click ..

8.1.3 Refresh Report Data

To refresh the current report with current data, click ..

8.1.4 Navigating Reports

Click the  page navigation buttons to move sequentially through the report.

Click  to specify a page number.

Click  to search for specific data in the report.

8.2 Plan Detail

The Plan Detail report lists all plan information for plans to which the current user has access (based on selected environment and user role).

Figure 108:
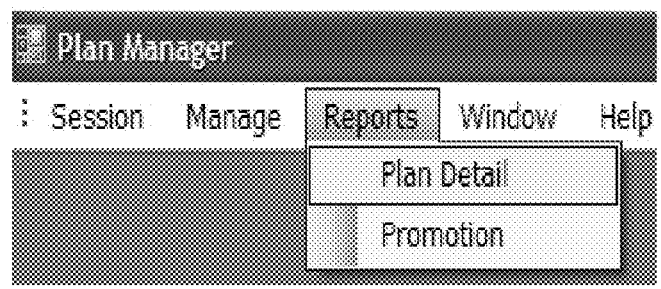

To generate the Plan Detail report:

186. From the Reports menu, select Plan Detail. Refer to FIG. 108.

187. The Plan Detail Report selection window is displayed.

Click to select the Report Type: Plan Detail Report, Export Coverage BSB Procedures Codes, or Internal Report.

Figure 109:
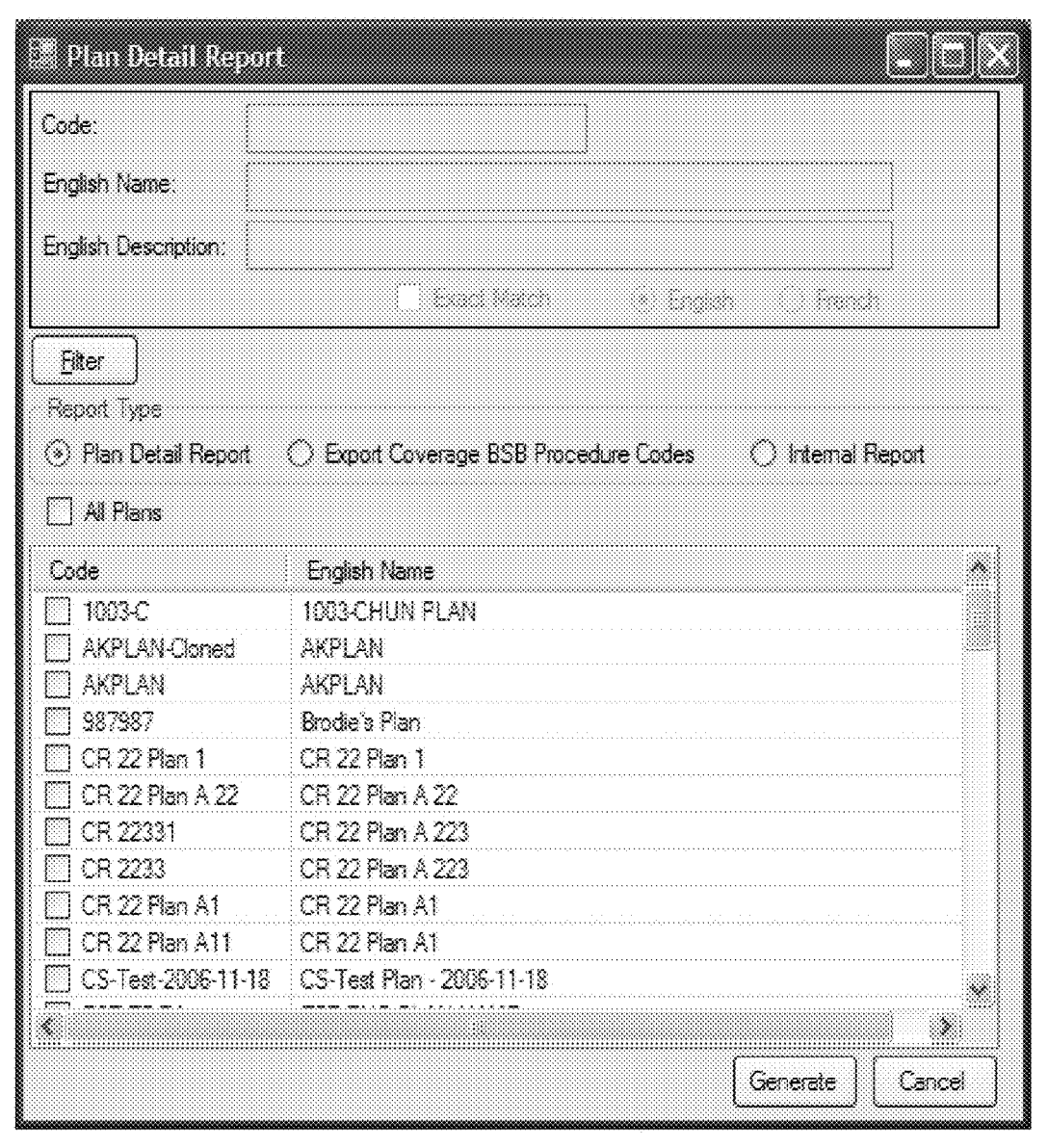

Click to select one or more plan codes on which to report, or click ☐ All Plans to report on all relevant codes. Refer to FIG. 109.

188. Click Generate to create the report(s) based on your specified criteria.

189. Once the reports are ready for display, the system prompts to save them. Select a save location and click Save.

Reports are generated in a .pdf format. Each plan is named according to the report type and the code identifier; for example, a Plan Detail Report for code 1003-C would be named PlanDetail-1003-C.pdf.

8.3 Promotion

The promotion report displays details on plan promotion from the development environment to a production environment accessible to Gamma users.

Figure 110:
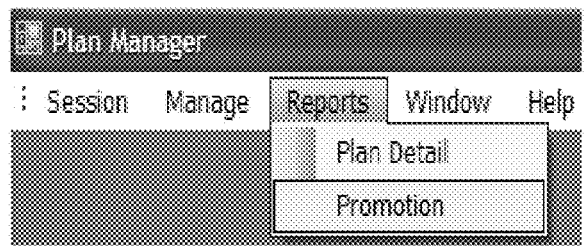

To generate the Promotion report:

190. From the Reports menu, select Promotion. Refer to FIG. 110.

Figure 111:
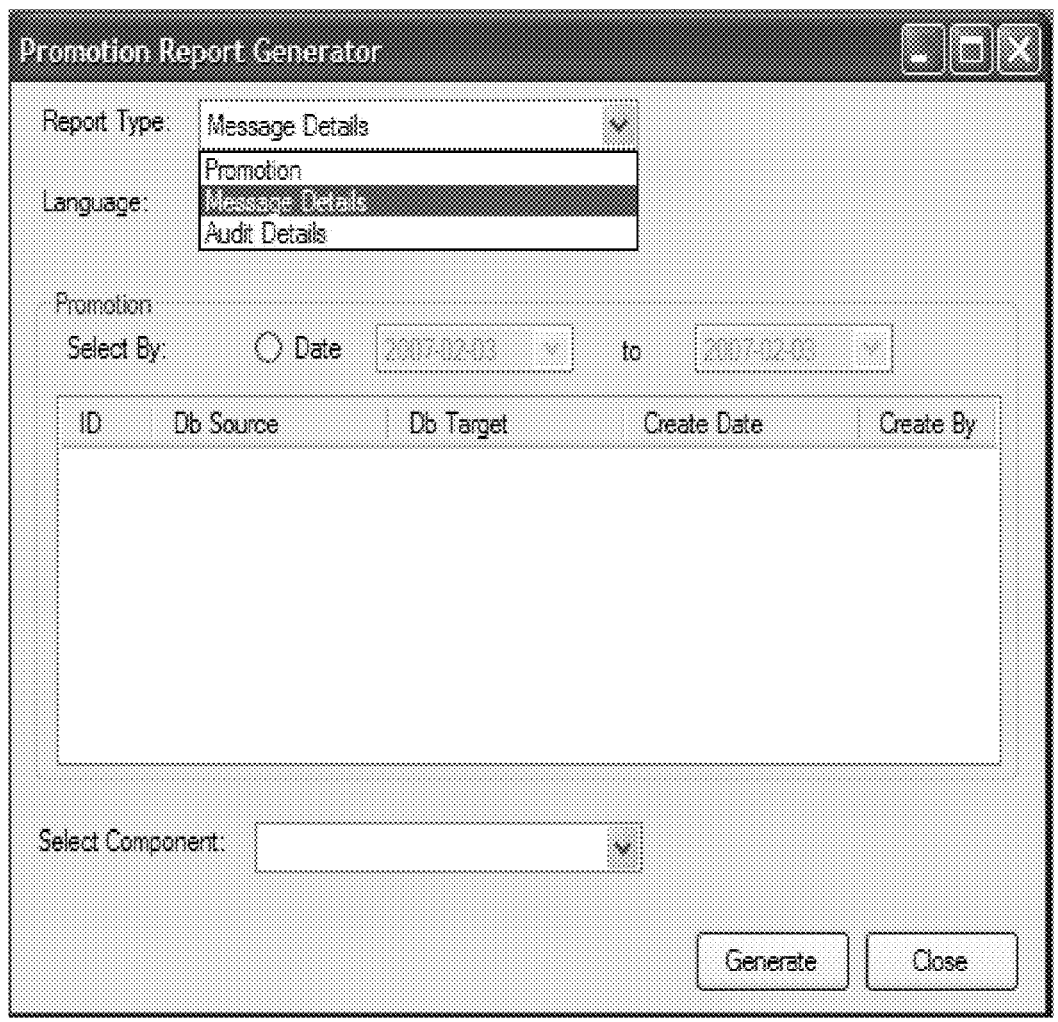

191. The Promotion Report Generator window is displayed. Refer to FIG. 111.

192. Select report criteria:

Report Type

Select to generate a Promotion, Message Details, or Audit Details report.

Language

Select from the available report languages.

Promotion Dates

Specify a From and To date range. Only plans scheduled for promotion within the date range will be included in the report.

Select Component

Select a data component on which to report.

193. Click Generate to create the report based on your specified criteria.

194. Once the report is ready for display, the system prompts to save. Select a save location and click Save.

Reports are generated in a .pdf format.

9 Messages

The Plan Manager application has a defined set of error and warning messages to aid in problem resolution.

| Message Id | Message Text | Notes. |
|---|---|---|
| 1 | A Disabled List was used in a rule | A Rule references a list that is disabled |
| 2 | A Data Conflict was found between the two databases | A values in the target database are different from the value being promoted and the existing value recorded in the audit. Aka someone changed a value in production or staging with out changing it in in staging or development environments respectively |
| 3 | A Modification was found | A change to a value was detected in the source environment |
| 4 | A New Entry was found | A new value was found in the source environment |
| 5 | Overlapping of entries were found | A timelined entry was found that overlaps with another timelined entry |
| 6 | A Rule Blocks Effective date was before the earliest Rule version date | A Rule was join to a rule block before any rule version effective date |
| 7 | Null or Empty Rule XML data was found | A rule was found that has a null or empty xml field |
| 8 | An invalid reference was found | A child table entry references a non existent parent table entry |
| 9 | An entry with no references was found | A parent table entry exists without any child references |
| 10 | A invalid child value was found | A child list contains a value that does not exist in the parent list |
| 11 | The effective date of a child value is invalid | A child value's effective or expiry date is outside of the parent value's effective date range |
| 12 | A entry was removed | A entry in a table has been removed from the source database |
| 13 | A field exists in one database but not the other | One of the environments contain a database field that the other does not |
| 14 | A table exists in one database but not the other | One of the environments contain a database table that the other does not |
| 15 | A Constraint was not found or different between databases | One of the environments contains a constraint that the other does not or a different constraint than the other |
| 16 | A Index was not found or different between databases | One of the environments contains a index that the other does not or a different index than the other |
| 17 | A Plan did not override a Parameter that was used in a referenced rule | All plans must override, with a DENTAL_PPLAN_PARAMETER, every parameter that is used in the assigned rule super blocks |
| 18 | parameter references an invalid enrolment type | A parameter assignment references an invalid enrolment type (1-7, recipient - carrier) |
| 19 | Rule Super Block Carrier Number is not the same as Plan Carrier Number | A Plan references a rule super block that has a different carrier |
| 20 | Benefit Super Block Carrier Number is not the same as Plan Carrier Number | A Plan references a benefit super block that has a different carrier |
| 21 | This plan component has ungrouped parameters | A referenced parameter is not part of a parameter grouping |
| 22 | Invalid or Missing Parameter in grouping | A plan parameter is not grouped or a group parameter does not exist |
| 23 | The parameter value. The value must follow the type, format, and limits passed in and cannot be null | A parameter value does not follow the restrictions described in the parameterized value |
| 24 | The type passed in was invalid | The parameterized value type was invalid |
| 25 | The Parameterized Value's format is invalid | The parameterized value format was invalid |
| 26 | The Parameterized Value's limits are invalid | The parameterized value limits are invalid |
| 27 | The Plan refers to an invalid Benefit Super Block Type | The Plan references a wrong type of Fiscal, Adjudication, Coverage, etc type benefit block in Fiscal, Adjudication, Coverage, etc block field |
| 28 | The Adjudication Rule has Invalid Rule Code | The Rule version has an null rule code field, possibly caused by an uncompilable rule |
| 29 | Invalid Module Type in Module Instance Loader Table | There is a module type other than A (Adjudication) in the Module Instance Loader table |
| 30 | The Plan has duplicate Module of same Type | A plan has referenced two module of the same type, Each plan can only reference one module of each type |
| 31 | The Module Instance Loader has duplicate Sort Order | Two or more module instance have the same sort order value |
| 32 | The Carrier is missing as loader for Version(s) | A carrier does not have a loader for a default version ("04") |
| 33 | The Carrier is missing as loader for Transaction Type(s) | A carrier does not have a loader for a default type ("01", "02", "03", "07") |
| 34 | The Carrier is missing as loader for Claim Type(s) | A carrier does not have a loader for a default claim type ("CDA") |
| 35 | The Carrier Plan Parameter of Benefit Block type is missing a default value | A Carrier is missing default value for Plan Parameters for Parameterized Value of Type Benefit Block. Every Carrier must have a default value in the PARAM_VALUE_CARRIER_DEFAULT for every reference parameterized value |

| Message Id | Message Text | Notes. |
|---|---|---|
| 36 | The Target database is missing a view | A required view is missing from the target environment |

The invention claimed is:

1. A method for modifying benefit coverage including a plurality of benefit codes of a selected insurance plan of a plurality of insurance plans, the selected insurance plan for use in adjudicating one or more insurance claims, the method comprising the steps of:
   accessing, using a computer processor, a set of benefit codes structured in a plurality of benefit containers stored in a memory;
   providing a primary benefit container; providing a plurality of secondary benefit containers, each of the plurality of secondary benefit containers containing one or more benefit codes adapted for processing a claim content of the one or more insurance claims;
   providing a plurality of benefit references to couple each of the one or more benefit codes to their respective secondary benefit container by a respective benefit reference;
   providing a plurality of benefit container references to couple each of the plurality of secondary benefit containers to the primary benefit container by a respective benefit container reference, wherein the respective benefit container references and the respective benefit references define a benefit hierarchy of the set of benefit codes that can be reused across the plurality of insurance plans;
   selecting, using the computer processor, the primary benefit container for inclusion in the selected insurance plan;
   modifying the selected insurance plan, using the computer processor, by modifying a benefit container parameter of at least one of the benefit container references;
   storing the modified selected insurance plan in the memory accessible by the computer processor,
   wherein the stored modified insurance plan is adapted for subsequent use in adjudication of appropriate insurance claims received by an adjudication system;
   and accessing a set of adjudication rules structured in a plurality of containers including a primary rule container and a plurality of secondary rule containers, each of the plurality of secondary rule containers being coupled to the primary rule container by a respective container reference, each of the plurality of secondary rule containers containing one or more adjudication rules adapted for processing the claim content of the received claim, each of the one or more adjudication rules being coupled to their respective secondary container by a respective rule reference, the set of adjudication rules defining a rule hierarchy.

2. The method of claim 1, wherein the benefit containers and the one or more benefit codes are defined as benefit objects.

3. The method of claim 2, wherein each of the benefit objects are instances of a defined benefit code or benefit container stored in the memory.

4. The method of claim 2 further comprising the steps of:
   selecting the primary rule container for inclusion in the selected insurance plan;
   modifying the rule hierarchy by performing at least one of adding an additional rule container reference to the primary rule container, modifying a rule container parameter of at least one of the rule container references, or deleting at least one of the existing rule container references; and
   storing the modified selected insurance plan in the memory accessible by the computer processor.

5. The method of claim 2, wherein the modification to the benefit hierarchy includes a change to the respective reference of the benefit object selected from the group consisting of: a change in the effective date of the reference; a change in the expiry date of the reference; a change in the benefit object version associated with the reference; a change to the definition content of the benefit codes or the benefit containers; and a change in the ordering of the references in the respective container.

6. The method of claim 5, wherein any modification to the references can be dated to have at least one of an override effective date or an override expiry date, such that the modification is a temporary modification providing for the configuration of the modified benefit hierarchy to revert back to a pre-modified state when a chronological date is outside of said at least one of an override effective date or an override expiry date.

7. The method of claim 1 further comprising the steps of modifying the benefit hierarchy by performing at least one of adding an additional benefit reference to at least one of the secondary benefit containers, modifying a benefit reference parameter of at least one of the benefit references, or deleting at least one of the existing benefit references.

8. The method of claim 1, wherein at least one of the benefit references or the benefit container references is defined to include at least one of an effective date or an expiry date.

9. The method of claim 8, wherein the benefit container parameter is said at least one of an effective date or an expiry date.

10. A system for modifying benefit coverage including a plurality of benefit codes of a selected insurance plan of a plurality of insurance plans, the selected insurance plan for use in adjudicating one or more insurance claims, the system comprising:
   a memory for storing a set of benefit codes structured in a plurality of benefit containers to define a benefit hierarchy, the benefit hierarchy comprising:
      a primary benefit container;
      a plurality of secondary benefit containers, each of the plurality of secondary benefit containers containing one or more benefit codes adapted for processing a claim content of the one or more insurance claims;
      a plurality of benefit references to couple each of the one or more benefit codes to their respective secondary benefit container by a respective benefit reference; and
      a plurality of benefit container references to couple each of the plurality of secondary benefit containers to the primary benefit container by a respective benefit container reference, wherein the respective benefit container references and the respective benefit references define the benefit hierarchy of the set of benefit codes that can be reused across the plurality of insurance plans;

a plan engine adapted for selecting the primary benefit container from the benefit hierarchy for inclusion in the selected insurance plan;

a benefit module adapted for modifying the selected insurance plan by modifying a benefit container parameter of at least one of the benefit container references;

and a deployment module adapted for storing the modified selected insurance plan in the memory, wherein the stored modified selected insurance plan is adapted for subsequent use in adjudication of appropriate insurance claims received by an adjudication system;

the memory further comprising a set of adjudication rules structured in a plurality of containers including a primary rule container and a plurality of secondary rule containers, each of the plurality of secondary rule containers being coupled to the primary rule container by a respective container reference, each of the plurality of secondary rule containers containing one or more adjudication rules adapted for processing the claim content of the received claim, each of the one or more adjudication rules being coupled to their respective secondary container by a respective rule reference, the set of adjudication rules defining a rule hierarchy.

11. The system of claim 10, wherein the benefit containers and the one or more benefit codes are defined as benefit objects.

12. The system of claim 11, wherein each of the benefit objects are instances of a defined benefit code or benefit container stored in the memory.

13. The system of claim 11 further comprising a rule module adapted for selecting the primary rule container from the rule hierarchy for inclusion in the insurance plan; and modifying the rule hierarchy by performing at least one of adding an additional rule container reference to the primary rule container, modifying a rule container parameter of at least one of the rule container references, or deleting at least one of the existing rule container references; wherein the modified insurance plan is stored in the memory.

14. The system of claim 11, wherein the modification to the benefit hierarchy includes a change to the respective reference of the benefit object selected from the group consisting of: a change in the effective date of the reference; a change in the expiry date of the reference; a change in a benefit object version associated with the reference; a change to the definition content of the benefit codes or the benefit containers; and a change in the ordering of the references in the respective container.

15. The system of claim 14, wherein any modification to the references can be dated to have at least one of an override effective date or an override expiry date, such that the modification is a temporary modification providing for the configuration of the modified benefit hierarchy to revert back to a pre-modified state when a chronological date is outside of said at least one of an override effective date or an override expiry date.

16. The system of claim 10 further comprising the benefit module adapted for modifying the benefit hierarchy by performing at least one of adding an additional benefit reference to at least one of the secondary benefit containers, modifying a benefit reference parameter of at least one of the benefit references, or deleting at least one of the existing benefit references.

17. The system of claim 10, wherein at least one of the benefit references or the benefit container references is defined to include at least one of an effective date or an expiry date.

18. The system of claim 17, wherein the benefit container parameter is said at least one of an effective date or an expiry date.

19. The system of claim 10, wherein an execution order of the benefit codes is associated with the ordering of the container references in the primary benefit container.

* * * * *